United States Patent
Machida

(10) Patent No.: US 12,174,366 B2
(45) Date of Patent: Dec. 24, 2024

(54) DISPLAY APPARATUS AND INITIAL SETTING METHOD FOR DISPLAY APPARATUS

(71) Applicant: Sony Group Corporation, Tokyo (JP)

(72) Inventor: Akio Machida, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/137,998

(22) Filed: Apr. 21, 2023

(65) Prior Publication Data

US 2023/0258922 A1    Aug. 17, 2023

Related U.S. Application Data

(63) Continuation of application No. 15/568,624, filed as application No. PCT/JP2016/002058 on Apr. 15, 2016, now abandoned.

(30) Foreign Application Priority Data

Apr. 30, 2015    (JP) ................ 2015-092857

(51) Int. Cl.
*G02B 26/02*      (2006.01)
*G02B 27/01*      (2006.01)
(Continued)

(52) U.S. Cl.
CPC ....... *G02B 26/026* (2013.01); *G02B 27/0101* (2013.01); *G02B 27/017* (2013.01);
(Continued)

(58) Field of Classification Search
None
See application file for complete search history.

(56) References Cited

U.S. PATENT DOCUMENTS

| 11,333,878 B2 | 5/2022 | Machida |
| 2004/0095630 A1 | 5/2004 | Fukazawa |

(Continued)

FOREIGN PATENT DOCUMENTS

| EP | 2 535 760 A2 | 12/2012 |
| JP | 57-115018 U1 | 7/1982 |

(Continued)

OTHER PUBLICATIONS

U.S. Appl. No. 15/568,624, filed Oct. 23, 2017, Machida.
(Continued)

*Primary Examiner* — Nicholas J Lee
(74) *Attorney, Agent, or Firm* — Wolf, Greenfield & Sacks, P.C.

(57) ABSTRACT

A display device, a method, and a computer-readable medium. The display device includes a layer including a first region and a second region, wherein the first region and the second region are configured to be visible to a user of the display device; and circuitry configured: to control displaying a computer generated image on an optical device overlapping the layer and to control a first transmittance of the first region of the layer to be lower than a second transmittance of the second region of the layer such that: a visibility, through the first region, of the computer generated image is increased and a visibility, through the second region, of an environment opposite the user relative to the display device is higher than a visibility, through the first region, of the environment opposite the user relative to the display device.

15 Claims, 30 Drawing Sheets

(51) Int. Cl.
*G02F 1/1523* (2019.01)
*G02F 1/155* (2006.01)
*G09G 3/38* (2006.01)

(52) U.S. Cl.
CPC ....... *G02B 27/0172* (2013.01); *G02F 1/1523* (2013.01); *G02F 1/155* (2013.01); *G09G 3/38* (2013.01); *G02B 2027/0118* (2013.01); *G02B 2027/0125* (2013.01); *G09G 2340/0464* (2013.01); *G09G 2354/00* (2013.01); *G09G 2360/144* (2013.01)

(56) References Cited

U.S. PATENT DOCUMENTS

| | | |
|---|---|---|
| 2006/0152434 A1 | 7/2006 | Sauer et al. |
| 2008/0218434 A1 | 9/2008 | Kelly et al. |
| 2010/0321409 A1* | 12/2010 | Komori .............. G06T 3/40 345/656 |
| 2012/0068913 A1 | 3/2012 | Bar-Zeev et al. |
| 2012/0120103 A1 | 5/2012 | Border et al. |
| 2012/0134543 A1 | 5/2012 | Fedorovskaya et al. |
| 2012/0154557 A1 | 6/2012 | Perez et al. |
| 2014/0063045 A1 | 3/2014 | Chang |
| 2016/0154243 A1 | 6/2016 | Aiki |
| 2018/0322845 A1 | 11/2018 | Machida |
| 2020/0349902 A1 | 11/2020 | Machida |

FOREIGN PATENT DOCUMENTS

| | | |
|---|---|---|
| JP | 58-18673 A | 2/1983 |
| JP | H05-328260 A | 12/1993 |
| JP | H11-161188 A | 6/1999 |
| JP | 2002-244074 A | 8/2002 |
| JP | 2004-341027 A | 12/2004 |
| JP | 2006-162767 A | 6/2006 |
| JP | 2006-209144 A | 8/2006 |
| JP | 2007-094175 A | 4/2007 |
| JP | 2010-249896 A | 11/2010 |
| JP | 2012-088472 A | 5/2012 |
| JP | 2012-252091 A | 12/2012 |
| JP | 2013-214856 A | 10/2013 |
| JP | 2014-035668 A | 2/2014 |
| JP | 2014-044334 A | 3/2014 |
| JP | 2014-092787 A | 5/2014 |
| WO | WO 2012/118573 A1 | 9/2012 |
| WO | WO 2015/001839 A1 | 1/2015 |

OTHER PUBLICATIONS

U.S. Appl. No. 16/931,264, filed Jul. 16, 2020, Machida.
International Search Report and Written Opinion mailed Jul. 4, 2016 in connection with International Application No. PCT/JP2016/002058.
International Preliminary Report on Patentability mailed Nov. 9, 2017 in connection with International Application No. PCT/JP2016/002058.
Japanese Office Action mailed May 14, 2019 in connection with Japanese Application No. 2015-092857, and English translation thereof.
Japanese Office Action mailed Sep. 24, 2019 in connection with Japanese Application No. 2015-092857, and English translation thereof.
Japanese Office Action mailed Mar. 17, 2020 in connection with Japanese Application No. 2015-092857, and English translation thereof.

* cited by examiner

<OBSERVER SIDE>

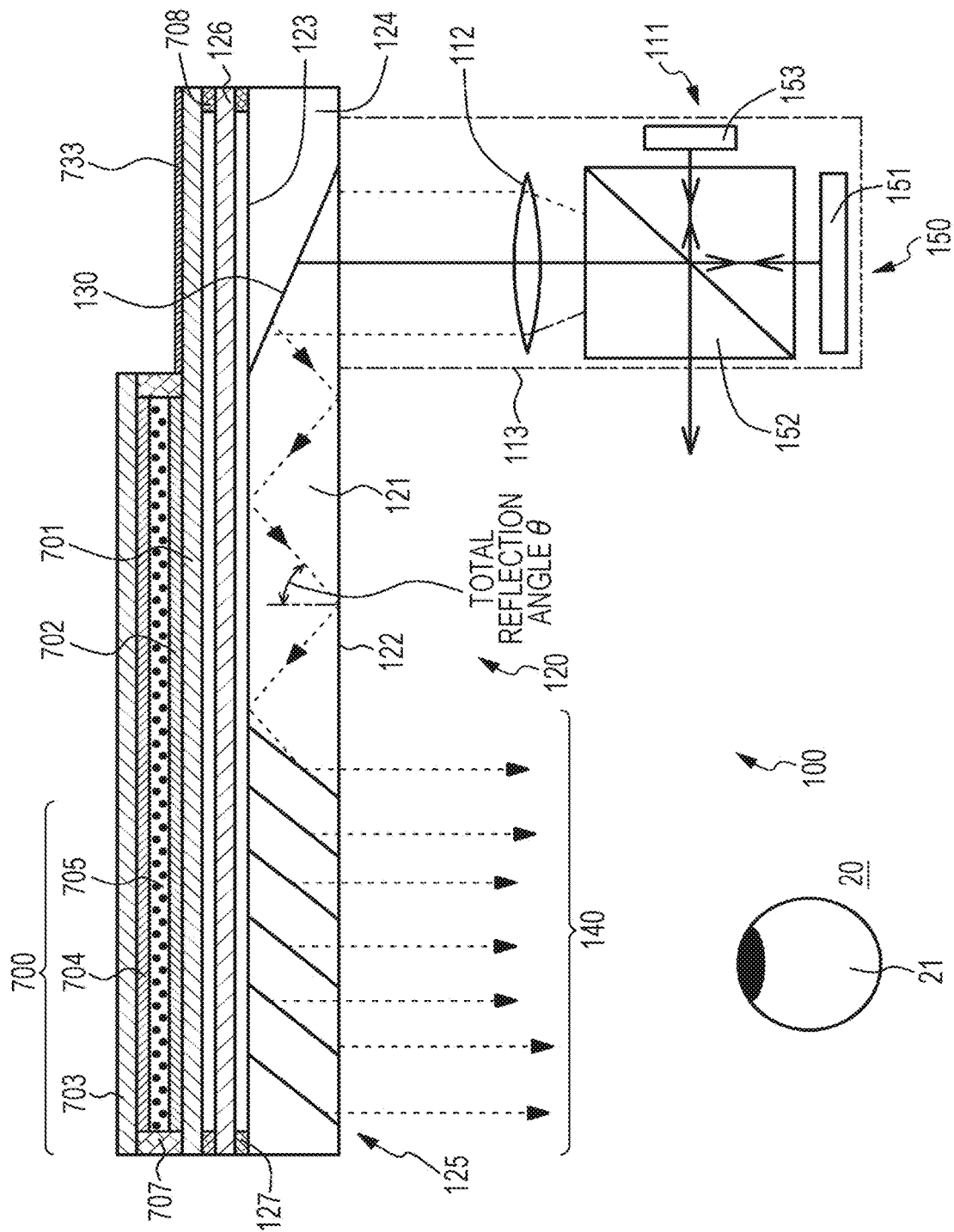

DISPLAY APPARATUS AND INITIAL SETTING METHOD FOR DISPLAY APPARATUS

CROSS REFERENCE TO RELATED APPLICATIONS

This application claims the benefit under 35 U.S.C. § 120 as a continuation application of U.S. application Ser. No. 15/568,624, filed on Oct. 23, 2017, which claims the benefit under 35 U.S.C. § 371 as a U.S. National Stage Entry of International Application No. PCT/JP2016/002058, filed in the Japanese Patent Office as a Receiving Office on Apr. 15, 2016, which claims priority to Japanese Priority Patent Application JP 2015-092857 filed on Apr. 30, 2015, the entire contents of each of which is incorporated herein by reference.

TECHNICAL FIELD

The present disclosure relates to a display apparatus, and more particularly, to a display apparatus used for a head mounted display (HMD) and an initial setting method for an associated display apparatus.

BACKGROUND ART

In recent years, an augmented reality (AR) technique of synthesizing and presenting virtual objects as additional information or various types of information as electronic information to a reality environment (or a portion thereof) has drawn attention. In order to implement the augmented reality technique, for example, a head mounted display as a device of presenting visual information has been studied. In addition, as an application field, work support in the reality environment is expected, and for example, providing of road guidance information, providing of technical information to a technician who performs maintenance or the like, and the like may be exemplified. Particularly, the head mounted display is very useful sine the hands are not occupied. In addition, even in the case of obtaining various types of information and the like when moving outdoors, since various types of information or the like and an external environment configured as a video or an image in sight can be simultaneously recognized, smooth movement can be performed.

A virtual image display device (display apparatus) for allowing an observer to observe a two-dimensional image formed by an image forming device as an augmented virtual image by an virtual image optical system is well known from, for example, JP 2006-162767 A.

As a conceptual view is illustrated in FIG. 30, an image display device 100' is configured to include an image forming device 111 which includes a plurality of pixels arranged in a two-dimensional matrix shape, a collimator optical system 112 which converts light emitted from the pixels of the image forming device 111 into parallel light, and an optical device 120 where the light formed as the parallel light in the collimator optical system 112 is incident, guided, and emitted. The optical device 120 is configured to include a light guide plate 121 where incident light propagates an inner portion thereof by total reflection and, after that, emits, a first deflecting unit 130 (for example, configured with a single-layered light reflecting film) which reflects the light incident on the light guide plate 121 so that the light incident on the light guide plate 121 is totally reflected in the inner portion of the light guide plate 121, and a second deflecting unit 140 (for example, configured with a multi-layered light reflecting film having a multilayer stacked structure) which allows the light propagating the inner portion of the light guide plate 121 by total reflection to be emitted from the light guide plate 121. In addition, for example, if an HMD is configured with the image display device 100', weight reduction and miniaturization of the apparatus can be achieved. Furthermore, with respect to reference numerals indicating other components in FIG. 30, the image display device according to the first embodiment described with reference to FIG. 1 is referred to.

Alternatively, a virtual image display device (display apparatus) using a hologram diffraction grating for allowing an observer to observe a two-dimensional image formed by an image forming device as an augmented virtual image by a virtual image optical system is well known from, for example, JP 2007-094175 A.

As a conceptual view is illustrated in FIG. 31, an image display device 300' is configured to basically include an image forming device 111 which displays an image, a collimator optical system 112, and an optical device 320 where light displayed in the image forming device 111 is incident and the light is guided to a pupil 21 of an observer. Herein, the optical device 320 is configured to include a light guide plate 321 and first and second diffraction grating members 330 and 340 which are configured with reflective volume hologram diffraction gratings installed on the light guide plate 321. In addition, light emitted from pixels of the image forming device 111 is incident on the collimator optical system 112, and a plurality of parallel light having different angles of incidence to the light guide plate 321 is generated by the collimator optical system 112 to be incident on the light guide plate 321. The parallel light is incident from a first surface 322 of the light guide plate 321 to be emitted. On the other hand, the first and second diffraction grating members 330 and 340 are attached to a second surface 323 of the light guide plate 321 which is parallel to the first surface 322 of the light guide plate 321. Furthermore, with respect to reference numerals indicating other components in FIG. 31, the image display device according to the third embodiment described with reference to FIG. 12 is referred to.

In addition, in the image display devices 100' and 300', the virtual image is formed based on the image, so that the observer can view the image of the outside world and the formed virtual image in an overlapped manner.

However, in a case where the surrounding environment where the image display device 100' or 300' is placed is very bright or according to contents of the formed virtual image, there may be a problem in that sufficient contrast is not provided to the virtual image observed by the observer. Therefore, a solution for solving the problem, namely, a virtual image display device (display apparatus) having a light regulating device is well known from, for example, JP 2012-252091 A.

CITATION LIST

Patent Literature

[PTL 1]
JP 2006-162767 A
[PTL 2]
JP 2007-094175 A
[PTL 3]
JP 2012-252091 A

SUMMARY

Technical Problem

Herein, the display apparatus is often demanded to allow the observer using the display apparatus to safely behave in the reality environment while securely recognizing the external environment.

Therefore, a first object of the present disclosure is to provide a display apparatus having configuration and structure capable of providing high contrast to a virtual image observed by an observer and capable of allowing the observer using the display apparatus to safely behave in a reality environment while securely recognizing an external environment. In addition, a second object of the present disclosure is to provide an initial setting method for an associated display apparatus.

Solution to Problem

A display device according to an embodiment of the present disclosure includes: a layer including a first region and a second region, wherein the first region and the second region are configured to be visible to a user of the display device; and circuitry configured: to control displaying a computer generated image on an optical device overlapping the layer and to control a first transmittance of the first region of the layer to be lower than a second transmittance of the second region of the layer such that: a visibility, through the first region, of the computer generated image is increased and a visibility, through the second region, of an environment opposite the user relative to the display device is higher than a visibility, through the first region, of the environment opposite the user relative to the display device.

Alternatively or additionally, a method for controlling transmittance of a display device comprises: controlling a first transmittance of a first region of a layer of the display device to be lower than a second transmittance of a second region of the layer of the display device such that: a visibility, through the first region, of a computer generated image displayed on an optical device overlapping the layer is increased and a visibility, through the second region, of an environment opposite the user relative to the display device is higher than a visibility, through the first region, of the environment opposite the user relative to the display device, wherein the first region and the second region are configured to be visible to a user of the display device.

Alternatively or additionally, a computer-readable medium storing instructions that, when executed by a computer, perform a method for controlling transmittance of a display device, and the method comprises: controlling a first transmittance of a first region of a layer of the display device to be lower than a second transmittance of a second region of the layer of the display device such that: a visibility, through the first region, of a computer generated image displayed on an optical device overlapping the layer is increased and a visibility, through the second region, of an environment opposite the user relative to the display device is higher than a visibility, through the first region, of the environment opposite the user relative to the display device, wherein the first region and the second region are configured to be visible to a user of the display device.

Advantageous Effects of Invention

In the display apparatus according to an embodiment of the present disclosure, when the virtual image is formed in a portion of the virtual image forming region based on the light emitted from the image forming device, since the light regulating device is controlled so that the light shielding ratio of the virtual image projection region of the light regulating device where the projection image of the virtual image to the light regulating device is included is higher than the light shielding ratio of the other region of the light regulating device, high contrast can be provided to the virtual image observed by the observer, and since the high light shielding ratio region is narrow, the observer using the display apparatus can securely and safely recognize the external environment. In the initial setting method for the display apparatus according to an embodiment of the present disclosure, since the virtual image of the test pattern and the high light shielding ratio region of the light regulating device are allowed to be moved relative to each other so that the virtual image of the test pattern observed by the observer and the high light shielding ratio region of the light regulating device observed by the observer overlap each other, for example, even in a case where the observer using the display apparatus is replaced, initialization of the position of the virtual image projection region of the light regulating device where the projection image of the virtual image to the light regulating device is included can be accurately performed. Furthermore, the effect disclosed in this specification is exemplary but not limited, and in addition, there may be additional effects.

BRIEF DESCRIPTION OF DRAWINGS

FIG. 25 is a conceptual view of an image display device in still another modification example of the display apparatus according to the ninth embodiment.

DESCRIPTION OF EMBODIMENTS

Figure 1:
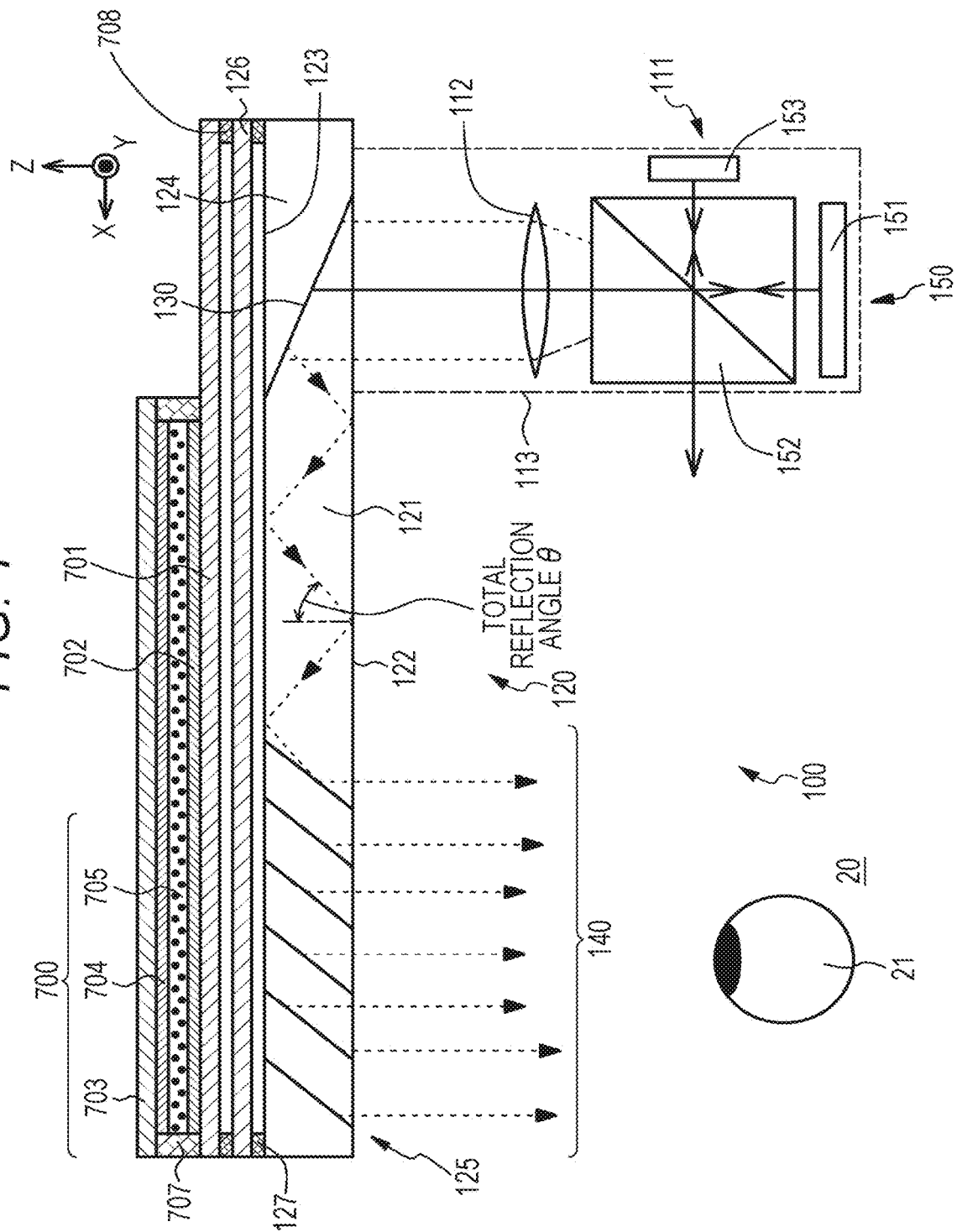
FIG. 1 is a conceptual view of an image display device in a display apparatus according to a first embodiment.

Herein, the present disclosure will be described based on embodiments with reference to the drawings, but the present disclosure is not limited to the embodiment and various numeric values and materials in the embodiment are exemplary ones. Furthermore, the description will be made in the following order.

1. Overall Description of Display Apparatus According to Present Disclosure and Initial Setting Method for Display Apparatus According to Present Disclosure
2. First Embodiment (Display Apparatus According to Present Disclosure and Initial Setting Method for Display Apparatus According to Present Disclosure)
2. First Embodiment (Display Apparatus According to Present Disclosure, First-A-Structure Optical Device, First-Configuration Image Forming Device)
3. Second Embodiment (Modification of Display Apparatus According to First Embodiment, First-A-Structure Optical Device, Second-Configuration Image Forming Device)
4. Third Embodiment (Another Modification of Display Apparatus According to First Embodiment, First-B-Structure Optical Device, First-Configuration Image Forming Device)
5. Fourth Embodiment (Still Another Modification of Display Apparatus According to First Embodiment, First-B-Structure Optical Device, Second-Configuration Image Forming Device)
6. Fifth Embodiment (Modification of First to Fourth Embodiment)
7. Sixth Embodiment (Another Modification of First to Fourth Embodiment, Second-Structure Optical Device, Second-Configuration Image Forming Device)
8. Seventh Embodiment (Modification of First to Sixth Embodiment)
9. Eighth Embodiment (Another Modification of First to Sixth Embodiment)
10. Ninth Embodiment (Modification of First to Eighth Embodiment)
11. Tenth Embodiment (Modification of First to Ninth Embodiment)
12. Eleventh Embodiment (Modification of Tenth Embodiment)
13. Twelfth Embodiment (Initial Setting Method for Display Apparatus According to Present Disclosure)
14. Others <Overall Description of Display Apparatus According to Present Disclosure and Initial Setting Method for Display Apparatus According to Present Disclosure>

In a display apparatus according to an embodiment of the present disclosure, a "projection image of a virtual image to a light regulating device" specifically denotes a projection image (that is, background of a virtual image) of a virtual image to the light regulating device when an observer views the virtual image (that is, when the pupil of the observer is used as a reference). In an initial setting method for the display apparatus according to an embodiment of the present disclosure, a test pattern may basically have an arbitrary shape, and, specifically, for example, characters or symbols displayed in a central portion and four corners of a virtual image forming region of an optical device may be exemplified. In addition, a virtual image of the test pattern and a high light shielding ratio region of the light regulating device are allowed to be moved relative to each other. Specifically, an image signal of the test pattern may be processed so that a position of the virtual image of the test pattern in the optical device can be moved in units of pixel, a high light shielding ratio region of the light regulating device may be processed to be moved by using a light shielding ratio varying minimum unit region (described later) of the light regulating device as a movement unit, or a combination of these processes may be used. In order to move the virtual image of the test pattern and the high light shielding ratio region of the light regulating device relative to each other, the observer may manually perform manipulation. Specifically, the observer may manually perform by manipulating a switch, a button, a dial, a slider, a knob, and the like. The relative movement includes movement in the X-axis direction, movement in the Y-axis direction, rotational movement, expansion, reduction, and deformation, described later. In the light regulating device, the position of the virtual image projection region is not fixed but it is changed depending on the position of the virtual image, and in addition, the number of virtual image projection regions is also changed depending on the number of virtual images.

In some embodiment, in the initial setting method for the display apparatus according to an embodiment of the present disclosure, as a reference of a movement amount when the virtual image of the test pattern and the high light shielding ratio region of the light regulating device are moved relative to each other, the position relationship between the formation position of the virtual image in the optical device and the position of the virtual image projection region of the light regulating device may be configured to be corrected. Specifically, the position relationship between the formation position of the virtual image in the optical device and the position of the virtual image projection region of the light regulating device may be corrected based on a processed amount of the image signal when the image signal of the test pattern is processed so that the position of the virtual image of the test pattern in the optical device is moved in units of a pixel, based on a process of moving the high light shielding ratio region of the light regulating device by using the minimum unit region as a unit of movement, or based on a combination of these processes. Namely, the formation position of the virtual image in the optical device may be fixed and the position of the virtual image projection region of the light regulating device may be moved; the position of the virtual image projection region of the light regulating device may be fixed and the formation position of the virtual image in the optical device may be moved; or these configurations may be combined.

In some embodiment, in the initial setting method for the display apparatus according to an embodiment of the present disclosure including the above-described preferred embodiment, in addition, the light shielding ratio of the other region of the light regulating device at the time of operation of the light regulating device may be configured to be determined. Furthermore, the light shielding ratio is a kind of an initial value determined by the observer.

In addition, in some embodiment, in the initial setting method for the display apparatus according to an embodiment of the present disclosure including the above-described various preferred embodiments, in addition, at the time of operation of the light regulating device, the light shielding ratio of the virtual image projection region of the light regulating device may be configured to be determined. Furthermore, the light shielding ratio is a kind of an initial value determined by the observer. In addition, the value of the light shielding ratio may be constant, or as described later, the value may be changed depending on illuminance of the environment where the display apparatus is placed.

Moreover, in some embodiment, in the initial setting method for the display apparatus according to an embodiment of the present disclosure including the above-described various preferred embodiments, in a case where a virtual rectangle circumscribing the virtual image formed in the optical device is considered, when lateral and longitudinal lengths of the virtual rectangle are denoted by $L_{1-T}$ and $L_{1-L}$, respectively, and when the shape of the virtual image projection region of the light regulating device is defined as a shape of a rectangle having lateral and longitudinal lengths of $L_{2-T}$ and $L_{2-L}$, a value of $L_{2-T}/L_{1-T}$ and the $L_{2-L}/L_{1-L}$ may also be determined. The determination is performed by the observer.

In the display apparatus in the initial setting method for the display apparatus according to an embodiment of the present disclosure including the above-described various preferred embodiments or the display apparatus according to an embodiment of the present disclosure (hereinafter, in some cases, these are collectively referred to as a "display apparatus or the like according to an embodiment of the present disclosure"), at the time of operation of the light regulating device, the light shielding ratio of the other region of the light regulating device is preferably, for example, 0.95 or less when the light shielding ratio of the virtual image projection region of the light regulating device where the projection image of the virtual image to the light regulating device is included is defined to be "1". Alternatively, the light shielding ratio of the other region of the light regulating device is preferably, for example, 30% or less.

In the display apparatus or the like according to an embodiment of the present disclosure including the above-described preferred embodiments, at the time of operation of the light regulating device, the light shielding ratio of the virtual image projection region of the light regulating device is preferably, for example, in a range of 35% to 99%. The light shielding ratio of the virtual image projection region may be constant or may be changed depending on the illuminance of the environment where the display apparatus is placed. In some embodiment, in the latter case, the light shielding ratio of the virtual image projection region may be changed by observer's manipulation, or as described later, the display apparatus may include further an illuminance sensor (environment illuminance measurement sensor) which measures the illuminance of the environment where the display apparatus is placed, so that the light shielding ratio of the light regulating device may be configured to be controlled based on a measurement result of the illuminance sensor (environment illuminance measurement sensor).

Moreover, in some embodiment, in the display apparatus or the like according to an embodiment of the present disclosure including the above-described various preferred embodiments, before the virtual image is formed in the optical device based on the light emitted from the image forming device, the light shielding ratio of the virtual image projection region of the light regulating device may be increased. As a time after the light shielding ratio of the virtual image projection region of the light regulating device is increased until the virtual image is formed, 0.5 seconds to 30 seconds may be exemplified. However, the time is not limited to the value. In this manner, since the observer can recognize in advance when and which position of the optical device the virtual image is formed, visibility of the observer with respect to the virtual image can be improved. In some embodiment, the light shielding ratio of the virtual image projection region of the light regulating device may be configured to be sequentially increased as time elapses. Namely, a so-called fade-in state may be configured.

Moreover, in some embodiment, in the display apparatus or the like according to an embodiment of the present disclosure including the above-described various preferred embodiments, in a case where one virtual image in the optical device is formed based on the light emitted from the image forming device and, subsequently, a next virtual image different from the one virtual image is formed, when the area of the virtual image projection region of the light regulating device corresponding to the one virtual image is denoted by $S_1$ and the area of the virtual image projection region of the light regulating device corresponding to the next virtual image is denoted by $S_2$, in a case where $S_2/S_1 < 0.8$ or $1 < S_2/S_1$, the virtual image projection region of the light regulating device where the next virtual image is formed may be a region of the light regulating device where the projection image of the next virtual image to the light regulating device is included, and in a case where $0.8 \leq S_2/S_1 \leq 1$, the virtual image projection region of the light regulating device where the next virtual image is formed may be a region of the light regulating device where the projection image of the one virtual image to the light regulating device is included. Namely, in some embodiment, in the formation of the next virtual image from the formation of the one virtual image, in a case where the area of the virtual image projection region is decreased by 0% to 20%, the virtual image projection region corresponding to the one virtual image may be retained.

Moreover, in the display apparatus or the like according to an embodiment of the present disclosure including the above-described various preferred embodiments, when a virtual rectangle circumscribing the virtual image formed in the optical device is considered, the virtual image projection region of the light regulating device may be configured to be larger than the virtual rectangle. In addition, in this case, when lateral and longitudinal lengths of the virtual rectangle circumscribing the virtual image formed in the optical device are denoted by $L_{1-T}$ and $L_{1-L}$, respectively, and when the shape of the virtual image projection region of the light regulating device is defined as a shape of a rectangle having lateral and longitudinal lengths of $L_{2-T}$ and $L_{2-L}$, the following relationships are preferably satisfied;

$$1.0 \leq L_{2-T}/L_{1-T} \leq 1.5$$

$$1.0 \leq L_{2-L}/L_{1-L} \leq 1.5$$

In a case where the virtual image is not formed, the light shielding ratio of the entire light regulating device may be set to have the same value as that of the light shielding ratio of the other region of the light regulating device. When the forming of the virtual image is ended and the virtual image disappears, the light shielding ratio of the virtual image projection region of the light regulating device where the projection image of the virtual image to the light regulating device is included may be immediately set to have the same value as that of the light shielding ratio of the other region of the light regulating device. However, as time elapses (for example, for 3 seconds), the light shielding ratio of the virtual image projection region may be controlled to have the same value as that of the light shielding ratio of the other region of the light regulating device. Namely, a so-called fade-out state may be configured.

Furthermore, the lateral direction and the longitudinal direction denote a horizontal direction and a vertical direction, respectively, or denote an X-axis direction and a Y-axis direction described later, respectively. In general, in the case of forming a virtual image configured with a character string in the optical device, a region which is higher than a height (vertical direction length or a Y-axis direction length) of the character string is set as a region where the virtual image is to be formed. Specifically, in the case of forming a virtual image configured with a plurality of lines of character strings in the optical device, appropriate line spacing is set. A sum of the number of pixels corresponding to the line spacing (or, for example, the number of pixels corresponding to ½, ⅓, or the like of the line spacing) and the number of pixels corresponding to the height of the character string may be set as a longitudinal length $L_{1-L}$ of the virtual rectangle. In addition, in the case of forming a virtual image configured with a character string in the optical device, there exist gaps between characters. The value obtained by adding the number of pixels which is an integer multiple of the number of pixels corresponding to the gap to the left and right sides (or front and back sides) of the number of pixels corresponding to the character string may be set as a lateral length $L_{1-T}$ of the virtual rectangle.

Moreover, in some embodiment, in the display apparatus or the like according to an embodiment of the present disclosure including the above-described various preferred embodiments, the light regulating device may be configured to include a first substrate, a second substrate facing the first substrate, a first transparent electrode installed on a facing surface of the first substrate facing the second substrate, a second transparent electrode installed on a facing surface of the second substrate facing the first substrate, and a light regulating layer interposed between the first transparent electrode and the second transparent electrode. In addition, in this case, the first transparent electrode may be configured with a plurality of strip-shaped first transparent electrode segments extending in a first direction, the second transparent electrode may be configured with a plurality of strip-shaped second transparent electrode segments extending in a second direction different from the first direction, and control of the light shielding ratio of a portion of the light regulating device corresponding to an overlap region (light-shielding-ratio-varying minimum unit region of the light regulating device) between the first transparent electrode segments and the second transparent electrode segments may be performed based on control of voltages applied to the first transparent electrode segments and the second transparent electrode segments. Namely, the control of the light shielding ratio can be performed based on a simple matrix scheme. The embodiment where the first direction and the second direction are perpendicular to each other may be exemplified.

Alternatively, in order to control the light shielding ratio of the light-shielding-ratio-varying minimum unit region of the light regulating device, a thin film transistor (TFT) may be installed in each minimum unit region. Namely, the control of the light shielding ratio may be controlled based on an active matrix.

When the number of pixels in the lateral direction of the virtual image forming region of the optical device is denoted by $M_0$ and the number of pixels in the longitudinal direction is denoted by $N_0$, the number of light-shielding-ratio-varying minimum unit regions $M_1 \times N_1$ of the light regulating device may be set so that $M_0 = M_1$ and $N_0 = N_1$, and when $M_1/M_0 = k$ and $N_1/N_0 = k'$ (herein, k and k' are positive integers), $1.1 \leq k$, preferably, $1.1 \leq k \leq 1.5$, more preferably, $1.15 \leq k \leq 1.3$ and $1.1 \leq k'$, preferably, $1.1 \leq k' \leq 1.5$, more preferably, $1.15 \leq k' \leq 1.3$ is satisfied. The value of k and the value of k' may be equal to each other or may be different from each other.

In some embodiment, in the display apparatus or the like according to an embodiment of the present disclosure including the above-described various preferred embodiments and configurations, the frame may be configured to include a front portion disposed in front of the observer, two temples rotatably attached to two ends of the front portion through hinges, and a nose pads, and the light regulating device may be arranged and installed in the front portion. In addition, in some embodiment, the optical device may be attached to the light regulating device. Furthermore, the optical device may be attached to the light regulating device in a closely contacted state or may be attached to the light regulating device with a gap. Moreover, in some embodiment, in this case, the front portion may have a rim, and the light regulating device may be fitted to the rim. Alternatively, at least one of the first substrate and the second substrate may be attached to, for example, the frame. However, the present disclosure is not limited thereto. In addition, in the display apparatus or the like according to an embodiment of the present disclosure including the above-described various preferred embodiments and configurations, the optical device and the light regulating device may be arranged in this order from the observer side, or the light regulating device and the optical device may be arranged in this order.

In the display apparatus or the like according to an embodiment of the present disclosure, the size and position of the virtual image projection region of the light regulating device are determined based on signals for displaying the image in the image forming device. The size of the light regulating device may be equal to, larger than, or smaller than that of the optical device. The virtual image forming region may be positioned within the projection image of the light regulating device. If the one of the substrates constituting the light regulating device is also configured as a member constituting the optical device, the total weight of the display apparatus can be reduced, and there is no problem in that the user of the display apparatus feels discomfort. Furthermore, the other substrate is preferably configured to be thinner than the one substrate.

Moreover, in some embodiment, in the display apparatus or the like according to an embodiment of the present disclosure including the above-described various preferred embodiments and configurations, the optical device may be configured to include;

(b-1) a light guide plate where light incident from the image forming device propagates an inner portion thereof by total reflection and, after that, is emitted toward the observer, (b-2) a first deflecting unit which deflects the light incident on the light guide plate so that the light incident on the light guide plate is totally reflected in the inner portion of the light guide plate, and (b-3) a second deflecting unit which deflects the light propagating the inner portion of the light guide plate by total reflection several times in order to allow the light propagating the inner portion of the light guide plate by total reflection to be emitted from the light guide plate, and the virtual image forming region of the optical device may be configured with the second deflecting unit. Herein, the optical device is, for the convenience, referred to as a "first-structure optical device". Furthermore, the term "total reflection" denotes total internal reflection or total reflection in an inner portion of the light guide plate. The second deflecting unit (virtual image forming region) is positioned within the projection image of the light regulating device. In some embodiment, the second deflecting unit or the first deflecting unit and the second deflecting unit are configured to be covered with the one of the substrates constituting the light regulating device.

In some embodiment, the display apparatus or the like according to an embodiment of the present disclosure may be configured to further include an illuminance sensor (environment illuminance measurement sensor) which measures the illuminance of the environment where the display apparatus is placed, so that the light shielding ratio of the light regulating device may be controlled based on a measurement result of the illuminance sensor (environment illuminance measurement sensor). Alternatively, in some embodiment, the display apparatus may be configured to further include an illuminance sensor (environment illuminance measurement sensor) which measures the illuminance of the environment where the display apparatus is placed, so that luminance of the image formed by the image forming device may be controlled based on a measurement result of the illuminance sensor (environment illuminance measurement sensor). A combination of these configurations may be employed.

Alternatively, in some embodiment, the display apparatus may be configured to further include a second illuminance sensor (for the convenience, in some cases, referred to as a "transmitting light illuminance measurement sensor") which measures the illuminance based on the light passing from the external environment through the light regulating device, so that the light shielding ratio of the light regulating device may be controlled based on a measurement result of the second illuminance sensor (transmitting light illuminance measurement sensor). Alternatively, in some embodiment, the display apparatus may configured to further include a second illuminance sensor (transmitting light illuminance measurement sensor) which measures the illuminance based on the light passing from the external environment through the light regulating device, so that the luminance of the image formed by the image forming device may be controlled based on a measurement result of the second illuminance sensor (transmitting light illuminance measurement sensor). Furthermore, the second illuminance sensor (transmitting light illuminance measurement sensor) is preferably disposed to be closer to the observer side than the optical device. At least two second illuminance sensors (transmitting light illuminance measurement sensors) may be disposed to perform measurement of illuminance based on the light passing through a high light shielding ratio portion and measurement of illuminance based on the light passing through a low light shielding ratio portion. A combination of these configurations may be employed. In addition, a combination of the configuration and a configuration where control is performed based on a measurement result of the illuminance sensor (environment illuminance measurement sensor) may be employed.

The illuminance sensors (environment illuminance measurement sensors and transmitting light illuminance measurement sensors) may be configured with well-known illuminance sensors, and control of the illuminance sensors may be performed based on a well-known control circuit.

The highest light transmittance of the light regulating device may be configured to be 50% or more, and the lowest light transmittance of the light regulating device may be configured to be 30% or less. Furthermore, as an upper limit value of the highest light transmittance of the light regulating device, 99% may be exemplified, and as a lower limit value of the lowest light transmittance of the light regulating device, 1% may be exemplified. Herein, there is a relationship of (light transmittance)=1−(light shielding ratio).

In some cases, the light passing through the light regulating device may be configured be colored in a desired color by the light regulating device. In addition, in this case, in some embodiment, the color colored by the light regulating device may be configured to be variable. Alternatively, in some embodiment, the color colored by the light regulating device may be configured to be fixed. Furthermore, in the former case, in some embodiment, for example, the light regulating device colored in red, the light regulating device colored in green, and the light regulating device colored in blue may be configured to be stacked. In addition, in the latter case, although the color is not limited to the color colored by the light regulating device, brown may be exemplified.

In addition, in some cases, in some embodiment, the light regulating device may be configured to be detachably arranged and installed. In order to detachably arrange and install the light regulating device, for example, the light regulating device may be attached to, for example, the frame by using a screw made of a transparent plastic. Alternatively, a groove may be cut in the frame, and the light regulating device may be engaged with the groove. Alternatively, a magnet may be attached to the frame, so that the light regulating device may be attached to the frame. A slide portion may be installed in the frame, and the light regulating device may be fitted to the slide portion. In addition, a connector may be attached to the light regulating device, and the light regulating device may be electrically connected through the connector and the wiring line to a control circuit (for example, included in the control device for controlling the image forming device) for controlling the light shielding ratio (light transmittance) of the light regulating device. The light regulating device may be configured to be curved.

In some embodiment, the light regulating device may be configured with a light shutter using color change of a substance generated by an oxidation/reduction reaction of an inorganic or organic electrochromic material. Specifically, in some embodiment, the light regulating layer may be configured to contain an inorganic or organic electrochromic material. Moreover, in some embodiment, the light regulating layer may be configured to have a stacked structure of inorganic electrochromic material layers of $WO_3$ layer/$Ta_2O_5$ layer/$Ir_xSn_{1-x}O$ layer from the second transparent electrode side. Alternatively, in some embodiment, the light regulating layer may be configured to have a stacked structure of inorganic electrochromic material layers of $WO_3$ layer/$Ta_2O_5$ layer/$IrO_x$ layer. Instead of the $WO_3$ layer, an $MoO_3$ layer or a $V_2O_5$ layer may be used. In addition, instead of the $IrO_x$ layer, a $ZrO_2$ layer or a zirconium phosphate layer may be used. Alternatively, prussian blue complex/nickel-substituted prussian blue complex or the like may be used. As an organic electrochromic material, for example, electrochromic materials disclosed in JP 2014-111710 A or JP 2014-159385 A may be used. Alternatively, in some structure, a first transparent electrode and a second transparent electrode are installed, and a first electrochromic material layer and a second electrochromic material layer are interposed between the first transparent electrode and the second transparent electrode. The first electrochromic material layer is configured with, for example, prussian blue complex, and the second electrochromic material layer is configured with, for example, nickel-substituted prussian blue complex.

Alternatively, in some embodiment, the light regulating device may be a light shutter configured with an electrophoretic dispersion liquid made of a number of charged electrophoretic particles and a dispersion medium of which color is different from the color of the electrophoretic particles or a light shutter according to an electrodeposition method (electrodeposition electric-field precipitation) utilizing an electrodeposition/dissociation phenomenon occurring according to a reversible oxidation/reduction reaction of metals (for example, silver particles). Namely, the light regulating layer may also be configured to contain an electrolyte containing metal ions. Alternatively, a light shutter for controlling the light shielding ratio (light transmittance) according to an electrowetting phenomenon may be used. Moreover, the light regulating device may be configured with a light shutter where the light regulating layer is configured with a liquid crystal material layer. Specifically, although a material constituting the light regulating layer is not limited, a TN (twisted nematic) type liquid crystal material or an STN (super twisted nematic) type liquid crystal material may be exemplified.

Herein, the electrophoretic dispersion liquid is configured to a number of charged electrophoretic particles and a dispersion medium of which color is different from the color of the electrophoretic particles. For example, in the case (a so-called solid electrode configuration) where patterning is performed on the first transparent electrode and patterning is not performed on the second transparent electrode and in a case where the electrophoretic particles are negatively charged, if a relatively negative voltage is applied to the first transparent electrode and a relatively positive voltage is applied to the second transparent electrode, the negatively charged electrophoretic particles migrate to cover the second transparent electrode. Therefore, the light shielding ratio of the light regulating device has a high value. On the other hand, on the contrary, if a relatively positive voltage is applied to the first transparent electrode and a relatively negative voltage is applied to the second transparent electrode, the electrophoretic particles migrate to cover the first transparent electrode. Therefore, the light shielding ratio of the light regulating device has a low value. By appropriately performing the voltage application to the transparent electrodes, control of the light shielding ratio of the light regulating device can be performed. The voltages may be a DC voltage or may be an AC voltage. The shape of the patterned first transparent electrode may be any shape capable of optimizing the value of the light shielding ratio of the light regulating device when the electrophoretic particles migrate to cover the first transparent electrode and the light shielding ratio of the light regulating device has a low value, and the shape may be determined by performing various tests. As necessary, an insulating layer may be formed on the transparent electrode. As a material constituting an associated insulating layer, for example, a colorless transparent insulating resin may be exemplified, and specifically, for example, an acrylic resin, an epoxy resin, a fluorine resin, a silicon resin, a polyimide resin, a polystyrene resin, and the like may be exemplified.

As a ratio of the electrophoretic particles with respect to the dispersion liquid (dispersion medium) in the electrophoretic dispersion liquid, 0.1 parts by mass to parts by mass, preferably, 1 part by mass to 10 parts by mass of the electrophoretic particles with respect to the 100 parts by mass of the dispersion liquid (dispersion medium) may be exemplified. As a dispersion liquid (dispersion medium) which disperses the electrophoretic particles, a highly-insulating, colorless transparent liquid, specifically, a non-polar dispersion medium, more specifically, an aliphatic hydrocarbon, an aromatic hydrocarbon, a halogenated hydrocarbon, a silicon oil, and the like may be exemplified. Herein, as an aliphatic hydrocarbon, pentane, hexane, cyclohexane, heptane, octane, nonane, decane, dodecane, ligroin, solvent naphtha, kerosene, normal paraffin, ISO paraffine, and the like are exemplified. In addition, as an aromatic hydrocarbon, benzene, toluene, xylene, alkyl benzene, and the like are exemplified. As a silicon oil, various dimethyl polysiloxanes including a modified silicone oil may be exemplified. More specifically, Isopar G, H, L, M, EXXSOL D30, D40, D80, D110, D130 manufactured by Exxon Mobil Corporation, IP SOLVENT 1620, 2028, 2835 manufactured by Idemitsu Petrochemical Co., Ltd., Shellsol 70, 71, 72, A, AB manufactured by Shell Chemicals Japan Ltd., Nafutezoru L, M, H manufactured by Nippon Oil Co., Ltd., and the like may be exemplified. Furthermore, these may be used alone or in a combination of two or more types thereof.

A structure confining the electrophoretic dispersion liquid in a microcapsule may be employed. The microcapsule can be obtained by a well-known method such as an interfacial polymerization method, an in-situ polymerization method, and a coacervation method. A material constituting the microcapsule is demanded to have a property of sufficiently transmitting the light, and thus, specifically, a urea-formaldehyde resin, a melamine-formaldehyde resin, a polyester resin, a polyurethane resin, a polyamide resin, a polyethylene resin, a polystyrene resin, a polyvinyl alcohol resin, gelatin, a copolymer thereof, and the like may be exemplified. A method of arranging the microcapsule on the substrate is not particularly limited. For example, an inkjet method may be exemplified. Furthermore, for the purpose of preventing a shift in position of the microcapsule arranged on the substrate, the microcapsule may be fixed on the substrate by using a light transmissive resin binder. As a light transmissive resin binder, a water-soluble polymer, specifically, for example, polyvinyl alcohol, polyurethane, polyester, an acrylic resin, a silicone resin, and the like may be exemplified.

Although a charging control agent is not particularly necessary to be used for the electrophoretic particles, in the case of use a positive charging control agent in order to positively charge the electrophoretic particles, as a positive charging control agent, for example, nigrosine dyes such as Nigrosine Base EX (Orient Chemical Industries Co., Ltd.), quaternary ammonium salts such as P-51 (Orient Chemical Industries Co., Ltd.), Copy Charge PXVP435 (manufactured by Hoechst Japan Ltd.), alkoxylated amine, alkyl amide, molybdic acid chelate pigments, imidazole compounds such as PLZ1001 (Shikoku Chemicals Corporation), Transparent or white onium compounds, and the like may be exemplified. Furthermore, as an onium compound, a primary to quaternary onium compound can be freely selectable; an ammonium compound, a sulfonium compound, or a phosphonium compound may be selected; a substituent bonded to for example, nitrogen, sulfur, or phosphorus atom is an alkyl group or an aryl group; as a salt, a halogen element represented by chlorine or a hydroxy group, or a carboxylic acid group is very suitable as a counter ion; but the material is not limited thereto. Among them, primary to tertiary amine salts or a quaternary ammonium salt are particularly preferred. In case of using a negative charging control agent in order to negatively charge the electrophoretic particles, as a negative charging control agent, for example, a metal complex such as BONTRON S-22, BONTRON S-34, BONTRON E-81, BONTRON E-84 (heretofore, manufactured by Orient Chemical Industries Co., Ltd.), and Spiron Black TRH (manufactured by Hodogaya Chemical Co., Ltd.), a quaternary ammonium salt such as a thioindigo pigment or Copy Charge NXVP434 (manufactured by Hoechst Japan Ltd.), a calixarene compound such as BONTRON E-89 (manufactured by Orient Chemical Industries Co., Ltd.), a boron compound such as LR147 (manufactured by Japan Carlit Co., Ltd.), a fluorine compound such as magnesium fluoride or carbon fluoride, well-known metal soap such as aluminum stearate, calcium stearate, aluminum lauric acid, barium lauric acid, soda oleic acid, zirconium octylate, or cobalt naphthenate, or a salicylic acid-based metal complex and a phenolic condensate of an azine compound may be exemplified. As an addition amount of the charging control agent, 100 parts by mass to 300 parts by mass with respect to 100 parts by mass of the electrophoretic particles may be exemplified.

As a dispersion liquid (dispersion medium) constituting the electrophoretic dispersion liquid, nonionic surfactants such as sorbitan fatty acid esters (for example, sorbitan monooleate, sorbitan monolaurate, sorbitan sesquioleate, sorbitan trioleate, or the like); polyoxyethylene sorbitan fatty acid esters (for example, polyoxyethylene sorbitan monostearate, polyoxyethylene sorbitan monooleate, or the like); polyethylene glycol fatty acid ester (for example, polyoxyethylene monostearate, polyethylene glycol diisostearate, or the like); polyoxyethylene alkyl phenyl ethers (for example, polyoxyethylene nonylphenyl ether, polyoxyethylene octyl phenyl ether, or the like); aliphatic diethanolamides; and the like may be used. In addition, as a polymeric dispersant, for example, a styrene-maleic acid resin, a styrene-acrylic resin, a rosin, urethane polymer compound BYK-160, 162, 164, or 182 (manufactured by BYK Chemie), urethane-based dispersant EFKA-47, LP-4050 (manufactured by EFKA Co.), polyester based polymer compound Solsperse 24000 (manufactured by Zeneca), aliphatic diethanolamide based polymer compound Solsperse 17000 (manufactured by Zeneca), and the like may be exemplified. In addition, as other polymeric dispersants, monomers such as lauryl methacrylate, stearyl methacrylate, 2-ethylhexyl methacrylate, or cetyl methacrylate capable of forming a portion of solvated in a dispersion medium, monomers such as methyl methacrylate, ethyl methacrylate, isopropyl methacrylate, styrene, or vinyl toluene capable of forming a portion which is difficult to solvate in the dispersion medium, a random copolymer of a monomer having a polar functional group, a graft copolymer disclosed in JP 3-188469 A, and the like may be exemplified. As a monomer having a polar functional group, monomers such as acrylic acid, methacrylic acid, itaconic acid, fumaric acid, maleic acid, styrenesulfonic acid having an acidic functional group; monomers such as dimethyl amino ethyl methacrylate, diethylaminoethyl methacrylate, vinyl pyridine, vinylpyrrolidine, vinyl piperidine, vinyl lactam having a basic functional group; salts thereof; styrene-butadiene copolymers; block copolymers of styrene and a long chain alkyl methacrylate as disclosed in JP 60-10263 A; and the like may be exemplified. In addition, the dispersant such as a graft copolymer disclosed in JP 3-188469 A may be added. As an addition amount of the dispersant, 0.01 parts by mass to 5 parts by mass with respect to 100 parts by mass of the electrophoretic particles may be exemplified. In order to further effectively generate the electrophoresis of the electrophoretic particles, an ionic surfactant may be added. As a specific example of the anionic surfactant, sodium dodecyl benzene sulfonic acid, sodium dodecyl sulfate, sodium alkyl naphthalene sulfonic acid, dialkylsulfosuccinic sodium succinate, and the like may be exemplified. In addition, as a specific example of the cationic surfactant, alkyl benzene dimethyl ammonium chloride, alkyl trimethyl ammonium chloride, distearyl ammonium chloride, and the like may be exemplified. In addition, a soluble ionic additive may be added to a non-polar dispersion medium such as a trifluorosulfonyl imide salt, a trifluoroacetate, a trifluoro sulfate. As an added amount of the ionic additive, 1 part by mass to 10 parts by mass with respect to 100 parts by mass of electrophoretic particles may be exemplified.

As electrophoretic particles, carbon black (black), various metal oxides, phthalocyanine dyes (cyan), direct blue 199 (project cyan), magenta 377 (magenta), reactive red 29 (magenta), reactive red 180 (magenta), and azo dyes (yellow, for example, yellow 104, Ilford AG, Rue de l'Industrie, CH-1700 Fribourg, Switzerland) may be exemplified.

In a case where the light regulating layer is configured with an electrolyte layer containing metal ions, preferably, the metal ions are silver ions, and the electrolyte contains at least one type salt (referred to as a "supporting electrolyte salt") selected from a group including LiX, NaX, and KX (herein, X is a fluorine atom, a chlorine atom, a bromine atom, or an iodine atom).

The electrolyte contains metal ions as a coloring material which imparts color by electrochemical reduction/oxidation and precipitation/dissolution associated with the reduction/oxidation. In addition, by the electrochemical precipitation/dissolution reaction for the metal ions, coloring and decoloring are made, so that the light shielding ratio of the light regulating device is changed. In other words, the operation of the light regulating device in the display apparatus may be referred to as a so-called operation of reversibly generating precipitation of a metal according to electrolytic plating and elution reaction of the precipitated metal. In this manner, as metal ions capable of achieving coloring and decoloring by electrochemical precipitation/dissolution, although not particularly limited, besides the above-described ions of silver (Ag), ions of bismuth (Bi), copper (Cu), sodium (Na), lithium (Li), iron (Fe), chromium (Cr), nickel (Ni), cadmium (Cd) or a combination of these ions may be exemplified, and among them, particularly preferred metal ions are ions of silver (Ag) and ions of bismuth (Bi). With respect to the silver or bismuth, a reversible reaction can be easily processed, and moreover, a degree of discoloration at the time of precipitation is high.

In addition, the metal ions are contained in the electrolyte, and specifically, a material containing the metal ions is dissolved in the electrolyte. More specifically, as a material containing the metal ions, for example, at least one type of silver halide such as AgF, AgCl, AgBr, and AgI, preferably, AgI or AgBr may be exemplified, and a material containing the metal ions is dissolved in the electrolyte. As a concentration of the silver halide, for example, 0.03 to 2.0 mol/liter may be exemplified.

An electrolyte containing the metal ions is sealed between the first substrate and the second substrate, and herein, the electrolyte may be configured with an electrolytic solution or a polymer electrolyte. Herein, as an electrolytic solution, a material obtained by incorporating a metal salt or an alkyl quaternary ammonium salt in a solvent may be used. Specifically, as an electrolyte, water, ethyl alcohol, isopropyl alcohol, 2-ethoxyethanol, 2-methoxy ethanol, propylene carbonate, dimethyl carbonate, ethylene carbonate, γ-butyrolactone, acetonitrile, sulfolane, dimethoxyethane, dimethylformamide (DMF), diethylformamide (DEF), dimethyl sulfoxide (DMSO), N,N-dimethylacetamide (DMAA), N-methyl propionic acid amide (MPA), N-methyl pyrrolidone (MP), dioxolane (DOL), ethyl acetate (EA), tetrahydrofuran (THF), methyltetrahydrofuran (MeTHF), or mixtures thereof may be used. In addition, as a matrix (base material) polymer used for a polymer electrolyte, a polymer material having a repeating unit of alkylene oxide, alkyleneimine, or alkylene sulfide in a main backbone unit, a side chain unit, or a main backbone unit and a side chain unit, or a copolymer containing a plurality of these different units may be exemplified. Alternatively, a polymethyl methacrylate derivative, polyvinylidene fluoride, polyvinylidene chloride, polyacrylonitrile, polycarbonate derivative, or mixtures thereof may be exemplified. In a case where the electrolyte is a polymer electrolyte, the electrolyte may be a single layer or may have a stacked structure where a plurality of polymer electrolyte layers is stacked.

A matrix polymer which is swollen by addition of water or an organic solvent may also be used. Particularly, in a case where a response speed or the like is demanded, by adding the water or the organic solvent to the matrix polymer, the metal ions contained in the electrolyte are allowed to be more easily moved.

Furthermore, in a case where hydrophilicity is demanded according to characteristics of a matrix polymer or a desired electrochemical reaction, water, ethyl alcohol, isopropyl alcohol, or a mixture thereof is preferably added; and in a case where hydrophobicity is demanded, propylene carbonate, dimethyl carbonate, ethylene carbonate, γ-butyrolactone, acetonitrile, sulfolane, dimethoxyethane, ethyl alcohol, isopropyl alcohol, dimethyl formamide, dimethyl sulfoxide, dimethylacetamide, n-methylpyrrolidone, or a mixture thereof is preferably added.

As described above, coloring and decoloring of the light regulating device (specifically, an electrodeposition type light regulating device) occur according to the precipitation of the metal on the second transparent electrode and the dissolution of the metal in the electrolyte based on the voltage application to the first transparent electrode and the second transparent electrode. Herein, in general, the surface of the layer (metal layer) made of metals precipitated on the second transparent electrode which is in contact with the electrolyte becomes uneven so that the surface appears to be blackish, and the surface of the metal layer which is in contact with the second transparent electrode becomes in a mirror surface shape. Therefore, in the case of being used as a light regulating device, the surface of the metal layer which is in contact with the electrolyte is preferably configured to face the observer side. In other words, in some embodiment, the first substrate is preferably configured to be closer to the observer side than the second substrate.

As described above, a salt (supporting electrolyte salt) containing ion species different from the metal ion species to be precipitated or dissolved is added to the electrolyte, so that the electrochemical precipitation/dissolution reaction can be more effectively and stably performed. As a supporting electrolyte salt, the above-described lithium salt, potassium salt, sodium salt, or tetraalkyl quaternary ammonium salt may be exemplified. Herein, as a lithium salt, specifically, LiCl, LiBr, LiI, LiBF$_4$, LiClO$_4$, LiPF$_6$, LiCF$_3$SO$_3$, and the like may be exemplified. In addition, as a potassium salt, specifically, KCl, KI, KBr, and the like may be exemplified. Furthermore, as a sodium salt, specifically, NaCl, NaI, NaBr, and the like may be exemplified. In addition, as a tetraalkyl quaternary ammonium salt, specifically, a boric fluoride tetraethyl ammonium salt, a perchloric acid tetraethyl ammonium salt, a boric tetrabutylammonium fluoride salt, perchloric acid tetrabutylammonium salt, a tetrabutyl ammonium halide salt, and the like may be exemplified. Furthermore, the alkyl chain length of the above-described quaternary ammonium salt may not be uniform. The supporting electrolyte salt may be added with a concentration of, for example, about ½ or 5 times of a concentration of a material containing the metal ions. In addition, inorganic particles as a colorant may be mixed with the electrolyte as a polymer electrolyte.

In addition, in order to reversibly and efficiently perform an electrochemical reaction, particularly, precipitation/dissolution of metal, at least one of additives such as a growth inhibitor, a stress inhibitor, a brightener, a complexing agent, and a reducing agent may be added to the electrolyte. As an additive, an organic compound containing a group having an oxygen atom or a sulfur atom is preferred; and for example, at least one type selected from a group including thiourea, 1-allyl-2-thiourea, mercaptobenzimidazole, coumarin, phthalic acid, succinic acid, salicylic acid, glycolic acid, dimethyl amine borane (DMAB), trimethylamine borane (TMAB), tartaric acid, oxalic acid and D-glucono-1,5-lactone may be preferably added. Particularly, mercaptobenzimidazole analogous to mercaptoalkyl imidazole is preferred because reversibility can be improved and excellent effects can be obtained in terms of long-term storage stability and high-temperature storage properties by adding the mercaptobenzimidazole.

As a material constituting the transparent first substrate and the transparent second substrate included in the light regulating device, specifically, a transparent glass substrate such as a soda lime glass or a white glass, a plastic substrate, a plastic sheet, or a plastic film may be exemplified. Herein, as a plastic, a cellulose ester such as polyethylene terephthalate, polyethylene naphthalate, polycarbonate, or cellulose acetate, a fluorine polymer such as a copolymer of polyvinylidene fluoride or polytetrafluoroethylene and hexafluoropropylene, a polyether such as polyoxymethylenem, a polyolefine such as polyacetal, polystyrene, polyethylene, polypropylene, or pentene polymer, a polyimide such as polyamide imide or polyether imide, a polyamide, a polyether sulfone, a polyphenylene sulfide, a polyvinylidene fluoride, a tetraacetyl cellulose, a brominated phenoxy, a polyarylate, a polysulfone, and the like may be exemplified. The plastic sheet and the plastic film may have a rigidity that the sheet and the film are not easily bent or may have a flexibility. In a case where the first substrate and the second substrate are configured with a transparent plastic substrate, a barrier layer made of an inorganic material or an organic material may be formed on an inner surface of the substrate.

The first substrate and the second substrate are sealed and adhered at an outer edge by a sealing member. As a sealing member which is also referred as a sealing agent, various resins such as a thermosetting resin, a light-curable resin, a moisture-curable resin, or an anaerobic curable resin, for example, an epoxy resin, a urethane based resin, an acrylic resin, a vinyl acetate resin, an ene-thiol based resin, a silicone based resin, a modified polymer resin, and the like may be used.

As a material constituting the first transparent electrode and the second transparent electrode, specifically, an indium-tin complex oxide (including indium tin oxide (ITO), Sn-doped $In_2O_3$, a crystalline ITO, and an amorphous ITO), fluroine-doped $SnO_2$ (FTO), IFO (F-doped $In_2O_3$), antimony-doped $SnO_2$ (ATO), $SnO_2$, ZnO (including Al-doped ZnO or B-doped ZnO), an indium-zinc complex oxide (indium zinc oxide (IZO)), a spinel type oxide, an oxide having a $YbFe_2O_4$ structure, a conductive polymer such as polyaniline, polypyrole, or polythiophene, and the like may be exemplified, but the material is not limited thereto. In addition, a combination of two or more types thereof may also be used. A first auxiliary electrode (first bus electrode) and a second auxiliary electrode (second bus electrode) of which plane shape is, for example, a shape of a thin line may be installed on the first transparent electrode and the second transparent electrode, and the auxiliary electrodes may be configured with a metal such as gold, silver, copper, aluminum, nickel, titanium or an alloy. Electric resistances of the first auxiliary electrode and the second auxiliary electrode need to be lower than those of the first transparent electrode and the second transparent electrode. The first transparent electrode, the second transparent electrode, the first auxiliary electrode, and the second auxiliary electrode may be formed based on a physical vapor deposition (PVD) method such as a vacuum vapor deposition method or a sputtering method, various chemical vapor deposition (CVD) methods, various coating methods, or the like. Patterning of the auxiliary electrodes and the transparent electrodes may be performed by an arbitrary method such as an etching method, a lift-off method, or methods of using various masks.

The optical device is of a semi-transparent type (see-through type). Specifically, at least the portion of the optical device facing the eye (pupil) of the observer is configured to be semi-transparent (see-through), so that the observer can view the outside scene through the portion of the optical deice and the light regulating device. As described above, the observer observes brightness of the light passing through the light regulating device and the optical device, and the observer may manually control and regulate the light shielding ratio by manipulating a switch, a button, a dial, a slider, a knob, and the like. Alternatively, the observer may control and regulate the light shielding ratio based on a measurement result of the second illuminance sensor (transmitting light illuminance measurement sensor) which measures illuminance based on the light passing from the above-described external environment through the light regulating device. Furthermore, specifically, the control and regulation of the light shielding ratio may be performed by controlling voltages applied to the first transparent electrode and the second transparent electrode. At least two second illuminance sensors (transmitting light illuminance measurement sensors) are arranged, so that measurement of illuminance based on the light passing through a high light shielding ratio portion and measurement of illuminance based on the light passing through a low light shielding ratio portion may be performed. The display apparatus may include one image display device or may include two image display devices. In a case where the display apparatus includes two image display devices, in the one light regulating device and the other light regulating device, respectively, by regulating voltages applied to the first transparent electrode and the second transparent electrode, equalization of the light shielding ratio of the one light regulating device and the light shielding ratio of the other light regulating device can be achieved. The light shielding ratio of the one light regulating device and the light shielding ratio of the other light regulating device may be controlled, for example, based on a measurement result of the second illuminance sensor (transmitting light illuminance measurement sensor) which measures illuminance based on the light passing from the above-described external environment through the light regulating device. Alternatively, the observer may observe brightness of the light passing through the one light regulating device and the one optical device and brightness of the light passing through the other light regulating device and the other optical device, and the observer may manually control and regulate the light shielding ratio by manipulating a switch, a button, a dial, a slider, a knob, and the like. In the case of performing the regulation of the light shielding ratio, a test pattern may be configured to be indicated in the optical device.

In this specification, in some cases, the term "semi-transparent" is used, and the term does not denote that ½ (50%) of incident light is transmitted or reflected, but it denotes that a portion of the incident light is transmitted and the remaining portion is reflected.

As described above, in the first-structure optical device, the first deflecting unit may be configured to reflect the light incident on the light guide plate, and the second deflecting unit may be configured to transmit and reflect the light propagating the inner portion of the light guide plate by total reflection several times. In addition, in this case, the first deflecting unit may be configured to function as a reflecting mirror, and the second deflecting unit may be configured to function as a semi-transparent mirror. Furthermore, the first-structure optical device is, for the convenience, referred to as a "first-A-structure optical device".

In the first-A-structure optical device, the first deflecting unit may be configured with, for example, a light reflecting film (a kind of a mirror) which is made of a metal including an alloy and reflects the light incident on the light guide plate or a diffraction grating (for example, a hologram diffraction grating film) which diffracts the light incident on the light guide plate. Alternatively, the first deflecting unit may be configured with, for example, a multi-layered stacked structure where a plurality of dielectric stacked films is stacked, a semi-transparent mirror, or a polarizing beam splitter. In addition, the second deflecting unit may be configured with a multi-layered stacked structure where a plurality of dielectric stacked films is stacked, a semi-transparent mirror, a polarizing beam splitter, or a hologram diffraction grating film. In addition, the first deflecting unit or the second deflecting unit is arranged and installed in the inner portion of the light guide plate (incorporated in the inner portion of the light guide plate), and in the first deflecting unit, the parallel light incident on the light guide plate is reflected or diffracted so that the parallel light incident on the light guide plate is totally reflected in the inner portion of the light guide plate. On the other hand, in the second deflecting unit, the parallel light propagating the inner portion of the light guide plate by total reflection is reflected or diffracted several times and is emitted from the light guide plate in a parallel light state.

Alternatively, the first deflecting unit may be configured to diffract and reflect the light incident on the light guide plate, and the second deflecting unit may be configured to diffract and reflect the light propagating the inner portion of the light guide plate by total reflection several times. In addition, in some embodiment, in this case, the first deflecting unit and the second deflecting unit may be configured with diffraction grating elements. Moreover, the diffraction grating element is configured as a reflective diffraction grating element or a transmissive diffraction grating element. Alternatively, the one diffraction grating element may be configured as a reflective diffraction grating element, and the other diffraction grating element may be configured as a transmissive diffraction grating element. Furthermore, as a reflective diffraction grating element, a reflective volume hologram diffraction grating may be exemplified. In some cases, the first deflecting unit configured with a reflective volume hologram diffraction grating is, for the convenience, referred to as a "first diffraction grating member", and the second deflecting unit configured with a reflective volume hologram diffraction grating is, for the convenience, referred to as a "second diffraction grating member". In addition, the first-structure optical device is, for the convenience, referred to as an "optical device having a first-B structure".

By the image display device in the present disclosure, displaying of a monochrome (for example, green) image can be performed. In addition, in this case, for example, an angle of view may be divided, for example, by two (more specifically, for example, two-equal division), and the first deflecting unit may be configured by stacking two diffraction grating members corresponding to two divided angles of view. Alternatively, in the case of performing color image display, the first diffraction grating member and the second diffraction grating member may be configured by stacking P diffraction grating layers configured with a reflective volume hologram diffraction grating in order to correspond to diffraction and reflection of P types of light having P different types (for example, P=3, three types of red, green, and blue) of wavelength bands (or, wavelengths). An interference fringe corresponding to one type of wavelength bands (or wavelengths) is formed on each diffraction grating layer. Alternatively, P types of interference fringe may be configured to be formed on the first diffraction grating member or the second diffraction grating member configured with one diffraction grating layer in order to correspond to diffraction and reflection of P types of light having P different types of wavelength bands (or wavelengths). Alternatively, for example, in some structure, a diffraction grating member configured with a diffraction grating layer made of a reflective volume hologram diffraction grating which diffracts and reflects the light having a red wavelength band (or wavelength) may be arranged on the first light guide plate, a diffraction grating member configured with a diffraction grating layer made of a reflective volume hologram diffraction grating which diffracts and reflects the light having a green wavelength band (or wavelength) may be arranged on the second light guide plate, a diffraction grating member configured with a diffraction grating layer made of a reflective volume hologram diffraction grating which diffracts and reflects the light having a blue wavelength band (or wavelength) may be arranged on the third light guide plate, and the first light guide plate, the second light guide plate, and the third light guide plate are stacked with gaps. Alternatively, the angle of view may be divided, for example, by three, and the first diffraction grating member and the second diffraction grating member may be configured by stacking diffraction grating layers corresponding to the angles of view. In addition, by employing these configurations, when the light having each wavelength band (or wavelength) is diffracted and reflected in the first diffraction grating member or the second diffraction grating member, improvement of diffraction efficiency, an increase of a diffraction acceptance angle, and optimization of a diffraction angle can be achieved. A protection member is preferably arranged so that the reflective volume hologram diffraction grating is not in direct contact with the atmosphere.

As a material constituting the first diffraction grating member and the second diffraction grating member, a photopolymer material may be exemplified. The constituent material or the basic structure of the first diffraction grating member and the second diffraction grating member configured with a reflective volume hologram diffraction grating are preferably the same as those of a reflective volume hologram diffraction grating in the related art. The reflective volume hologram diffraction grating denotes a hologram diffraction grating which diffracts and reflects only the first-order diffraction light. The diffraction grating member is configured so that interference fringe is formed over a range from the inner portion to the surface thereof, and a method of forming the associated interference fringe may be the same as the forming method in the related art. Specifically, for example, a member (for example, a photopolymer material) constituting the diffraction grating member may be illuminated with object light from a predetermined first direction of the one side; at the same time, a member constituting the diffraction grating member may be illuminated with reference light from a predetermined second direction of the other side; and interference fringe formed by the object light and the reference light may be recorded in the inner portion of the member constituting the diffraction grating member. By appropriately selecting the predetermined first direction, the predetermined second direction, the wavelength of the object light, and the wavelength of the reference light, a desired pitch of the interference fringe and a desired inclination angle (slant angle) of the interference fringe on the surface of the diffraction grating member can be obtained. The inclination angle of the interference fringe denotes an angle between the surface of the diffraction grating member (or the diffraction grating layer) and the interference fringe. In a case where the first diffraction grating member and the second diffraction grating member are configured as a stacked structure of P diffraction grating layers made of a reflective volume hologram diffraction grating, the stacking of the diffraction grating layers may be performed by separately manufacturing P diffraction grating layers and, after that, stacking (adhering) the P diffraction grating layers by using, for example, a UV curable adhesive. In addition, the P diffraction grating layers may be manufactured by manufacturing one diffraction grating layer by using a photopolymer material having adhesiveness, and after that, sequentially adhering photopolymer materials having adhesiveness to manufacture the diffraction grating layer.

Alternatively, in some embodiment, in the image display device of the present disclosure, the optical device may be configured with a semi-transparent mirror where the light emitted from the image forming device is incident and is emitted toward the pupil of the observer. In some embodiment, the optical device may be configured with a polarizing beam splitter (PBS). The virtual image forming region of the optical device is configured with a semi-transparent mirror or a polarizing beam splitter. In some structure, the light emitted from the image forming device may propagate the air to be incident on the semi-transparent mirror or the polarizing beam splitter. In some structure, for example, the light may propagate the inner portion of a transparent member (specifically, a member made of the same material as a material constituting the light guide plate described later) such as a glass plate or a plastic plate to be incident on the semi-transparent mirror or the polarizing beam splitter. The semi-transparent mirror or the polarizing beam splitter may be attached through the transparent member to the image forming device, or the semi-transparent mirror or the polarizing beam splitter may be attached through a member different from the transparent member to the image forming device. Herein, the optical device is, for the convenience, referred to as a "second-structure optical device". The semi-transparent mirror may be configured with a first deflecting unit in the first-A-structure optical device, for example, a metal including an alloy or may be configured with a light reflecting film (a kind of a mirror) which reflects light or a diffraction grating (for example, a hologram diffraction grating film). Alternatively, in some embodiment, the optical device may be configured with a prism where the light emitted from the image forming device is incident and emitted toward a pupil of the observer.

In some embodiment, in the image display device in the present disclosure including the above-described various preferred embodiments and configurations, the image forming device may be configured to include a plurality of pixels arranged in a two-dimensional matrix shape. Furthermore, the configuration of the image forming device is, for the convenience, referred to as a "first-configuration image forming device".

As a first-configuration image forming device, for example, an image forming device configured with a reflective spatial light modulation device and a light source, an image forming device configured with a transmissive spatial light modulation device and a light source, or an image forming device configured with a light emitting element such as an organic Electro Luminescence (EL) diode, an inorganic EL diode, a light emitting diode (LED), or a semiconductor laser element may be exemplified. Among them, the image forming device configured with a reflective spatial light modulation device and a light source is preferred. As a spatial light modulation device, a light valve, for example, a transmissive or reflective liquid crystal display device such as an Liquid Crystal On Silicon (LCOS), a digital micro mirror device (DMD) may be exemplified, and as a light source, a light emitting element may be exemplified. Moreover, the reflective spatial light modulation device may be configured with a liquid crystal display device and a polarizing beam splitter which reflects a portion of the light from the light source to be guided to the liquid crystal display device and which transmits a portion of the light reflected by the liquid crystal display device to be guided to the optical system. As light emitting elements constituting the light source, a red light emitting element, a green light emitting element, a blue light emitting element, and a white light emitting element may be exemplified. Alternatively, white light may be obtained by performing color-mixing and luminance equalization of red light, green light, and blue light emitted from the red light emitting element, the green light emitting element and the blue light emitting element by using a light pipe. As a light emitting element, for example, a semiconductor laser element, a solid laser, or an LED may be exemplified. The number of pixels may be determined based on the specification demanded for the image display device, and as a specific value of the number of pixels, 320×240, 432×240, 640×480, 1024×768, 1920×1080, and the like may be exemplified.

Alternatively, in some embodiment, in the image display device in the present disclosure including the above-described various preferred embodiments and configurations, the image forming device may be configured to include a light source and a scanning unit which scans parallel light emitted from the light source. Furthermore, the configuration of the image forming device is, for the convenience, referred to as a "second-configuration image forming device".

As a light source in the second-configuration image forming device, a light emitting element may be exemplified, specifically, a red light emitting element, a green light emitting element, a blue light emitting element, and a white light emitting element may be exemplified. Alternatively, white light may be obtained by performing color-mixing and luminance equalization of red light, green light, and blue light emitted from the red light emitting element, the green light emitting element and the blue light emitting element by using a light pipe. As a light emitting element, for example, a semiconductor laser element, a solid laser, or an LED may be exemplified. The number of pixels (virtual pixels) in the second-configuration image forming device may also be determined based on the specification demanded for the image display device, and as a specific value of the number of pixels (virtual pixels), 320×240, 432×240, 640×480, 1024×768, 1920×1080, and the like may be exemplified. In addition, in a case where color image display is performed and the light source is configured with the red light emitting element, the green light emitting element, and the blue light emitting element, color combination is preferably performed by using, for example, a cross prism. As a scanning unit, for example, a Micro Electro Mechanical Systems (MEMS) or a galvano mirror having a micro mirror being rotatable in two dimensional directions which can perform horizontal scanning and vertical scanning with the light emitted from the light source may be exemplified.

In the first-configuration image forming device or the second-configuration image forming device of the image display device including the first-structure optical device, the light formed as a plurality of parallel light beams in the optical system (optical system which converts the emitting light into the parallel light, and in some cases, referred to as a "parallel light emitting optical system", specifically, for example, a collimator optical system or a relay optical system) is incident on the light guide plate. This request for the parallel light is based on the fact that, when the light is incident on the light guide plate, optical wavefront information needs to be retained even after the light is emitted through the first deflecting unit and the second deflecting unit from the light guide plate. Furthermore, in order to generate the plurality of parallel light beams, specifically, for example, a light emitting unit of the image forming device may be positioned, for example, at the point (position) of the focal length of the parallel light emitting optical system. The parallel light emitting optical system has a function of converting position information of the pixels into angle information in the optical system of the optical device. As a parallel light emitting optical system, an optical system having a totally positive optical power where a convex lens, a concave lens, a free-form surface prism, and a hologram lens is used alone or in a combination manner may be exemplified. A light shielding portion having an opening may be disposed between the parallel light emitting optical system and the light guide plate so that undesired light emitted from the parallel light emitting optical system is not incident on the light guide plate.

The light guide plate has two parallel surfaces (first and second surfaces) being extended parallel to the axial line (corresponding to the longitudinal direction, the horizontal diction, and the X-axis direction) of the light guide plate. Furthermore, the width direction (corresponding to the height direction and the vertical direction) of the light guide plate corresponds to the Y-axis direction. When the surface of the light guide plate where the light is incident is denoted by a light guide plate incident surface and the surface of the light guide plate where the light is emitted is denoted by a light guide plate emitting surface, the light guide plate incident surface and the light guide plate emitting surface may be configured with the first surface. Alternatively, the light guide plate incident surface may be configured with the first surface, and the light guide plate emitting surface may be configured with the second surface. The interference fringe of the diffraction grating member is extended substantially parallel to the Y-axis direction. As a material constituting the light guide plate, a glass including a quartz glass or an optical glass such as BK7 or a plastic material (for example, PMMA, a polycarbonate resin, an acrylic resin, an amorphous polypropylene based resin, or a styrene resin including an AS resin) may be exemplified. The shape of the light guide plate is not limited to the flat plate, but it may be a curved shape.

In the display apparatus or the like according to an embodiment of the present disclosure, a light shielding member blocking the incidence of external light to the optical device may be configured to be arranged in the region of the optical device where the light emitted from the image forming device is incident. By arranging the light shielding member blocking the incidence of external light to the optical device in the region of the optical device where the light emitted from the image forming device is incident, even though the light amount of incidence of the external light is changed due to the operation of the light regulating device, since the external light is not incident on the region of the optical device where the light emitted from the image forming device is incident, there is no problem in that the image display quality of the display apparatus is deteriorated due to the occurrence of undesired stray light. Furthermore, the region of the optical device where the light emitted from the image forming device is incident is preferably included within the projection image of the light shielding member to the optical device.

The light shielding member may be configured to be disposed at the side of the optical device opposite to the side where the image forming device is disposed so as to be separated from the optical device. In some embodiment, in the display apparatus having the above configuration, the light shielding member may be manufactured by using, for example, a non-transparent plastic material. The light shielding member may be configured to integrally extend from the housing of the image display device or may be configured to be attached to the housing of the image display device. The light shielding member may be configured to integrally extend from the frame or may be configured to be attached to the frame. Alternatively, the light shielding member may be configured to be arranged in the portion of the optical device of the side opposite to the side where the image forming device is arranged. The light shielding member may also be configured to be arranged in the light regulating device. Furthermore, the light shielding member made of a non-transparent material may be formed, for example, on the surface of the optical device based on a physical vapor deposition (PVD) method or a chemical vapor deposition (CVD) method, may be formed by a printing method or like, or a film, a sheet, or a foil made of a non-transparent material (plastic material or metal material, alloy material, or the like) may be adhered. The projection image of the end portion of the light regulating device to the optical device is preferably included within the projection image of the light shielding member to the optical device.

In the display apparatus or the like according to an embodiment of the present disclosure, as described above, the frame may be configured to include a front portion which is arranged in front of the observer and two temples which are rotatably attached to two ends of the front portion through hinges. Furthermore, an earpiece is attached to a distal end of each temple. Although the image display device is attached to the frame, specifically, for example, the image forming device may be attached to the temple. In addition, the front portion and the two temples may be integrally configured. Namely, as the display apparatus or the like according to an embodiment of the present disclosure is viewed overall, the frame has substantially the same structure as that of typical glasses. The material constituting the frame including pad portions may be the same materials constituting typical glasses such as a metal, an alloy, a plastic, or a combination thereof. Moreover, nose pads may be configured to be attached to the front portion. Namely, as the display apparatus or the like according to an embodiment of the present disclosure is viewed overall, an assembly of the frame (in some cases, including a rim) and the nose pads has substantially the same structure as that of typical glasses. The nose pads may also have well-known configuration and structure.

In addition, in some embodiment, in the display apparatus or the like according to an embodiment of the present disclosure, in terms of design or easiness of mounting, a wiring line (signal line, power line, or the like) from one or two image forming devices preferably passes through inner portions of the temple and the earpiece and extends from the distal end of the earpiece to the outside to be connected to the control device (control circuit or control unit). Moreover, in some embodiment, each image forming device may include a headphone unit, and a wiring line for headphone unit from each image forming device may pass through the inner portions of the temple and the earpiece and extends from the distal end of the earpiece to the headphone unit. As a headphone unit, for example, an inner-ear-type headphone unit and a canal-type headphone unit may be exemplified. More specifically, in some embodiment, the wiring line for headphone unit is preferably configured to wrap from the distal end of the earpiece around the back side of the pinna (auricle) and to extend to the headphone unit. In addition, in some embodiment, an imaging device may be attached to a central portion of the front portion. Specifically, the imaging device is configured to include a solid state image pickup element configured as, for example, a CCD sensor or a CMOS sensor and a lens. A wiring line from the imaging device may be connected, for example, through the front portion to the one image display device (or image forming device). Moreover, the wiring line may be included in the wiring line extending from the image display device (or image forming device). The imaging device may be attached to the central portion or the end portion of the frame or may be attached to the temple.

Alternatively, in a case where the display apparatus or the like according to an embodiment of the present disclosure is of a binocular type, the light guide plate may be arranged at the side closer to the center of the face of the observer than the image forming device as viewed overall; a combining member which combines two image display devices may further be included; the combining member may be attached to the side of the central portion of the frame being in contact with the observer which is positioned between the two pupils of the observer; and the projection image of the combining member may be included within the projection image of the frame.

In this manner, due to the structure where the combining member is attached to the central portion of the frame positioned between the two pupils of the observer, namely, if there is no structure where the image display device is directly attached to the frame, when the observer mounts the frame on the head, the temples are in an outwardly spread state, and as a result, even though the frame is deformed, due to the deformation of the associated frame, the displacement (positional change) of the image forming device or the light guide plate does not occur, and even though the displacement occurs, the displacement is negligible. Therefore, it may be possible to securely prevent a convergence angle of the left and right images from being changed. In addition, since there is no need to increase a rigidity of the front portion of the frame, an increase in weight of the frame, a deterioration in design, and an increases in cost is not caused. In addition, since the image display device is not directly attached to the glasses-type frame, design, color, and the like of the frame can be freely selected according to the preference of the observer, and the constraints to the design of the frame are low, and the degree of freedom in design is high. In addition, the combining member is arranged between the observer and the frame, and the projection image of the combining member is included within the projection image of the frame. In other words, when the head mounted display is viewed from the front side of the observer, the combining member is hidden by the frame. Therefore, high quality in design and design property can be provided to the head mounted display.

Furthermore, the combining member is preferably configured to be attached to the side of the central portion (corresponding to the bridge portion of typical glasses) of the front portion positioned between the two pupils of the observer which is in contact with the observer.

Although the two image display devices are combined by the combining member, in some embodiment, specifically, the image forming devices may be attached to the end portion of the combining member so that the attachment state can be adjusted. In addition, in this case, each image forming device is preferably configured to be positioned at the side outer than the pupil of the observer. Moreover, in this configuration, when the distance between the center of the attached portion of the one image forming device and the one end portion (the one endpiece) of the frame is denoted by a, the distance from the center of the combining member to the one end portion (the one endpiece) of the frame is denoted by the distance from the center of the attached portion of the other image forming device and the one end portion (the one endpiece) of the frame is denoted by $\gamma$, and the length of the frame is denoted by L, $0.01 \times L \le \alpha \le 0.30 \times L$, preferably, $0.05 \times L \le \alpha \le 0.25 \times L$, $0.35 \times L \le \beta \le 0.65 \times L$, preferably, $0.45 \times L \le \beta \le 0.55 \times L$, and $0.70 \times L \le \gamma \le 0.99 \times L$, preferably, $0.75 \times L \le \gamma \le 0.95 \times L$ are preferably satisfied. With respect to the attachment of the image forming devices to the end portion of the combining member, specifically, for example, through-holes are formed at three positions of each end portion of the combining member, threaded portions corresponding to the through-holes are formed in the image forming device, and the treaded portions formed in the image forming device are screwed into the through-holes by screws. Springs are inserted between the screws and the threaded portions. Therefore, according to the tightening state of the screw, the attachment state of the image forming device (inclination of the image forming device with respect to the combining member) can be adjusted.

Herein, the center of the attached portion of the image forming device denotes a bisection point in the axial direction of the frame of the portion where the projection image of the image forming device and the projection image of the frame which are obtained by projecting the image forming device and the frame onto a virtual plane overlap each other in the state that the image forming device is attached to the combining member. In addition, the center of the combining member denotes a bisection point in the axial direction of the frame of the portion where the combining member is in contact with the frame in the state that the combining member is attached to the frame. In a case where the frame is configured to be curved, the length of the frame is the length of the projection image of the frame. Furthermore, the projection direction is defined as a direction perpendicular to the face of the observer.

Alternatively, although the two image display devices are combined by the combining member, in some embodiment, specifically, the two light guide plates may be combined by the combining member. Furthermore, in some case, the two light guide plates may be integrally manufactured, and in this case, although the combining member is attached to the associated integrally-manufactured light guide plate, the associated embodiment is also included in the embodiment where the two light guide plates are combined by the combining member. When the distance between the center of the one image forming device and the one end portion of the frame is denoted by $\alpha'$, and the distance between the center of the other image forming device and the one end portion of the frame is denoted by the $\gamma'$, the values of $\alpha'$ and $\gamma'$ are preferably configured to be the same as the values of $\alpha$ and $\gamma$ described above. Furthermore, the center of the image forming device denotes a bisection point in the axial direction of the frame of the portion where the projection image of the image forming device and the projection image of the frame which are obtained by projecting the image forming device and the frame on a virtual plane overlap each other in the state that the image forming device is attached to the light guide plate.

The shape of the combining member is not limited as long as the projection image of the combining member is included within the projection image of the frame, and the shape is basically arbitrary. For example, a rod shape and an elongated plate shape may be exemplified. As a material constituting the combining member, a metal, an alloy, a plastic, or a combination thereof may be exemplified.

In some embodiment, in the display apparatus or the like according to an embodiment of the present disclosure, signals for displaying the image in the image display device (signals for forming the virtual image in the optical device) may be configured to be received from the outside. In this embodiment, information or data on the images which are to be displayed in the image display device may be recorded, stored, and preserved, for example, in a so-called clouding computer or a server, and by allowing the display apparatus to include a communication unit, for example, a mobile phone or a smart phone or by combining the display apparatus and the communication unit, various types of information and data are transmitted/received and exchanged between the clouding computer or server and the display apparatus, and signals based on the various types of information or data, namely, signals for displaying the image in the image display device (signals for forming the virtual image in the optical device) may be received. Alternatively, in some embodiment, the signals for displaying the image in the image display device (signals for forming the virtual image in the optical device) may be stored in the display apparatus. Furthermore, the images which are to be displayed in the image display device include the various types of information and the various types of data. Alternatively, the display apparatus may include the imaging device, the image photographed by the imaging device may be transmitted through the communication unit to the clouding computer or the server, various types of information or data corresponding to the image photographed by the imaging device may be searched for in the clouding computer or the server, the searched various types of information or data may be transmitted through the communication unit to the display apparatus, and the searched various types of information or data may be displayed as images in the image display device.

When the image photographed by the imaging device is transmitted through the communication unit to the clouding computer or the server, the image photographed by the imaging device may be displayed in the image display device and may be checked in the optical device. In some embodiment, specifically, the outer edge of the space region photographed by the imaging device may be displayed in a frame shape in the light regulating device. Alternatively, in some embodiment, the light shielding ratio of the region of the light regulating device corresponding to the space region photographed by the imaging device may be configured to be higher than the light shielding ratio of the region of the light regulating device corresponding to the outer side of the space region photographed by the imaging device. In this embodiment, it is viewed by the observer that the space region photographed by the imaging device is darker than the outer side of the space region photographed by the imaging device. Alternatively, in some embodiment, the light shielding ratio of the region of the light regulating device corresponding to the space region photographed by the imaging device may be configured to be lower than the light shielding ratio of the region of the light regulating device corresponding to the outer side of the space region photographed by the imaging device. In this embodiment, it is viewed by the observer that the space region photographed by the imaging device is brighter than the outer side of the space region photographed by the imaging device. Therefore, the observer can easily and securely recognize which position of the outside the imaging device is to photograph.

The position of the region of the light regulating device corresponding to the space region photographed by the imaging device is preferably corrected. Specifically, by allowing the display apparatus to include, for example, a mobile phone or a smart phone or by combining the display apparatus and the mobile phone, the smart phone, or the personal computer, the space region photographed by the imaging device may be displayed in the mobile phone, the smart phone, or the personal computer. In addition, in a case where there is a difference between the space region displayed in the mobile phone, the smart phone, or the personal computer and the region of the light regulating device corresponding to the space region photographed by the imaging device, by using the control circuit (the mobile phone, the smart phone, or the personal computer may be used as a substitute) for controlling the light shielding ratio (light transmittance) of the light regulating device, the region of the light regulating device corresponding to the space region photographed by the imaging device may be moved/rotated or magnified/reduced, so that the difference between the space region displayed in the mobile phone, the smart phone, or the personal computer and the region of the light regulating device corresponding to the space region photographed by the imaging device may be removed.

The display apparatus or the like according to an embodiment of the present disclosure including the above-described various modified examples may be used for, for example, reception and display of an e-mail, display of various types of information or the like in various sites on the Internet, display of various types of description, symbols, signs, marks, emblems, designs, or the like at the time of operation, manipulation, maintenance, disassembly, or the like of observation objects such as various devices; display of various types of description, symbols, signs, marks, emblems, designs, or the like about observation objects of persons, products, or the like; display of videos or still images; display of subtitles of movies or the like; display of explanatory text or closed caption on a video in synchronization with the video; and display of explanatory text for explaining various description of observation objects, the contents or the situation of progression, background, or the like in Japanese traditional plays, Kabuki, Noh, Noh farce, operas, concerts, ballets, various plays, amusement parks, museums, tourist sites, pleasure resorts, tourist guide, and the like or may be used for display of closed caption. In the Japanese traditional plays, Kabuki, Noh, Noh farce, operas, concerts, ballets, various plays, amusement parks, museums, tourist sites, pleasure resorts, tourist guide, and the like, characters may be displayed as images associated with the observation objects in the display apparatus at an appropriate timing. Specifically, for example, according to the situation of progression of movies or the like or according to the situation of progression of plays or the like, based on predetermined schedule or time allocation by manipulation of an operator or under the control of a computer or the like, an image control signal is transmitted to the display apparatus, and the image is displayed in the display apparatus. In addition, although the display of various descriptions on the observation objects such as various devices, persons, or products is performed, the observation objects such as various devices, persons, or products may be photographed (imaged) by the imaging device and the photographed (imaged) contents are analyzed in the display apparatus, so that display of various descriptions on observation objects such as various devices, persons, or products which are produced in advance may be performed in the display apparatus. Alternatively, the display apparatus or the like according to an embodiment of the present disclosure may also be used as a stereoscopic display apparatus. In this case, as necessary, a polarizing plate or a polarizing film may be detachably attached to the optical device, or a polarizing plate or a polarizing film may be adhered to the optical device.

The image signals in the image forming device may include, as well as the image signal (for example, character data), for example, luminance data (luminance information) on the to-be-displayed image, chromaticity data (chromaticity information) thereof, or the luminance data and the chromaticity data. The luminance data may be luminance data corresponding to the luminance of a predetermined region including the observation objects which are viewed through the optical device, and the chromaticity data may be chromaticity data corresponding to the chromaticity of a predetermined region including the observation objects which are viewed through the optical device. In this manner, the luminance data on the image is included, so that control of the luminance (brightness) of the to-be-displayed image may be performed; the chromaticity data on the image is included, so that control of the chromaticity (color) of the to-be-displayed image may be performed; and the luminance data and the chromaticity data on the image are included, so that control of the luminance (brightness) and the chromaticity (color) of the to-be-displayed image may be performed. In the case of using the luminance data corresponding to the luminance of the predetermined region including the observation objects which are viewed through the image display device, the value of the luminance data may be set so that, as the value of luminance of the predetermined region including the observation objects which are viewed through the image display device is increased, the value of the luminance of the image is increased (namely, the image is displayed to be brighter). In addition, in the case of using the chromaticity data corresponding to the chromaticity of the predetermined region including the observation objects which are viewed through the image display device, the value of the chromaticity data may be set so that the chromaticity of the predetermined region including the observation objects which are viewed through the image display device and the chromaticity of the to-be-displayed image have a complementary color relationship as a whole. The complementary colors denote a combination of colors in the relation that the colors are positioned diametrically opposite to each other in a hue circle (color circle). Green to red, purple to yellow, orange to blue, and the like are complementary colors. With respect to a color which is obtained by mixing a different color to a certain color at an appropriate ratio to decrease saturation such as white in case of light or black in case of an object, complementarity of visual effects at the time of parallel arrangement and complementarity at the time of mixing are different. The complementary colors are also called complementary colors, contrasting colors, or opposite colors. However, while the complementary colors directly indicate opposed colors, in the opposite colors, the indication range of the complementary colors is slightly wide. The color combination of the complementary colors provides a synergistic effect of allowing the colors to complement each other, and thus, this is called complementary color harmony.

For example, a head mounted display (HMD) may be configured by using the display apparatus or the like according to an embodiment of the present disclosure. In addition, therefore, weight reduction and miniaturization of the display apparatus can be achieved, discomfort at the time of mounting the display apparatus can be greatly reduced, and moreover, the production cost can be decreased. Alternatively, the display apparatus or the like according to an embodiment of the present disclosure may be applied to a head up display (HUD) installed in a cockpit of a vehicle or an airplane. Specifically, in the HUD where the virtual image forming region where the virtual image is formed based on the light emitted from the image forming device is arranged in the windshield of the vehicle of the cockpit or the like of the vehicle or the airplane or in the HUD where a combiner having the virtual image forming region where the virtual image is formed on the light emitted from the image forming device is arranged in the windshield of the vehicle of the cockpit or the like of the vehicle or the airplane, the associated virtual image forming region or combiner may be configured so as to overlap at least a portion of the light regulating device.

First Embodiment

Figure 2:
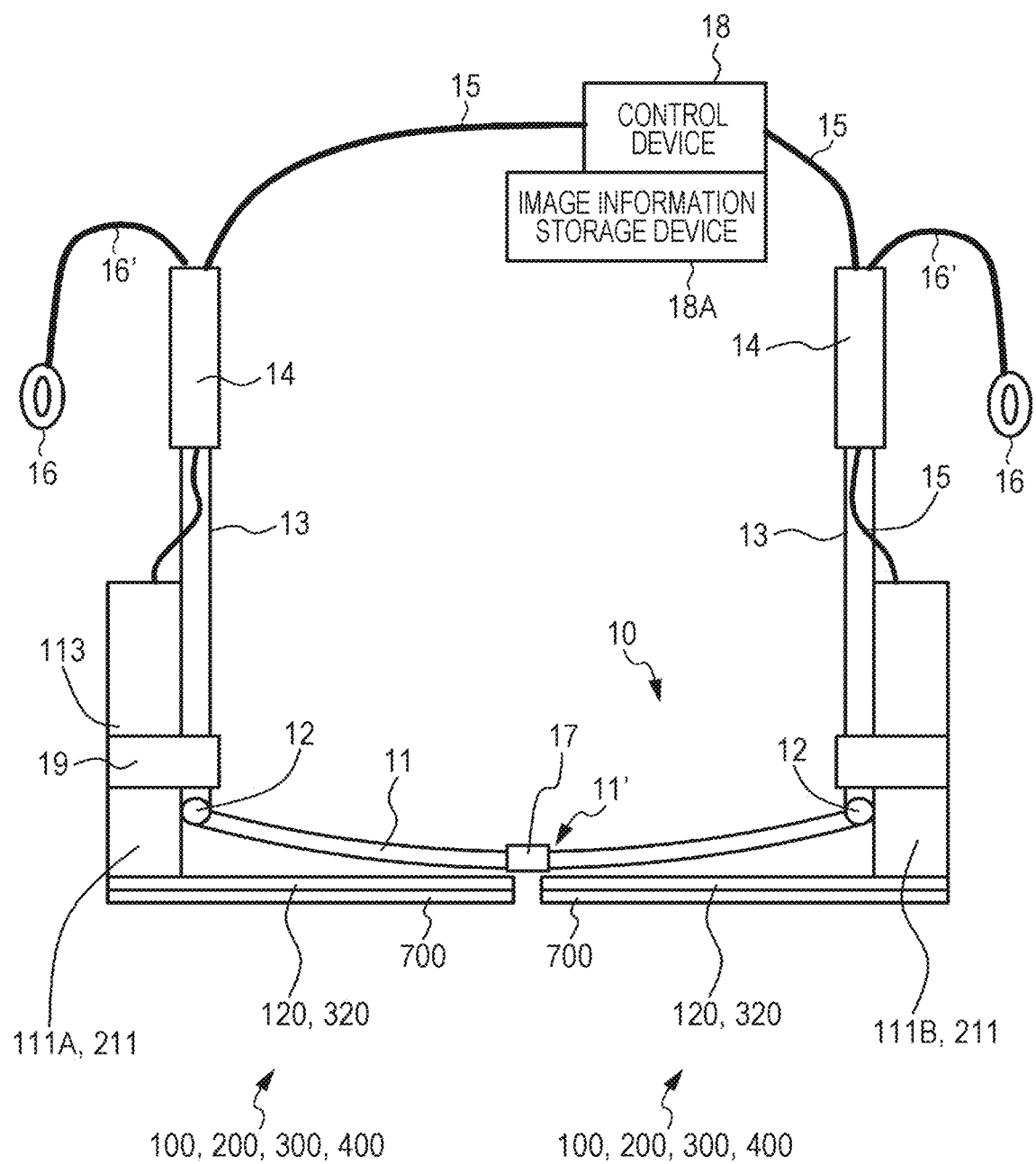
FIG. 2 is a schematic view as the display apparatus according to the first embodiment or the like is viewed from the upper side.
Figure 3A:
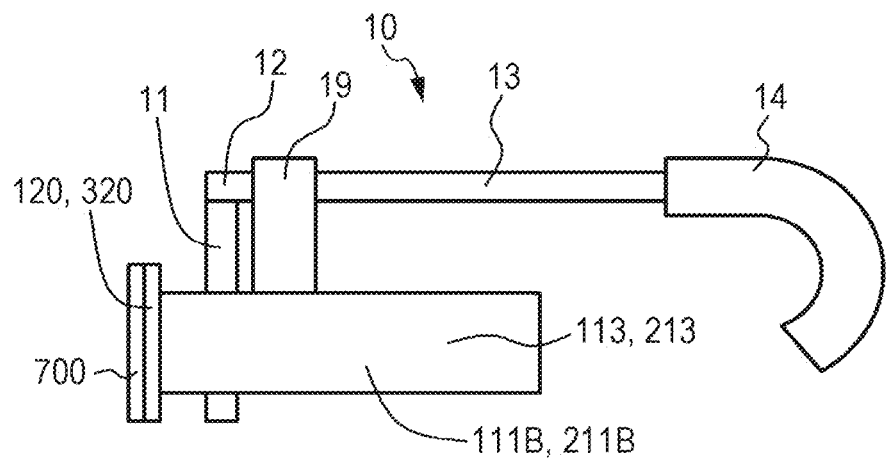
FIGS. 3A and 3B are a schematic view as the display apparatus according to the first embodiment is viewed from the lateral side and a schematic view as portions of an optical device and a light regulating device in the display apparatus according to the first embodiment are viewed from the front side, respectively.
Figure 3B:
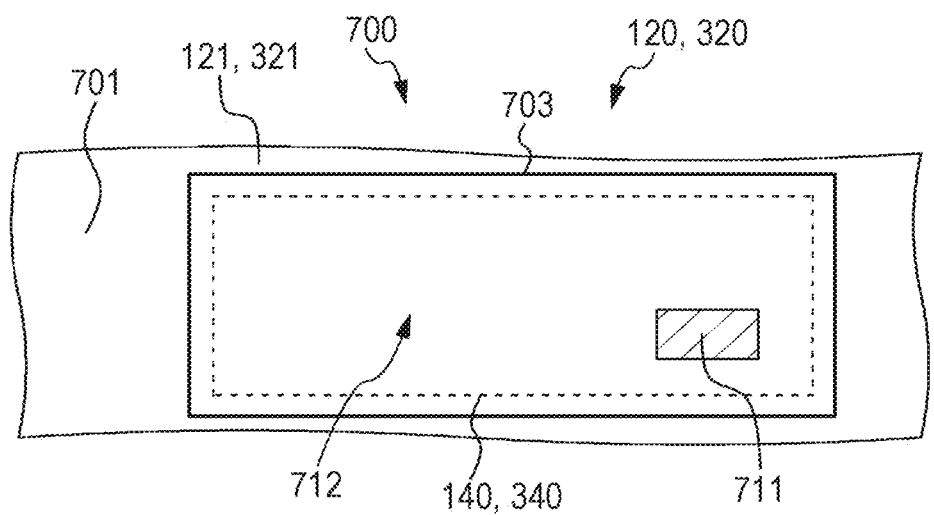
Figure 4A:
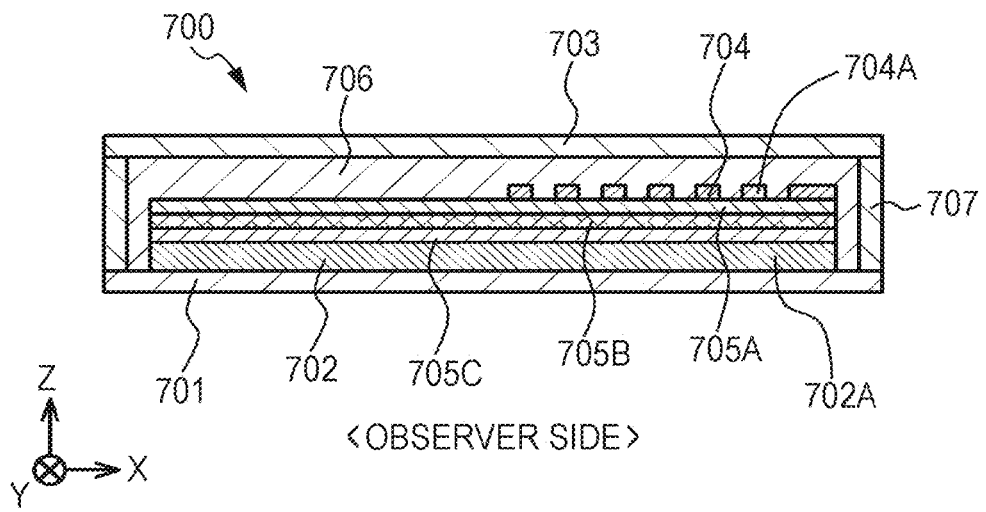
FIGS. 4A and 4B are a schematic cross-sectional view of the light regulating device in the display apparatus according to the first embodiment and a schematic front view of the optical device and the light regulating device, respectively.
Figure 4B:
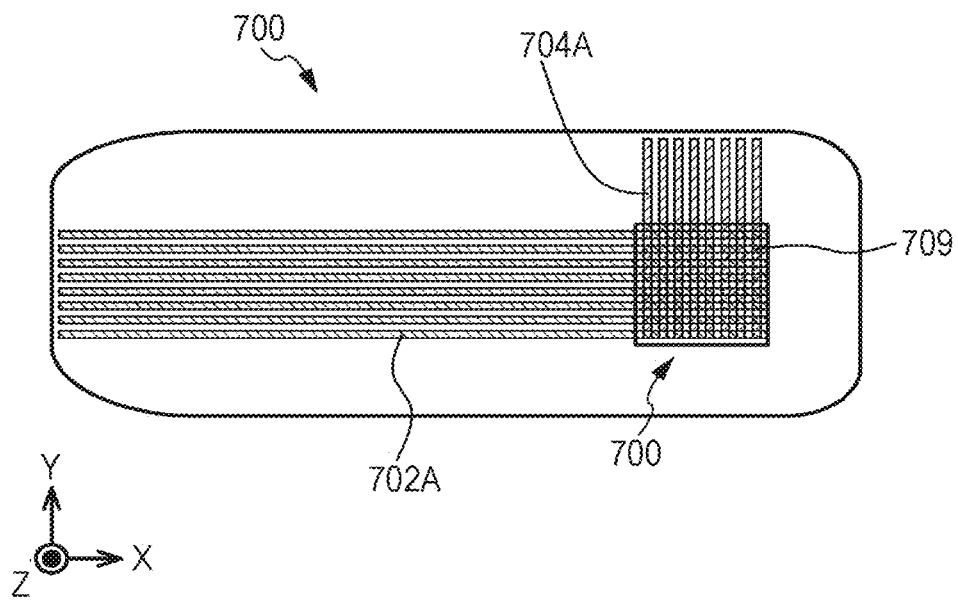
Figure 5:
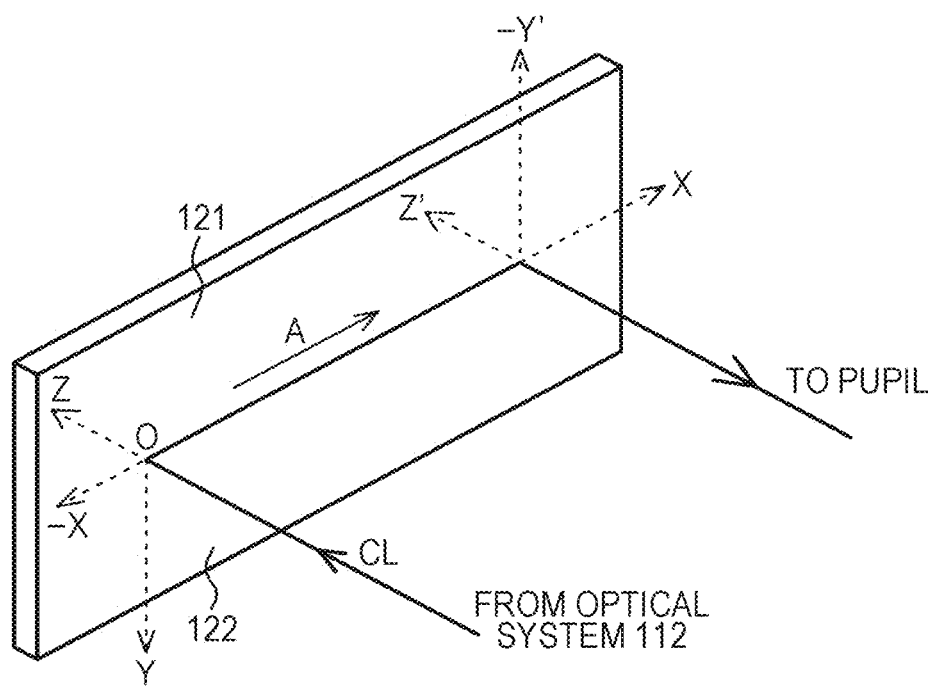
FIG. 5 is a view schematically illustrating a propagation state of light in a light guide plate constituting an image display device.

A first embodiment relates to the display apparatus according to an embodiment of the present disclosure, and more specifically, relates to a first-A-structure optical device and an image forming device having a first configuration. A conceptual view of the image display device in the first embodiment is illustrated in FIG. 1. A schematic view as the display apparatus (specifically, a head mounted display (HMD)) according to the first embodiment or the like is viewed from the upper side is illustrated in FIG. 2. A schematic view as the display apparatus is viewed from the lateral side is illustrated in FIG. 3A. A schematic view as portions of the optical device and a light regulating device are viewed from the front side is illustrated in FIG. 3B. A schematic cross-sectional view of the light regulating device in the display apparatus according to the first embodiment and a front view of the optical device and the light regulating device are illustrated in FIGS. 4A and 4B. In addition, a propagation state of light in a light guide plate constituting the image display device is schematically illustrated in FIG. 5.

The display apparatus according to the first embodiment or the later-described second to twelfth embodiments is, more specifically, a head mounted display (HMD) and is configured to include;

(A) a frame 10 (for example, a glasses-type frame 10) which is mounted at the head of an observer 20,
(B) image display devices 100, 200, 300, 400, 500 which are attached to the frame 10, and
(C) a light regulating device 700 which adjusts a light amount of external light incident from the outside. Furthermore, the display apparatus according to the first embodiment or the later-described second to twelfth embodiments is, specifically, configured as a binocular type having two image display devices, but the display apparatus may be configured as a monocular type having one image display device. In addition, image forming devices 111, 211 display, for example, a monochrome (for example, green) image (virtual image). In addition, the image display devices 100, 200, 300, 400, 500 in the first embodiment or the later-described second to twelfth embodiments are configured to include;
(a) image forming devices 111, 211, and
(b) optical devices 120, 320, 520 having a virtual image forming region where a virtual image is formed based on light emitted from the image forming devices 111, 211. In addition, the display apparatus according to the first embodiment, the later-described second to fifth embodiments, or the later-described seventh to twelfth embodiments is configured to further include;
(c) optical systems (parallel light emitting optical systems) 112, 254 which convert light emitted from the image forming devices 111, 211 into parallel light, so that the light flux formed as the parallel light in the optical systems 112, 254 are incident to the optical devices 120, 320, 520 to be guided and emitted.

Furthermore, the image display devices 100, 200, 300, 400, 500 may be fixedly attached to the frame 10 or may be detachably attached to the frame. Herein, the optical systems 112, 254 is disposed between the image forming devices 111, 211 and the optical devices 120, 320, 520. In addition, the light flux formed as the parallel light in the optical systems 112, 254 is incident to the optical devices 120, 320, 520 to be guided and emitted. In addition, the optical devices 120, 320, 520 are of a semi-transparent type (see-through type). Specifically, at least portions (more specifically, the later-described light guide plates 121, 321 and second deflecting units 140, 340) of the optical device facing two eyes of the observer 20 are semi-transparent (see-through).

Herein, the virtual image forming region of the optical devices 120, 320, 520 overlap the light regulating device 700, the light regulating device 700 is controlled so that, when the virtual image is formed in a portion of the virtual image forming region based on the light emitted from the image forming devices 111, 211, the light shielding ratio of a virtual image projection region 711 of the light regulating device 700 where the projection image of the virtual image to the light regulating device 700 is included is higher than the light shielding ratio of the other region 712 of the light regulating device 700. Furthermore, in the light regulating device 700, the position of the virtual image projection region 711 is not fixed but changed depending on the formation position of the virtual image, and in addition, the number of virtual image projection regions 711 is changed depending on the number of virtual images (or the number of a series of virtual image groups, the number of blocked virtual image groups, or the like).

In the display apparatus according to the first embodiment or the later-described second to fourth embodiments, the optical devices 120, 320 is configured to include;

(b-1) light guide plates 121, 321 where light incident from the image forming devices 111, 211 propagates an inner portion thereof by total reflection and, after that, is emitted toward the observer 20,
(b-2) first deflecting units 130, 330 which deflect the light incident on the light guide plates 121, 321 so that the light incident on the light guide plates 121, 321 is totally reflected in the inner portion of the light guide plates 121, 321, and
(b-3) second deflecting units 140, 340 which deflect the light propagating the inner portion of the light guide plates 121, 321 by total reflection several times in order to emit the light propagating the inner portion of the light guide plates 121, 321 by total reflection from the light guide plates 121, 321, and the virtual image forming region of the optical device is configured with the second deflecting units 140, 340.

In the first embodiment or the later-described second to fourth embodiments, a point where the center incident light beam perpendicularly incident on the optical devices 120, 320 among the light beams (central light beams CL) being emitted from the center of the image forming devices 111, 211 and passing through an image-forming-device-side nodal point of the side of the optical systems 112, 254 is incident on the optical devices 120, 320 is denoted by an optical device central point O; an axial line passing through the optical device central point O and being parallel to the axial direction of the optical devices 120, 320 is denoted by an X axis; and an axial line passing through the optical device central point O and being coincident with the normal line of the optical devices 120, 320 is denoted by a Z axis. Furthermore, the central point of the first deflecting units 130, 330 described below is the optical device central point O. Namely, as illustrated in FIG. 5, in the image display devices 100, 200, 300, 400, the center incident light beam CL being emitted from the center of the image forming devices 111, 211 and passing through the image-forming-device-side nodal point of the optical systems 112, 254 perpendicularly collides with the light guide plates 121, 321. In other words, the center incident light beam CL is incident on the light guide plates 121, 321 with an incident angle of 0 degree. In addition, in this case, the center of the to-be-displayed image (virtual image) is coincident with the vertical direction of first surfaces 122, 322 of the light guide plates 121, 321.

In this manner, the first deflecting unit reflects the light incident on the light guide plates 121, 321, and the second deflecting unit transmits and reflects the light propagating the inner portion of the light guide plates 121, 321 by total reflection several times. Specifically, in the first embodiment or the later-described second embodiment, the first deflecting unit 130 and the second deflecting unit 140 are arranged and installed in the inner portion of the light guide plate 121. In addition, the first deflecting unit 130 reflects the light incident on the light guide plate 121, and the second deflecting unit 140 transmits and reflects the light propagating the inner portion of the light guide plate 121 by total reflection several times. Namely, the first deflecting unit 130 functions as a reflecting mirror, and the second deflecting unit 140 functions as a semi-transparent mirror. More specifically, the first deflecting unit 130 installed in the light guide plate 121 is configured with a light reflecting film (a kind of a mirror) which is made of aluminum (Al) to reflect the light incident on the light guide plate 121. On the other hand, the second deflecting unit 140 installed in the light guide plate 121 is configured with a multi-layered stacked structure where a number of dielectric stacked films are stacked. The dielectric stacked film is configured with, for example, a $TiO_2$ film as a high dielectric constant material and an $SiO_2$ film as a low dielectric constant material. A multi-layered stacked structure where a number of dielectric stacked films is stacked is disclosed in JP 2005-521099 A. Although the six-layered dielectric stacked film is illustrated in the drawings, the present disclosure is not limited thereto. A thin piece made of the same material as the material constituting the light guide plate 121 is interposed between the dielectric stacked films. Furthermore, in the first deflecting unit 130, the parallel light incident on the light guide plate 121 is reflected (or diffracted) so that the parallel light incident on the light guide plate 121 is totally reflected inside the light guide plate 121. On the other hand, in the second deflecting unit 140, the parallel light propagating the inner portion of the light guide plate 121 by total reflection is reflected (or diffracted) several times and is emitted from the light guide plate 121 toward a pupil 21 of the observer 20 in a parallel light state.

With respect to the first deflecting unit 130, by cutting a portion 124 where the first deflecting unit 130 of the light guide plate 121 is installed, a slanted surface where the first deflecting unit 130 is to be formed may be installed in the light guide plate 121, a light reflecting film may be vapor-deposited on the associated slanted surface, and after that, the cut portion 124 of the light guide plate 121 may be adhered to the first deflecting unit 130. In addition, with respect to the second deflecting unit 140, a multi-layered stacked structure may be manufactured by stacking a number of dielectric stacked films (for example, formed by a vapor deposition method) and the same material (for example, a glass) as the material constituting the light guide plate 121; a slanted surface may be formed by cutting a portion 125 of the light guide plate 121 where the second deflecting unit 140 is to be installed; the multi-layered stacked structure may be adhered to the associated slanted surface; and outer appearance may be arranged properly by performing polishing or the like. Therefore, the optical device 120 where the first deflecting unit 130 and the second deflecting unit 140 are installed in the inner portion of the light guide plate 121 can be obtained.

Herein, in the first embodiment, the later-described second to fourth embodiments, or the later-described seventh to twelfth embodiments, the light guide plates 121, 321 made of an optical glass or a plastic material has two parallel surfaces (first surfaces 122, 322 and second surfaces 123, 323) which extend in parallel to the light propagating direction (X axis) by total internal reflection of the light guide plates 121, 321. The first surfaces 122, 322 and the second surfaces 123, 323 face each other. In addition, the parallel light is incident from the first surfaces 122, 322 corresponding to the light incident surface and propagates the inner portion by total reflection, and after that, is emitted from the first surfaces 122, 322 corresponding to the light emitting surface. However, the present disclosure is not limited thereto, but the light incident surface may be configured with the second surfaces 123, 323, and the light emitting surface may be configured with the first surfaces 122, 322.

In the first embodiment or the later-described third embodiment, the image forming device 111 is a first-configuration image forming device and includes a plurality of pixels which are arranged in a two-dimensional matrix shape. Specifically, the image forming device 111 is configured to include a reflective spatial light modulation device 150 and a light source 153 configured with a light emitting diode which emits white light. The entire image forming devices 111 can be accommodated in a housing 113 (in FIG. 1, indicated by a dashed-dotted line), an opening (not shown) is installed in the associated housing 113, and light is emitted through the opening from the optical system (parallel light emitting optical system, collimator optical system) 112. The reflective spatial light modulation device 150 is configured to include a liquid crystal display device (LCD) 151 configured with an LCOS as a light valve and a polarizing beam splitter 152 which reflect a portion of the light from the light source 153 to be guided to the liquid crystal display device 151 and transmits a portion of the light reflected by the liquid crystal display device 151 to be guided to the optical system 112. The liquid crystal display device 151 includes a plurality (for example, 640×480) of pixels (liquid crystal cells) which are arranged in a two-dimensional matrix shape. The polarizing beam splitter 152 has well-known configuration and structure. Nonpolarized light emitted from the light source 153 collides with the polarizing beam splitter 152. In the polarizing beam splitter 152, P polarization components are transmitted to be emitted to the outside of the system. On the other hand, S polarization components are reflected on the polarizing beam splitter 152 to be incident on the liquid crystal display device 151 and are reflected in an inner portion of the liquid crystal display device 151 to be emitted from the liquid crystal display device 151. Herein, among the light emitted from the liquid crystal display device 151, the light emitted from the pixels displaying "white" includes a large amount of the P polarization components, and the light emitted from the pixels displaying "black" includes a large amount of the S polarization component. Therefore, among the light emitted from the liquid crystal display device 151 and colliding with the polarizing beam splitter 152, the P polarization components pass through the polarizing beam splitter 152 to be guided to the optical system 112. On the other hand, the S polarization components are reflected on the polarizing beam splitter 152 to be returned to the light source 153. The optical system 112 is configured with, for example, a convex lens, and the image forming device 111 (more specifically, the liquid crystal display device 151) is arranged at the point (position) of the focal length of the optical system 112 in order to generate the parallel light.

The frame 10 is configured to include a front portion 11 arranged in front of the observer 20, two temples 13 rotatably attached to two ends of the front portion 11 through hinges 12, and earpieces (in some cases, referred to as ear covers, earmuffs, or ear pads) 14 attached to distal end portions of the temples 13. In addition, nose pads (not shown in FIG. 2) are attached. Namely, basically, an assembly of the frame 10 and the nose pads has substantially the same structure as that of typical glasses. Moreover, each housing 113 is detachably attached to the temple 13 by an installation member 19. The frame 10 is manufactured by using a metal or a plastic. Furthermore, each of housing 113 may be attached to the temple 13 by the installation member 19 so as not to be detached. In addition, in the case of an observer who owns and mounts glasses, each housing 113 may be detachably attached to the temple 13 of the frame of the glasses owned by the observer by the installation member 19. Each housing 113 may be attached to the outer side of the temple 13 or may be attached to the inner side of the temple 13. Alternatively, the light regulating device 700 and the light guide plates 121, 321 may be fitted to the rim installed in the front portion 11, the light regulating device 700 may be fitted, and the light guide plates 121, 321 may be fitted.

Moreover, a wiring line (signal line, power line, or the like) 15 extending from the one image forming device 111A passes through the inner portions of the temple 13 and the earpiece 14 and extends from the distal end portion of the earpiece 14 to the outside to be connected to a control device (control circuit or control unit) 18. Moreover, each of image forming devices 111A and 111B includes a headphone unit 16, and a wiring line for headphone unit 16' extending from each of the image forming devices 111A and 111B passes through the inner portions of the temple 13 and the earpiece 14 and extends from the distal end portion of the earpiece 14 to the headphone unit 16. More specifically, the wiring line for headphone unit 16' wraps from the distal end portion of the earpiece 14 around the back side of the pinna (auricle) and extends to the headphone unit 16. By this configuration, a neat display apparatus can be formed not to give an impression that the headphone unit 16 or the wiring line for headphone unit 16' is arranged disorderly.

As described above, the wiring lines (signal lines, power lines, and the like) 15 are connected to the control device (control circuit) 18. The control device 18 includes, for example, an image information storage device 18A. In addition, in the control device 18, a process for image display is performed. The control device 18 and the image information storage device 18A may be configured with a well-known circuit.

An imaging device 17 configured with a solid state imaging element configured as a CCD sensor or a CMOS sensor and a lens (these components are not shown) is attached to a central portion 11' of the front portion 11 by an appropriate attachment member (not shown). Signals from the imaging device 17 are transmitted through the wiring line (not shown) extending from the imaging device 17 to the control device (control circuit) 18.

When the light shielding ratio of the virtual image projection region of the light regulating device where the projection image of the virtual image to the light regulating device is included is defined as "1", at the time of operation of the light regulating device 700, the light shielding ratio of the other region 712 of the light regulating device 700 is, for example, 0.95 or less. Alternatively, the light shielding ratio of the other region of the light regulating device is, for example, 30% or less. On the other hand, at the time of operation of the light regulating device 700, the light shielding ratio of the virtual image projection region 711 of the light regulating device 700 is in a range of 35% to 99% and is, for example, 80%. In this manner, the light shielding ratio of the virtual image projection region 711 may be constant, and as described later, the light shielding ratio may be changed depending on the illuminance of the environment where the display apparatus is placed.

In the first embodiment, the later-described second to fifth embodiments, or the later-described seventh to twelfth embodiments, the light regulating device 700 which adjusts a light amount of external light incident from the outside is disposed at the side of the optical devices 120, 320, 520 opposite to the side where the image forming devices 111, 211 is arranged and installed. Specifically, the light regulating device 700 which is a kind of a light shutter is fixed to the optical devices 120, 320, 520 (specifically, protection members (protective plates) 126, 326 protecting the light guide plates 121, 321 or a semi-transparent mirror 520) by using an adhesive 708. Specifically, the outer edge of a first substrate 701 of the light regulating device 700 and the outer edge of the protection member 126 are adhered to each other by the adhesive 708. The first substrate 701 of the light regulating device 700 was configured to have the same shape as that of the light guide plate 121. Namely, the size of the light regulating device 700 was configured to be the same as the size of the optical devices 120, 320, 520. However, the present disclosure is not limited thereto, but the size may be large or may be small. In short, the virtual image forming region (second deflecting units 140, 340 or the like) may be positioned within the projection image of the light regulating device 700. This is the same in the embodiments described hereinafter. The light regulating device 700 is disposed in the region of the optical devices 120, 320, 520 of the side opposite to the observer 20. Namely, although the optical device 120 and the light regulating device 700 are disposed in this order from the observer side, the light regulating device 700 and the optical devices 120, 320 may be disposed in this order. A connector (not shown) is attached to the light regulating device 700, and the light regulating device 700 is electrically connected to the control circuit (specifically, control device 18) for controlling the light shielding ratio of the light regulating device 700 through the connector and the wiring line.

The protection members (protective plates) 126, 326 are adhered to the second surfaces 123, 323 of the light guide plates 121, 321 by adhesive members 127, 327, and the first deflecting units 130, 330 and the second deflecting units 140, 340 are covered with the protection members (protective plates) 126, 326.

Figure 6:
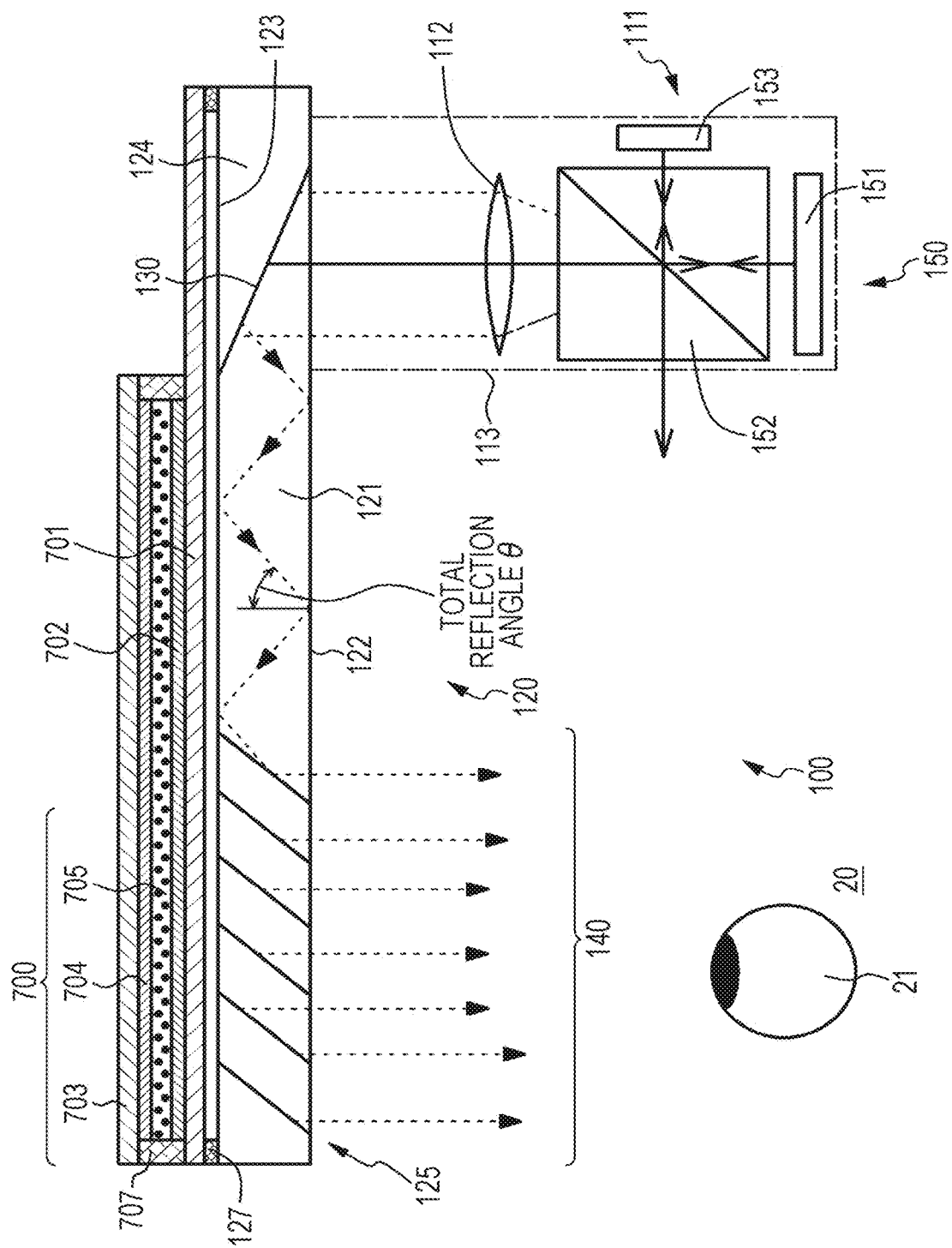
FIG. 6 is a conceptual view of a modification example of the image display device in the display apparatus according to the first embodiment.

In some cases, as illustrated in FIG. 6, the protection member 126 may be omitted and the first substrate 701 of the light regulating device 700 may also be configured to function as the protection member 126. Therefore, the total weight of the display apparatus can be reduced, and there is no problem in that the user of the display apparatus feels discomfort. In addition, a second substrate 703 may be configured to be thinner than the first substrate 701. This is the same in the embodiments described later.

In the first embodiment or the later-described second to twelfth embodiments, as a schematic cross-sectional view is illustrated in FIG. 4A and a schematic plan view is illustrated in FIG. 4B, the light regulating device 700 is configured to include;

a first substrate 701, a second substrate 703 facing the first substrate 701, a first transparent electrode 702 installed on a facing surface of the first substrate 701 facing the second substrate 703, a second transparent electrode 704 installed on a facing surface of the second substrate 703 facing the first substrate 701, and a light regulating layer 705 interposed between the first transparent electrode 702 and the second transparent electrode 704. In addition, the first transparent electrode 702 is configured with a plurality of strip-shaped first transparent electrode segments 702A extending in a first direction, the second transparent electrode 704 is configured with a plurality of strip-shaped second transparent electrode segments 704A extending in a second direction different from the first direction, and control of the light shielding ratio of a portion of the light regulating device corresponding to an overlap region (lightshielding-ratio-varying minimum unit region 709 of the light regulating device) between the first transparent electrode segments 702A and the second transparent electrode segments 704A is performed based on control of voltages applied to the first transparent electrode segments 702A and the second transparent electrode segments 704A. Namely, the control of the light shielding ratio can be performed based on a simple matrix scheme. The first direction and the second direction are perpendicular to each other. Specifically, the first direction extends in the lateral direction (X-axis direction), and the second direction extends in the longitudinal direction (Y-axis direction).

The first substrate 701 and the second substrate 703 are configured with a plastic material. In addition, the first transparent electrode 702 and the second transparent electrode 704 are configured with transparent electrodes made of an indium-tin complex oxide (ITO) and are formed based on a combination of a PVD method such as a sputtering method and a lift-off method. A protective layer 706 configured with an SiN layer, an $SiO_2$ layer, an $Al_2O_3$ layer, a $TiO_2$ layer, or a stacked layer thereof is formed between the second transparent electrode 704 and the second substrate 703. By forming the protective layer 706, an ion barrier property of preventing ions from incoming and outgoing, a water proof property, a moisture-proof property, and scratch resistance can be provided to the light regulating device 700. In addition, the first substrate 701 and the second substrate 703 are sealed at the outer edges by a sealing member 707 configured with a UV curable epoxy resin, a UV curable resin such as an epoxy resin cured by UV light and heat, or a thermosetting resin. The first transparent electrode 702 and the second transparent electrode 704 are connected through a connector and a wiring line (not shown) to the control device 18.

The light shielding ratio (light transmittance) of the light regulating device 700 can be controlled by voltages applied to the first transparent electrode 702 and the second transparent electrode 704. Specifically, for example, if a voltage is applied to the second transparent electrode 704 in the state that the first transparent electrode 702 is grounded, the light shielding ratio of the light regulating layer 705 is changed. A potential difference between the first transparent electrode 702 and the second transparent electrode 704 may be controlled, or the voltage applied to the first transparent electrode 702 and the voltage applied to the second transparent electrode 704 may be independently controlled.

Furthermore, when the number of pixels in the virtual image forming region (second deflecting units 140, 340) of the light regulating device 700 is denoted by $M_0$ and the number of pixels in the longitudinal direction is denoted by $N_0$, the number $M_1 \times N_1$ of light-shielding-ratio-varying minimum unit region 709 of the light regulating device 700 is, for example, $M_0=M_1$ and $N_0=N_1$. However, the present disclosure is not limited thereto, but in some embodiment, when $M_1/M_0=k$ and $N_1/N_0=k'$ (herein, k and k' are positive integers), $1.1 \leq k$, preferably, $1.1 \leq k \leq 1.5$, more preferably, $1.15 \leq k \leq 1.3$ and $1.1 \leq k'$, preferably, $1.1 \leq k' \leq 1.5$, more preferably, $1.15 \leq k' \leq 1.3$ may be satisfied. The value of k and the value of k' may be equal to each other or may be different from each other. In the embodiment, the values were set so that $k=k'=1$.

In the first embodiment or the later-described second to ninth embodiment, the light regulating device 700 is configured with a light shutter using color change of a substance generated by an oxidation/reduction reaction of an electrochromic material. Specifically, the light regulating layer contains the electrochromic material. More specifically, the light regulating layer has a stacked structure of $WO_3$ layer 705A/$Ta_2O_5$ layer 705B/$Ir_xSn_{1-x}O$ layer 705C from the second transparent electrode side. The $WO_3$ layer 705A is reduced to impart color. In addition, the $Ta_2O_5$ layer 705B constitutes a solid electrolyte, and the $Ir_xSn_{1-x}O$ layer 705C is oxidized to impart color.

In the $Ir_xSn_{1-x}O$ layer, Ir and $H_2O$ react with each other to exist as hydroxide iridium $Ir(OH)_n$. If a negative potential is applied to the second transparent electrode 704 and a positive potential is applied to the first transparent electrode 702, protons $H^+$ move from the $Ir_xSn_{1-x}O$ layer to the $Ta_2O_5$ layer, and electrons are emitted to the first transparent electrode 702. The following oxidation reaction is performed, so that the $Ir_xSn_{1-x}O$ layer is colored.

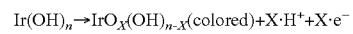

$$Ir(OH)_n \rightarrow IrO_X(OH)_{n-X}(colored) + X \cdot H^+ + X \cdot e^-$$

On the other hand, protons $H^+$ in the $Ta_2O_5$ layer move into the $WO_3$ layer, and electrons from the second transparent electrode 704 are injected into the $WO_3$ layer. In the $WO_3$ layer, the following reduction reaction is performed, so that the $WO_3$ layer is colored. $WO_3 + X \cdot H^+ + X \cdot e^- \rightarrow H_XWO_3$ (colored)

On the contrary, if a positive potential is applied to the second transparent electrode 704 and a negative potential is applied to the first transparent electrode 702, in the $Ir_xSn_{1-x}O$ layer, a reduction reaction proceeds in the direction reverse to the above case and decoloring occurs; and in the $WO_3$ layer, an oxidation reaction proceeds in the direction reverse to the above case and decoloring occurs. Furthermore, the $Ta_2O_5$ layer includes $H_2O$, and by applying a voltage to the first transparent electrode and the second transparent electrode, ionization occurs so that the state of protons $H^+$ and $OH^-$ ions is included to contribute to the coloring reaction and the decoloring reaction.

Figure 7:
FIG. 7 is a view illustrating an outside world viewed by an observer.

In the first embodiment or the later-described second to twelfth embodiments, for example, it is assumed that the observer viewed the outside world as illustrated in FIG. 7 through the light regulating device 700 in a low light shielding ratio state and the optical devices 120, 320, 520. In addition, it is assumed that the observer desired to acquire information on, for example, "how to get to the station".

In this case, information or data on the images which are to be displayed in the image display devices 100, 200, 300, 400, 500 or signals which are to be received by a reception device may be recorded, stored, and preserved, for example, in a so-called clouding computer or a server; by allowing the display apparatus to include a communication unit (transmission/reception unit), for example, a mobile phone or a smart phone or by incorporating a communication unit (reception device) to the control device (control circuit, control unit) 18, various types of information, data, signals may be transmitted/received and exchanged between the clouding computer or server and the display apparatus through the communication unit; signals based on the various types of information or data, namely, signals for displaying the image in the image display devices 100, 200, 300, 400, 500 may be received; and the reception device may receive the signals.

Figure 8A:
FIGS. 8A and 8B are views illustrating states that the light regulating device is controlled so that a light shielding ratio of a virtual image projection region of the light regulating device where a projection image of a virtual image to the light regulating device is included is higher than the light shielding ratio of the other region of the light regulating device.
Figure 8B:
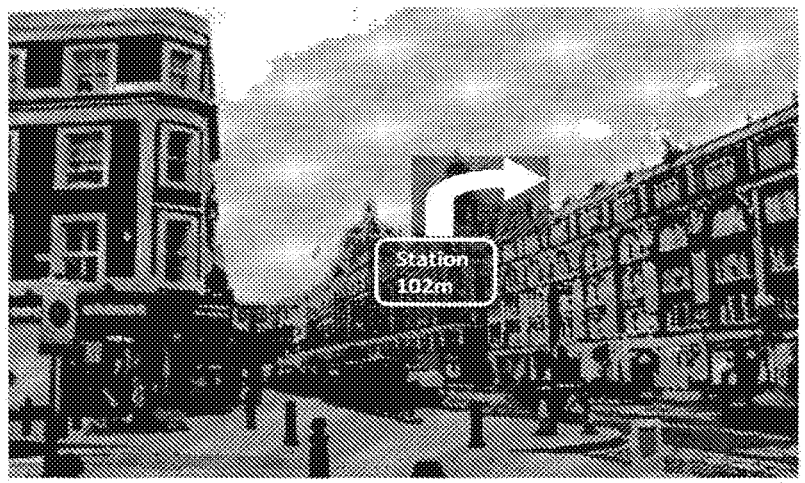

Specifically, if the observer performs an input of a message requesting "information on station" as to-be-acquired information to the mobile phone or the smart phone, the mobile phone or the smart phone accesses the clouding computer or the server and acquires the "information on station" from the clouding computer or the server. Therefore, the control device 18 receives signals for displaying the image in the image display devices 100, 200, 300, 400, 500. The control device 18 performs well-known image processes based on the signals and displays the "information on station" as an image in the image forming devices 111, 211. The image of the "information on station" is displayed as a virtual image at a predetermined position controlled by the control device 18 in the optical devices 120, 320, 520 based on the light emitted from the image forming devices 111, 211. Namely, the virtual image is formed in a portion of the virtual image forming region (second deflecting units 140, 340). In addition, the light regulating device 700 is controlled so that the light shielding ratio of the virtual image projection region 711 of the light regulating device 700 where the projection image of the virtual image to the light regulating device 700 is included is higher than the light shielding ratio of the other region 712 of the light regulating device 700 (refer to FIG. 8B). Specifically, voltages applied to the first transparent electrode 702 and the second transparent electrode 704 are controlled by the control device 18. Herein, the size and position of the virtual image projection region 711 of the light regulating device 700 are determined based on the signals for displaying the image in the image forming devices 111, 211.

In some cases, in the image display devices 100, 200, 300, 400, 500, the signals for displaying the image may be stored in the display apparatus (specifically, the control device 18, more specifically, the image information storage device 18A).

Alternatively, the image imaged by the imaging device 17 installed in the display apparatus may be transmitted through the communication unit to the clouding computer or the server, the various types of information or data corresponding to the image imaged by the imaging device 17 may be searched for in the clouding computer or the server, the searched various types of information or data may be transmitted through the communication unit to the display apparatus, and the image of the searched various types of information or data may be displayed in the image display devices 100, 200, 300, 400, 500. In addition, if this embodiment and the input of the "information on station" are used together, since information on the location where the observer exists, which direction the observer is directed to, or the like can be added, the "information on station" can be displayed in the image forming devices 111, 211 at a higher accuracy.

An embodiment where, before the virtual image is formed in the optical devices 120, 320, 520 based on the light emitted from the image forming devices 111, 211 (refer to FIG. 8B), the light shielding ratio of the virtual image projection region 711 of the light regulating device 700 is increased (refer to FIG. 8A) may be employed. As a time after the light shielding ratio of the virtual image projection region 711 of the light regulating device 700 is increased until the virtual image is formed, 0.5 seconds to 30 seconds may be exemplified. However, the present disclosure is not limited thereto. In some embodiment, the light shielding ratio of the virtual image projection region 711 of the light regulating device 700 may be configured to be sequentially increased as time elapses.

Figure 9A:
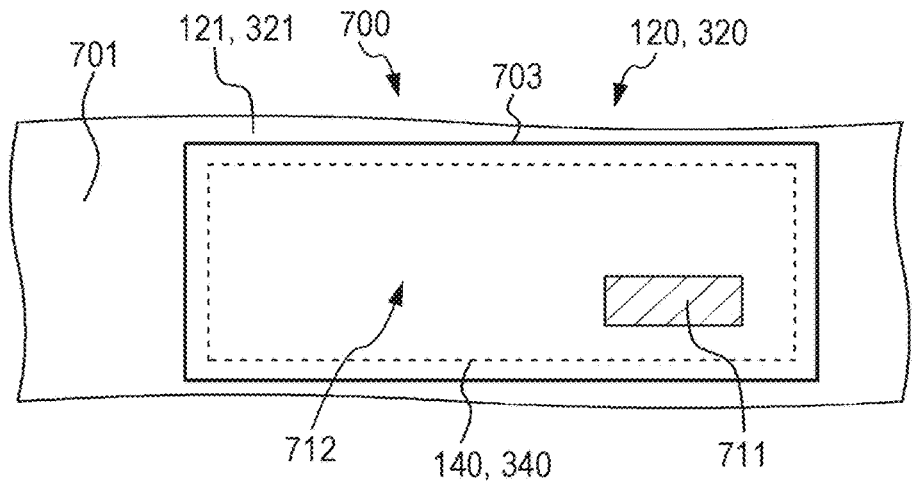
FIGS. 9A to 9C are views schematically illustrating a change or the like of the virtual image projection region of the light regulating device.
Figure 9B:
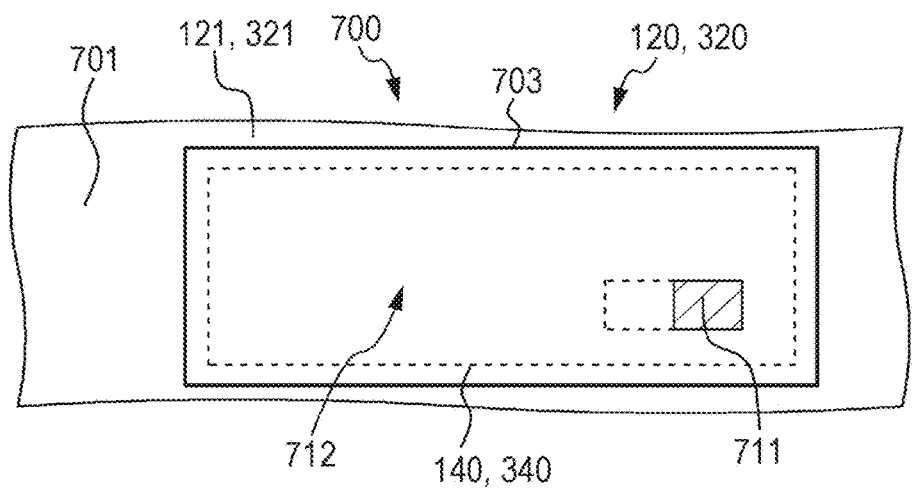
Figure 9C:
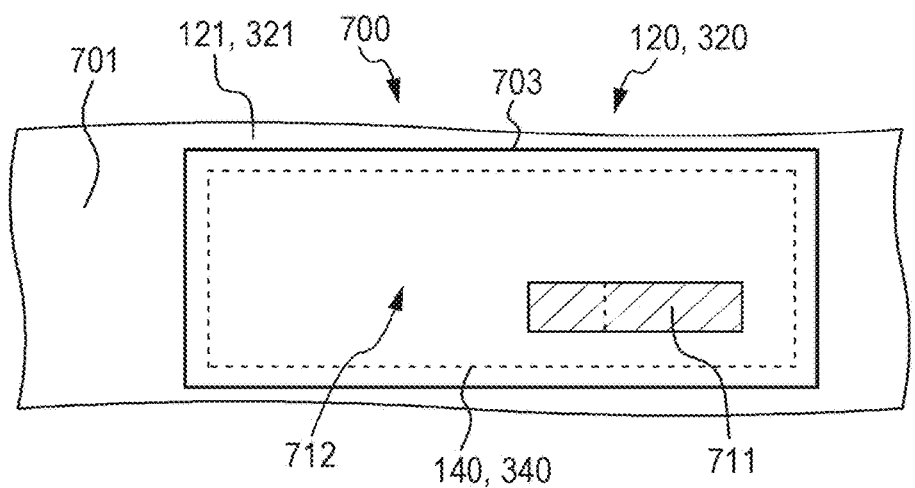

A case where one virtual image is formed in the optical devices 120, 320, 520 based on the light emitted from the image forming devices 111, 211 and, after that, the next virtual image different from the one virtual image is formed is considered. in some embodiment, in this case, when an area of the virtual image projection region 711 of the light regulating device 700 corresponding to the one virtual image is denoted by $S_1$ and an area of the virtual image projection region 711 of the light regulating device 700 corresponding to the next virtual image is denoted by $S_2$, in a case where $S_2/S_1 < 0.8$ or $1 < S_2/S_1$, the virtual image projection region 711 of the light regulating device 700 where the next virtual image is formed may be a region of the light regulating device 700 where the projection image of the next virtual image to the light regulating device 700 is formed (refer to FIGS. 9A to 9C), and in a case where $0.8 \leq S_2/S_1 \leq 1$, the virtual image projection region 711 of the light regulating device 700 where the next virtual image is formed may be a region of the light regulating device 700 where the projection image of the one virtual image to the light regulating device 700 is formed. Namely, in some embodiment, in the formation of the next virtual image from the formation of the one virtual image, in a case where the area of the virtual image projection region is decreased by 0% to 20%, the virtual image projection region corresponding to the one virtual image may be retained (namely, the state illustrated in FIG. 9A is maintained).

Figure 10:
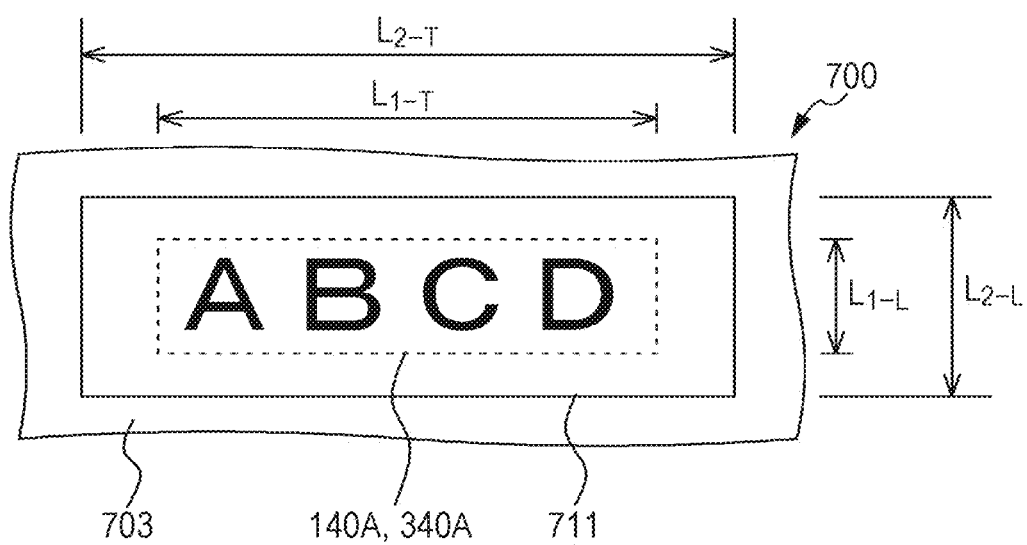
FIG. 10 is a view schematically illustrating a virtual rectangle circumscribing a virtual image formed in the optical device and a rectangular shape of a virtual image projection region of the light regulating device.

In addition, as illustrated in FIG. 10, when virtual rectangles 140A, 340A circumscribing the virtual image formed in the optical devices 120, 320, 520 is considered, the virtual image projection region 711 of the light regulating device 700 may be configured to be larger than the virtual rectangles 140A, 340A. In addition, in this case, when lateral and longitudinal lengths of the virtual rectangles 140A, 340A circumscribing the virtual image formed in the optical devices 120, 320, 520 are denoted by $L_{1-T}$ and $L_{1-L}$, respectively, and when the shape of the virtual image projection region 711 of the light regulating device 700 is defined as a shape of a rectangle having lateral and longitudinal lengths of $L_{2-T}$ and $L_{2-L}$, the following relationships are preferably satisfied;

$$1.0 \leq L_{2-T}/L_{1-T} \leq 1.5$$

$$1.0 \leq L_{2-L}/L_{1-L} \leq 1.5$$

FIG. 10 illustrates a state where "ABCD" is formed as a virtual image.

The light regulating device 700 may be in an operation state all the time. Alternatively, the operation/non-operation (on/off) state may be defined according to instruction (manipulation) of the observer.

Alternatively, the light regulating device may be in a non-operation state at a normal time and start operation based on the signals for displaying the image in the image display devices 100, 200, 300, 400, 500. In order to define the operation/non-operation state according to the instruction (manipulation) of the observer, for example, the display apparatus may further include a microphone, and the control of operation of the light regulating device 700 may be performed by audio input through the microphone. Specifically, switching of operation/non-operation of the light regulating device 700 may be controlled according to the instruction based on the voice of the observer. Alternatively, the to-be-acquired information may be input by the audio input. Alternatively, the display apparatus may further include an IR incidence/emitting device, and the control of operation of the light regulating device 700 may be performed by the IR incidence/emitting device. Specifically, by detecting blink of the observer by using the IR incidence/emitting device, the switching of operation/non-operation of the light regulating device 700 may be controlled.

As described above, in the display apparatus according to the first embodiment, when the virtual image is formed in a portion of the virtual image forming region based on the light emitted from the image forming device, since the light regulating device is controlled so that the light shielding ratio of the virtual image projection region of the light regulating device where the projection image of the virtual image to the light regulating device is included is higher than the light shielding ratio of the other region of the light regulating device, high contrast can be provided to the virtual image observed by the observer, and since the high light shielding ratio region does not occupy the entire light regulating device and only the narrow region, that is, the virtual image projection region of the light regulating device where the projection image of the virtual image to the light regulating device is included becomes the high light shielding ratio region, the observer using the display apparatus can securely and safely recognize the external environment.

Second Embodiment

Figure 11:
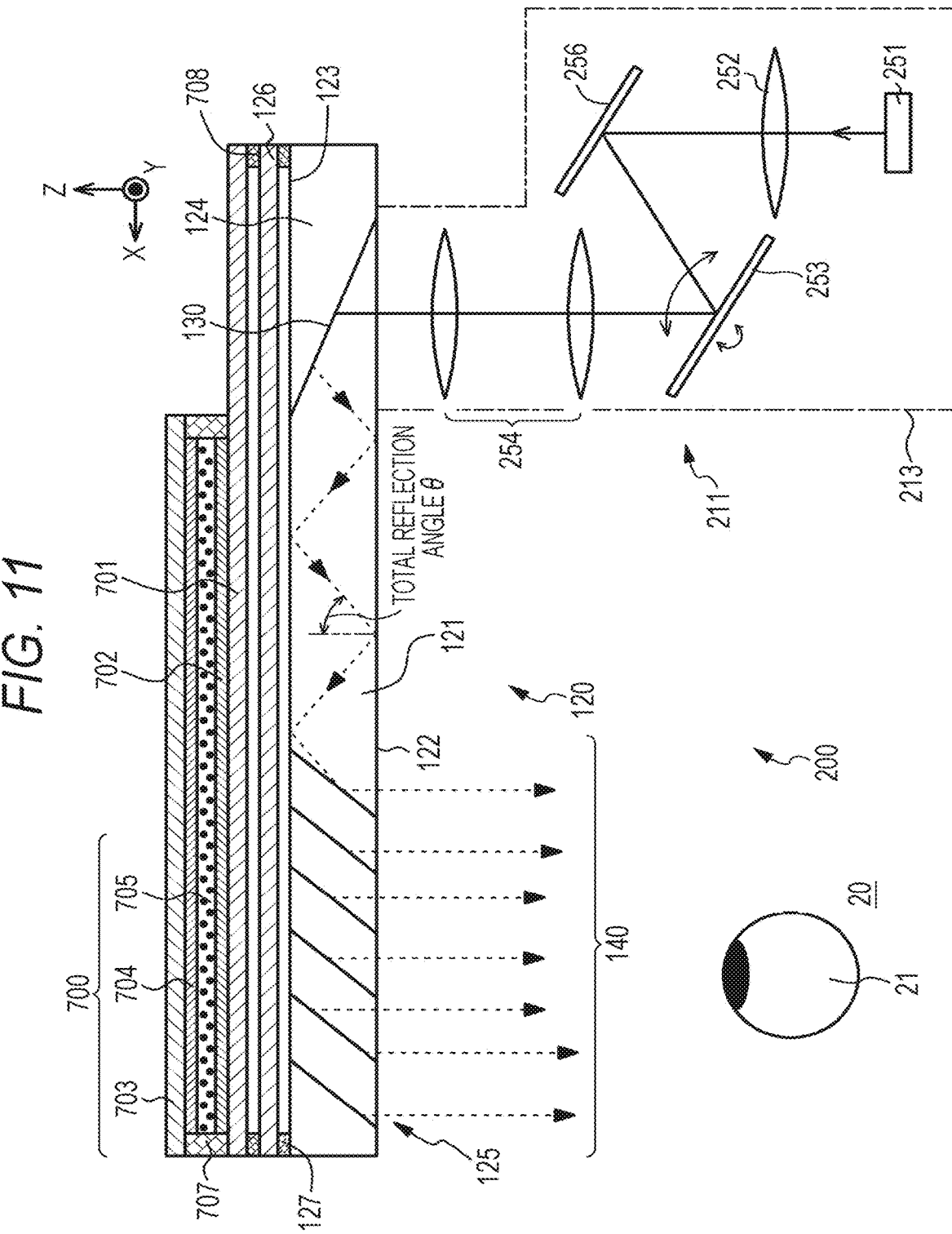
FIG. 11 is a conceptual view of an image display device in a display apparatus according to a second embodiment.

A second embodiment is a modification of the first embodiment. As a conceptual view of an image display device 200 in a display apparatus (head mounted display) according to the second embodiment is illustrated in FIG. 11, in the second embodiment, an optical device is a first-A-structure optical device, and the image forming device 211 is a second-configuration image forming device. Namely, the image forming device includes a light source 251 and a scanning unit 253 which scans parallel light emitted from the light source 251. More specifically, the image forming device 211 is configured to include the light source 251, a collimator optical system 252 which converts light emitted from the light source 251 into the parallel light, the scanning unit 253 which scans the parallel light emitted from the collimator optical system 252, and a relay optical system 254 which relays and emits the parallel light scanned by the scanning unit 253. Furthermore, the entire image forming device 211 may be accommodated in a housing 213 (in FIG. 11, indicated by a dashed-dotted line). An opening (not shown) is provided to the associated housing 213, and light is emitted through the opening from the relay optical system 254. In addition, each housing 213 is detachably attached to the temple 13 by the installation member 19.

The light source 251 is configured with a light emitting element which emits white light. In addition, the light emitted from the light source 251 is incident on the collimator optical system 252 having a totally positive optical power and is emitted as parallel light. In addition, the parallel light is reflected by a total reflection mirror 256, and by allowing a micro mirror to rotatably move in two-dimensional directions, the incident parallel light is horizontally scanned and vertically scanned by the scanning unit 253 configured with an MEMS which can scan two-dimensionally to form a kind of two-dimensional image, so that virtual pixels (the number of pixels are set to be the same as that of, for example, the first embodiment) are formed. In addition, the light from the virtual pixels passes through the relay optical system (parallel light emitting optical system) 254 configured with a well-known relay optical system, so that a light flux formed as parallel light is incident on the optical device 120.

Since the optical device 120 where the light flux formed as parallel light in the relay optical system 254 is incident, guided, and emitted has the same configuration and structure as those of the optical device of the first embodiment, the detailed description thereof is not provided. In addition, as described above, since the display apparatus according to the second embodiment also has substantially the same configuration and structure as the display apparatus according to the first embodiment except that the image forming device 211 is different, the detailed description is not provided.

Third Embodiment

Figure 12:
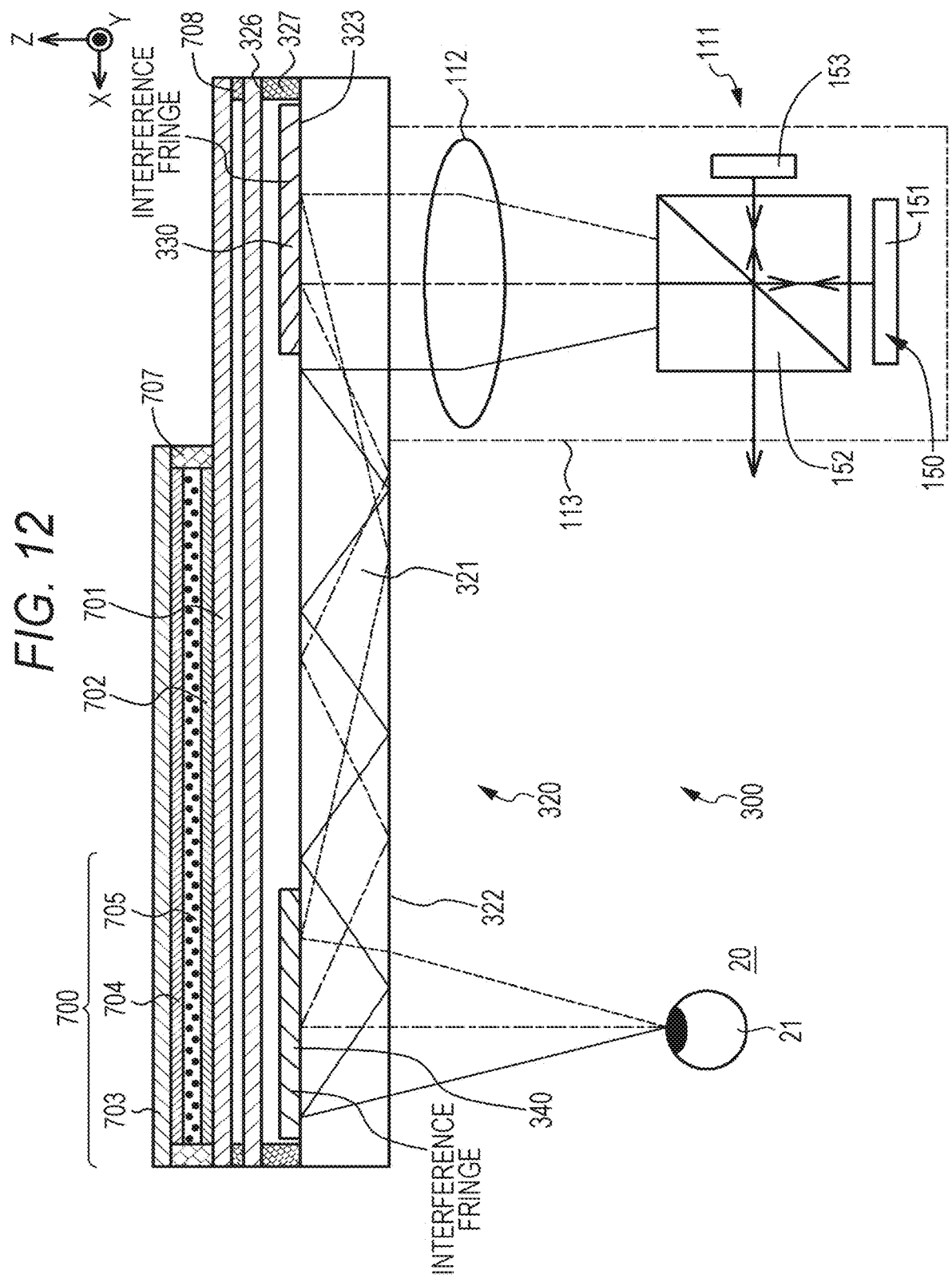
FIG. 12 is a conceptual view of an image display device in a display apparatus according to a third embodiment.
Figure 13:
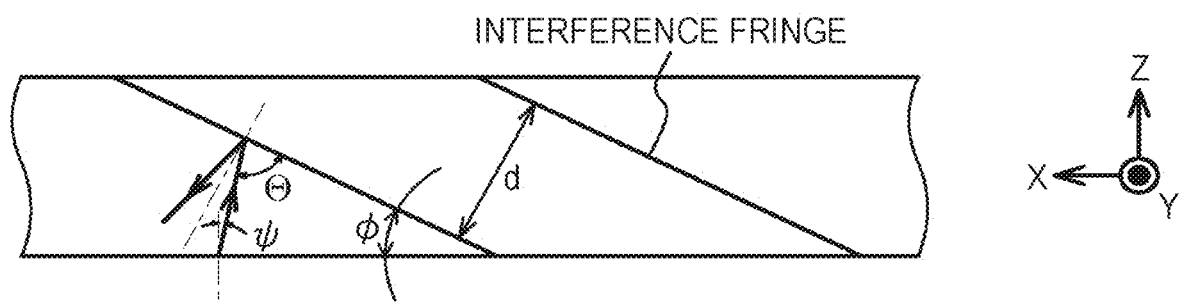
FIG. 13 is an enlarged schematic cross-sectional view illustrating a portion of a reflective volume hologram diffraction grating in the display apparatus according to the third embodiment.

A third embodiment is also a modification of the first embodiment. A conceptual view of an image display device 300 in a display apparatus (head mounted display) according to the third embodiment is illustrated in FIG. 12. In addition, an enlarged schematic cross-sectional view of a portion of a reflective volume hologram diffraction grating is illustrated in FIG. 13. In the third embodiment, similarly to the first embodiment, the image forming device 111 is a first-configuration image forming device. In addition, an optical device 320 has the same basic configuration and structure as those of the optical device 120 of the first embodiment except that the configurations and structures of a first deflecting unit and a second deflecting unit are different from those of the first embodiment, and the optical device 320 is an optical device having a first-B structure.

In the third embodiment, the first deflecting unit and the second deflecting unit are arranged and installed on a surface (specifically, the second surface 323 of the light guide plate 321) of the light guide plate 321. In addition, the first deflecting unit diffracts and reflects the light incident on the light guide plate 321, and the second deflecting unit diffracts and reflects the light propagating the inner portion of the light guide plate 321 by total reflection several times. Herein, the first deflecting unit and the second deflecting unit are configured with diffraction grating elements, specifically, reflective diffraction grating elements, more specifically, reflective volume hologram diffraction gratings. In the description hereinafter, the first deflecting unit configured with a reflective volume hologram diffraction grating is, for the convenience, referred to as a "first diffraction grating member 330", and the second deflecting unit configured with a reflective volume hologram diffraction grating is, for the convenience, referred to as a "second diffraction grating member 340".

In addition, in the third embodiment or the later-described fourth embodiment, the first diffraction grating member 330 and the second diffraction grating member 340 are configured by stacking single-layered diffraction grating layer. Furthermore, interference fringe corresponding to one type of wavelength band (or wavelength) is formed on each diffraction grating layer made of a photopolymer material, and the manufacturing method in the related art is used. The pitch of interference fringe formed in the diffraction grating layer (diffraction optical element) is constant, and the interference fringe has a shape of a straight line and is parallel to the Y axis. Furthermore, the axial line of the first diffraction grating member 330 and the axial line of the second diffraction grating member 340 are parallel to the X axis, and the normal line is parallel to the Z axis.

An enlarged schematic partial cross-sectional view of the reflective volume hologram diffraction grating is illustrated in FIG. 13. Interference fringe having an inclination angle (a slant angle) φ is formed in the reflective volume hologram diffraction grating. Herein, the inclination angle φ denotes an angle between the surface of the reflective volume hologram diffraction grating and the interference fringe. The interference fringe is formed over a range from the inner portion to the surface of the reflective volume hologram diffraction grating. The interference fringe satisfies Bragg's condition. Herein, the Bragg's condition denotes the condition that the following equation (A) is satisfied. In the equation (A), m is a positive integer, λ is a wavelength, d is a pitch of a grating plane (an interval of a virtual plane including the interference fringe in a normal direction), and θ denotes a complementary angle of the angle of incidence to the interference fringe. In addition, in a case where light penetrates the diffraction grating member at an incident angle ψ, the relationship among θ, the inclination angle φ, and the incident angle ψ is expressed by the equation (B).

$$m \cdot \lambda = 2 \cdot d \cdot \sin(\theta) \quad (A)$$

$$\theta = 90 \text{ degrees} - (\varphi + \psi) \quad (B)$$

As described above, the first diffraction grating member 330 is arranged and installed (adhered) to the second surface 323 of the light guide plate 321 and diffracts and reflects the parallel light incident on the light guide plate 321 so that the parallel light incident from the first surface 322 on the light guide plate 321 is totally reflected through the inner portion of the light guide plate 321. Moreover, as described above, the second diffraction grating member 340 is arranged and installed (adhered) to the second surface 323 of the light guide plate 321 and diffracts and reflects the parallel light propagating the inner portion of the light guide plate 321 by total reflection several times to be emitted from the first surface 322 in the state that the parallel light from the light guide plate 321 is maintained.

In addition, in the light guide plate 321, the parallel light propagates an inner portion thereof by total reflection and, after that, is emitted. At this time, since the light guide plate 321 is thin and the optical path where the light passes through the inner portion of the light guide plate 321 is long, the number of times of total reflection until the light reaches the second diffraction grating member 340 is different according to each angle of view. More specifically, among the parallel light beams incident on the light guide plate 321, the number of time of reflection of the parallel light incident with an angle in the direction being close to the second diffraction grating member 340 is smaller than the number of times of reflection of the parallel light incident on the light guide plate 321 with an angle in the direction being far away from the second diffraction grating member 340. This is because the parallel light which is diffracted and reflected in the first diffraction grating member 330 and is incident on the light guide plate 321 at an angle of the direction approaching the second diffraction grating member 340 is smaller than the parallel light which is incident on the light guide plate 321 at an angle of the direction opposite thereto in terms of the angle between the light propagating the inner portion of the light guide plate 321 and the normal line of the light guide plate 321 when the light collides with the inner surface of the light guide plate 321. In addition, the shape of the interference fringe formed in the inner portion of the second diffraction grating member 340 and the shape of the interference fringe formed in the inner portion of the first diffraction grating member 330 has a symmetry relationship with respect to the virtual plane perpendicular to the axial line of the light guide plate 321. The surfaces of the first diffraction grating member 330 and the second diffraction grating member 340 which do not face the light guide plate 321 is covered with the protection member (protective plate) 326, so that damage to the first diffraction grating member 330 and the second diffraction grating member 340 is prevented from occurring. Furthermore, the light guide plate 321 and the protection member 326 are adhered to each other in the outer periphery by the adhesive member 327. In addition, a transparent protection film may be adhered to the first surface 322 to protect the light guide plate 321.

Basically, the light guide plate 321 in the later-described fourth embodiment also has the same configuration and structure as those of the light guide plate 321 described above.

As described above, since the display apparatus according to the third embodiment has substantially the same configuration and structure as the display apparatus according to the first embodiment except that the optical device 320 is different, the detailed description is not provided.

Fourth Embodiment

Figure 14:
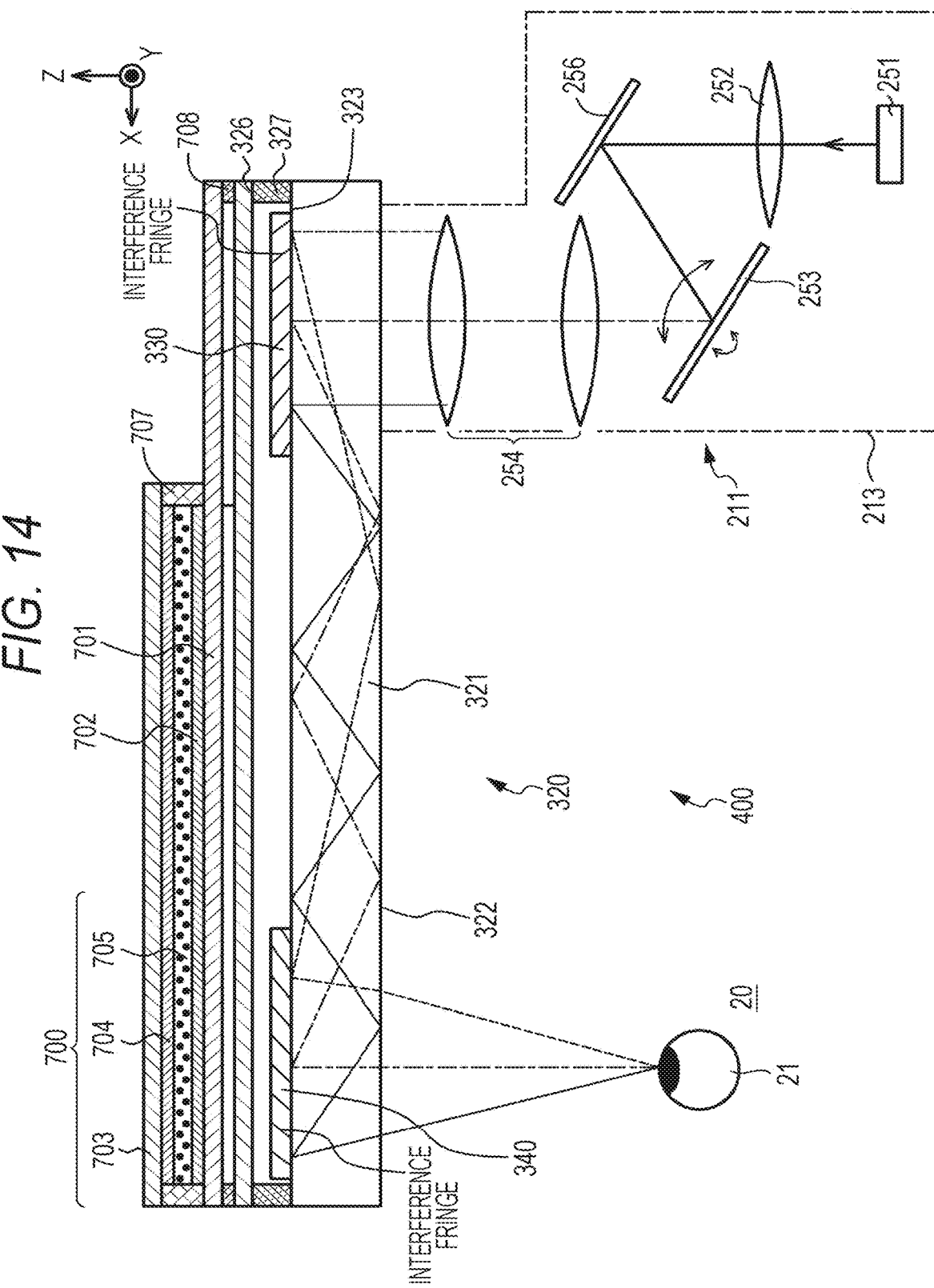
FIG. 14 is a conceptual view of an image display device in a display apparatus according to a fourth embodiment.

A fourth embodiment is a modification of the third embodiment. A conceptual view of an image display device in a display apparatus (head mounted display) according to the fourth embodiment is illustrated in FIG. 14. In the image display device 400 according to the fourth embodiment, the light source 251, the collimator optical system 252, the scanning unit 253, the parallel light emitting optical system (relay optical system 254), and the like have the same configurations and structures (second-configuration image forming device) as those of the second embodiment. In addition, the optical device 320 in the fourth embodiment has the same configuration and structure (optical device having a first-B structure) as the optical device 320 in the third embodiment. Since the display apparatus according to the fourth embodiment has substantially the same configuration and structure as the display apparatus according to the second embodiment except for the above-described differences, the detailed description is not provided.

Fifth Embodiment

Figure 15:
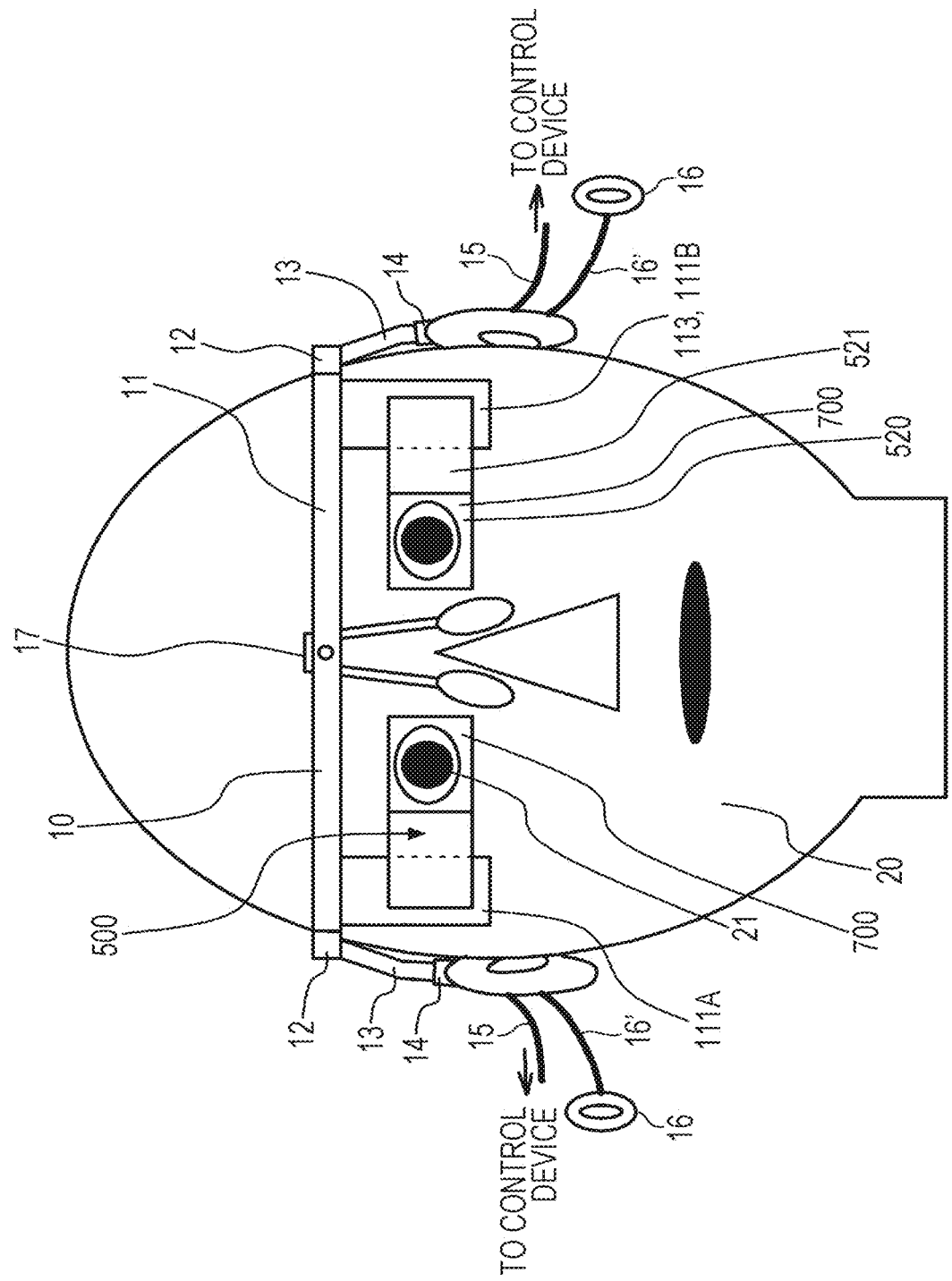
FIG. 15 is a schematic view as a display apparatus according to a fifth embodiment is viewed from the front side.
Figure 16:
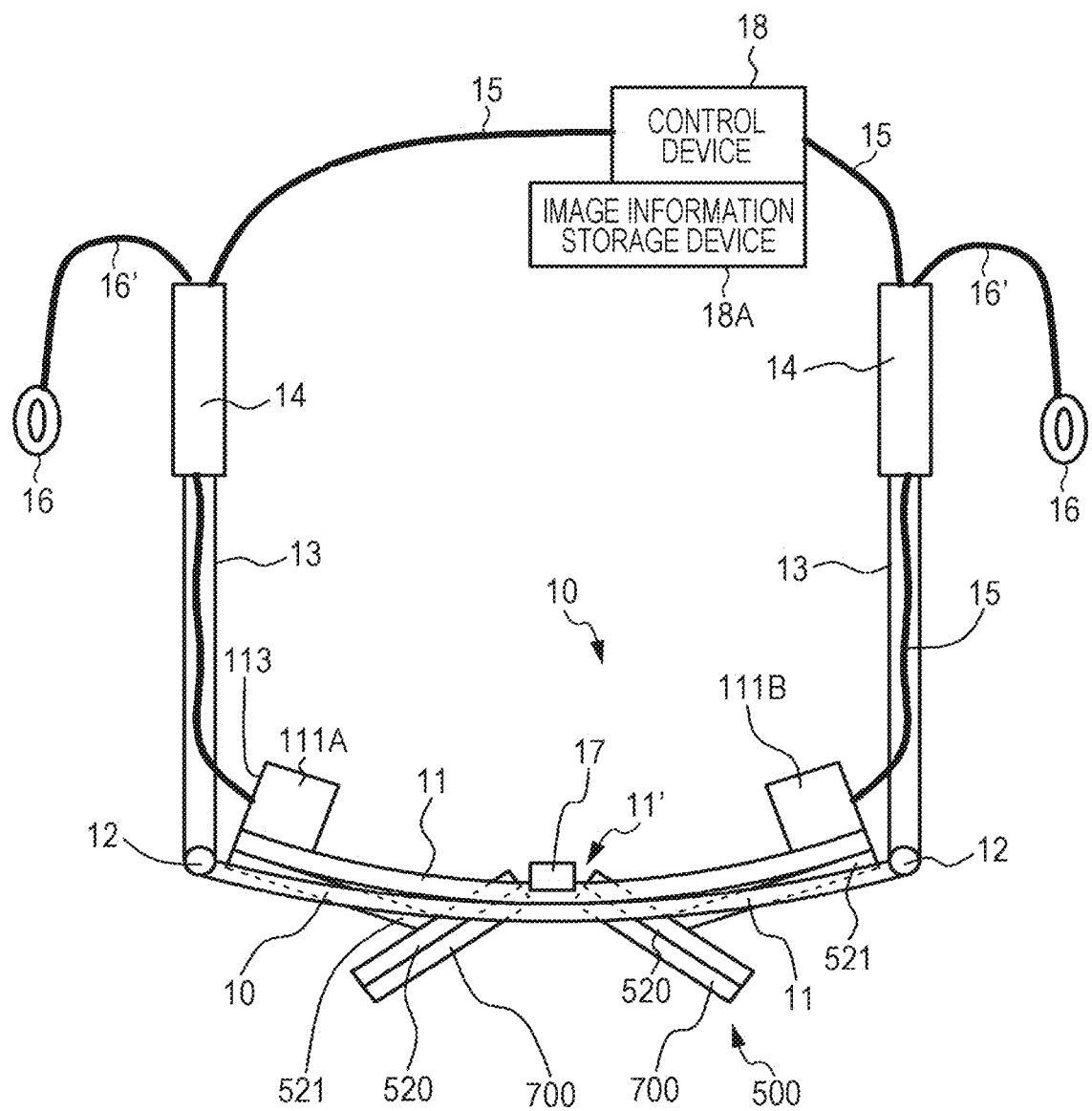
FIG. 16 is a schematic view as the display apparatus according to the fifth embodiment is viewed from the upper side.

A fifth embodiment is also a modification of the image display device according to the first to fourth embodiments. A schematic view as a display apparatus according to the fifth embodiment is viewed from the front side is illustrated in FIG. 15, and a schematic view viewed from the upper side is illustrated in FIG. 16.

In the fifth embodiment, the optical device 520 constituting the image display device 500 is configured with a semi-transparent mirror where the light emitted from the image forming devices 111A and 111B is incident and is emitted toward the pupil 21 of the observer 20. Furthermore, in the fifth embodiment, the light emitted from the image forming devices 111A and 111B propagates the inner portion of a transparent member 521 such as a glass plate or a plastic plate to be incident on the optical device 520 (semi-transparent mirror). However, the light may also propagate the air to be incident on the optical device 520. In addition, the image forming device may also be configured as the image forming device 211 described in the second embodiment.

Each of the image forming devices 111A and 111B is attached to the front portion 11 by using, for example, a screw. In addition, the member 521 is attached to each of the image forming devices 111A and 111B, the optical device 520 (semi-transparent mirror) is attached to the member 521, and the light regulating device 700 is attached to the optical device 520 (semi-transparent mirror). Since the display apparatus according to the fifth embodiment has substantially the same configuration and structure as the display apparatus according to the first to fourth embodiments except for the above-described differences, the detailed description is not provided.

Sixth Embodiment

Figure 17:
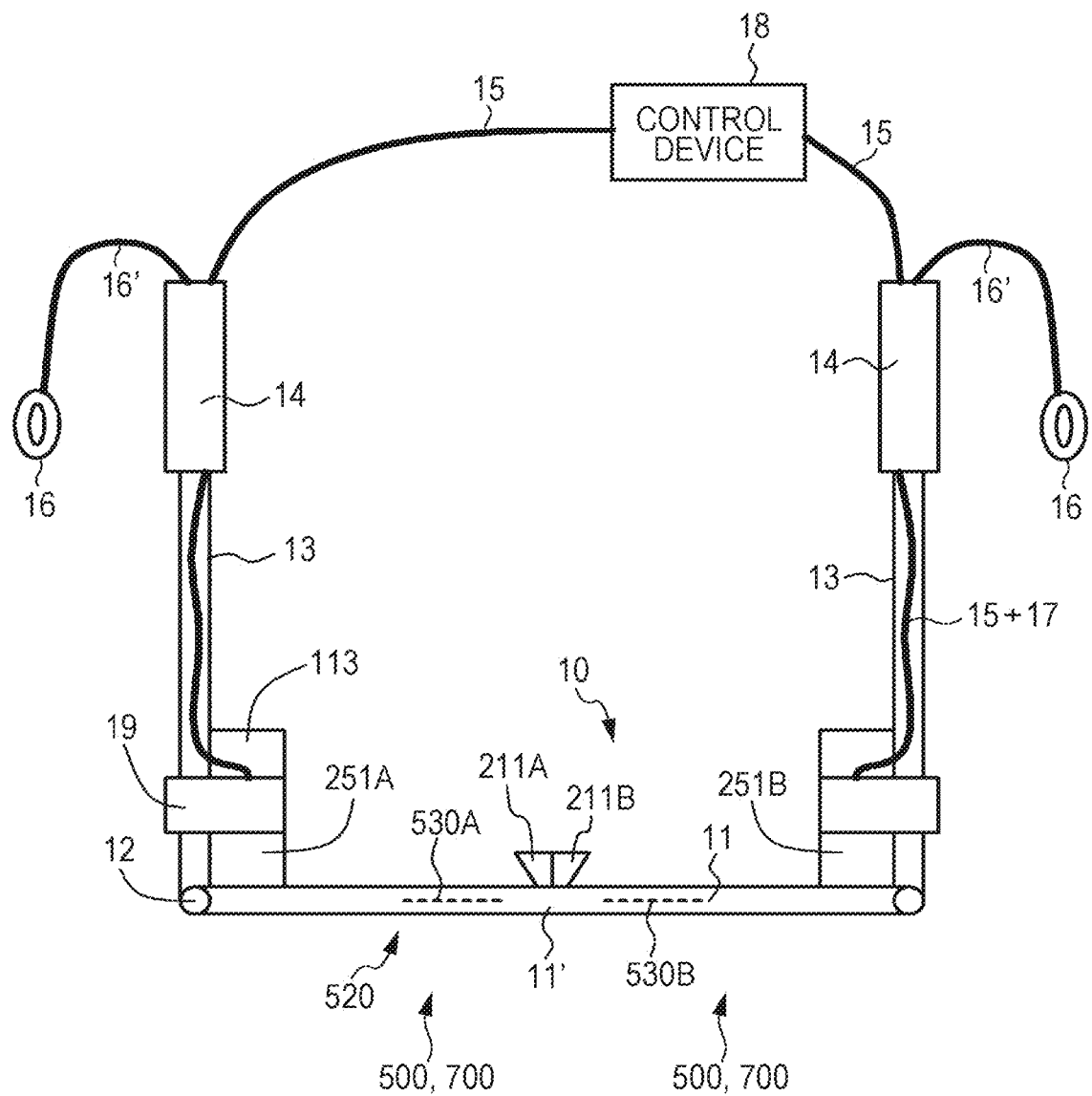
FIG. 17 is a schematic view as a display apparatus according to a sixth embodiment is viewed from the upper side.

The sixth embodiment is also modification of the image display device in the first to fourth embodiments and relates to a second-structure optical device and a second-configuration image forming device. A schematic view as the display apparatus according to the sixth embodiment is viewed from the upper side is illustrated in FIG. 17. Furthermore, in FIG. 17, the imaging device 17 is omitted in illustration.

In the sixth embodiment, the optical device 520 constituting the image display device 500 is configured with semi-transparent mirrors 530A and 530B where the light emitted from light sources 251A and 251B is incident and is emitted toward the pupils 21 of the observer 20. Furthermore, in the sixth embodiment, the light emitted from the light source 251 installed in the housing 213 propagates an inner portion of an optical fiber (not shown) to be incident on the scanning unit 253 attached to, for example, the portion 11' of the frame 10 in the vicinity of the nose pads, and the light scanned by the scanning unit 253 is incident on the semi-transparent mirrors 530A and 530B. Alternatively, the light emitted from the light sources 251A and 251B installed in the housing 213 propagates an inner portion of an optical fiber (not shown) to be incident on the scanning unit 253 attached to, for example, the upper sides of the portions of the frame 10 corresponding to the two eyes, and the light scanned by the scanning unit 253 is incident on the semi-transparent mirrors 530A and 530B. Alternatively, the light which is emitted from the light sources 251A and 251B installed in the housing 213 and is incident on the scanning unit 253 installed in the housing 213 to be scanned by the scanning unit 253 is directly incident on the semi-transparent mirrors 530A and 530B. In addition, the light reflected by the semi-transparent mirrors 530A and 530B is incident on the pupils of the observer. The image forming device may be configured substantially as the image forming device 211 described in the second embodiment. The display apparatus according to the sixth embodiment has substantially the same configuration and structure as those of the display apparatus according to the first to fourth embodiments except for the difference described above, and thus, the detailed description is not provided.

Seventh Embodiment

Figure 18A:
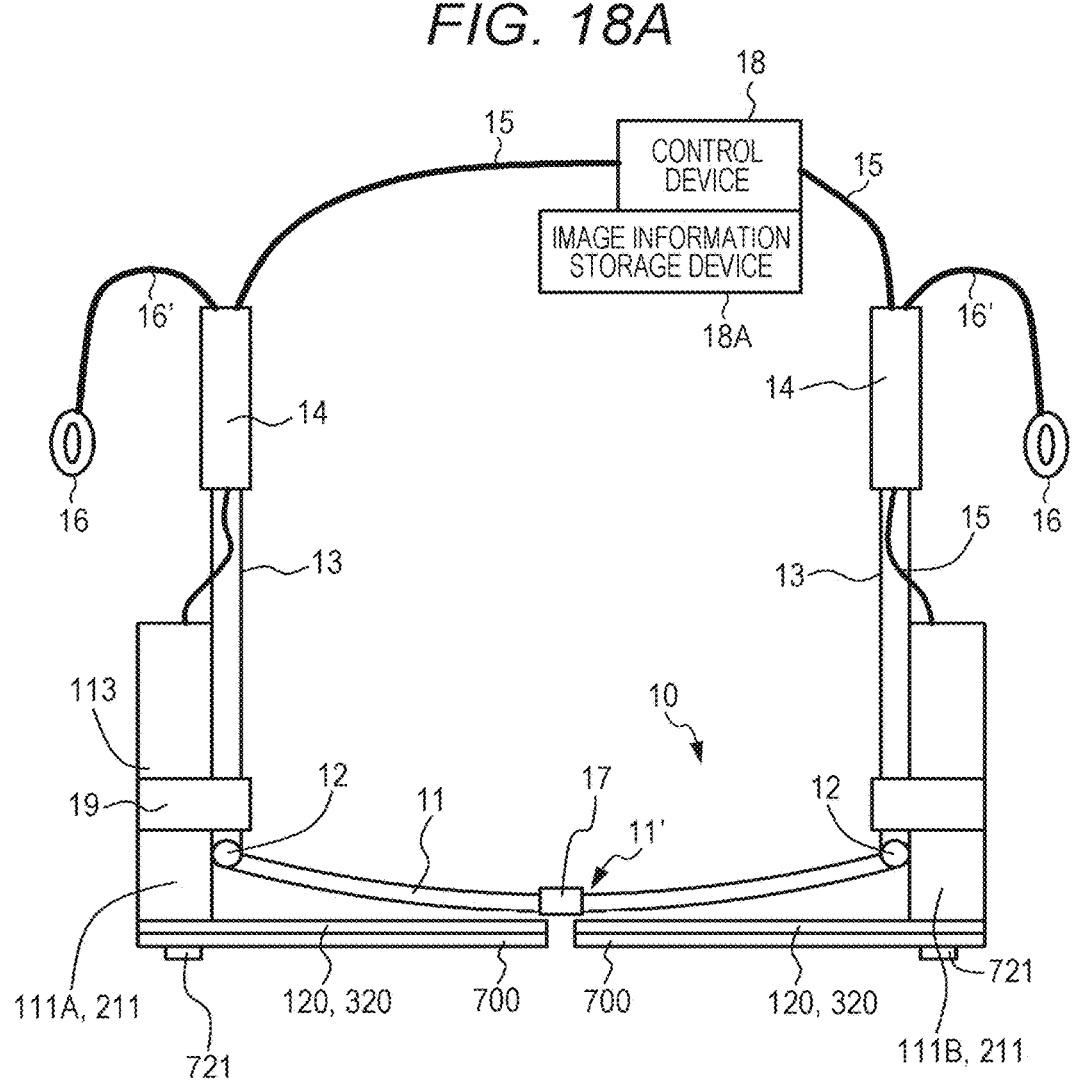
FIGS. 18A and 18B are a schematic view as a display apparatus according to a seventh embodiment is viewed from the upper side and a schematic diagram of a circuit which controls an illuminance sensor, respectively.
Figure 18B:
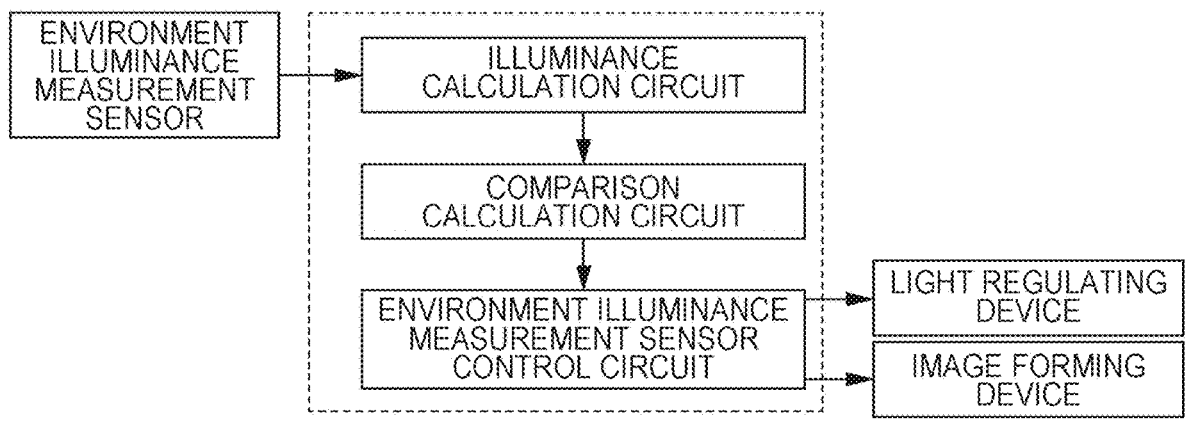

A seventh embodiment is a modification of the first embodiment. A schematic view as the display apparatus according to the seventh embodiment is viewed from the upper side is illustrated in FIG. 18A. In addition, a schematic diagram of a circuit which controls an illuminance sensor is illustrated in FIG. 18B.

The display apparatus according to the seventh embodiment is configured to further include an illuminance sensor (environment illuminance measurement sensor) 721 which measures the illuminance of the environment where the display apparatus is placed to control a light shielding ratio of the light regulating device 700 based on a measurement result of the illuminance sensor (environment illuminance measurement sensor) 721. The luminance of the image formed by the image forming devices 111, 211 is controlled together or independently based on the measurement result of the illuminance sensor (environment illuminance measurement sensor) 721. The environment illuminance measurement sensor 721 having well-known configuration and structure may be arranged in, for example, the outer end portion of the optical devices 120, 320 or the outer end portion of the light regulating device 700. The environment illuminance measurement sensor 721 is connected through a connector and a wiring line (not shown) to the control device 18. The control device 18 includes a circuit which controls the environment illuminance measurement sensor 721. The circuit which controls the environment illuminance measurement sensor 721 may be configured to include an illuminance calculation circuit which receives a measurement value from the environment illuminance measurement sensor 721 to obtain the illuminance, a comparison calculation circuit which compares the value of the illuminance obtained by the illuminance calculation circuit with a standard value, and an environment illuminance measurement sensor control circuit which controls the light regulating device 700 and/or the image forming devices 111, 211 based on the value obtained by the comparison calculation circuit. However, the circuit may be configured with a well-known circuit. With respect to the control of the light regulating device 700, the control of the light shielding ratio of the light regulating device 700 is performed; and with respect to the control of the image forming devices 111, 211, the control of the luminance of the image formed by the image forming devices 111, 211 is performed. Furthermore, the control of the light shielding ratio of the light regulating device 700 and the control of the luminance of the image in the image forming devices 111, 211 may be independently performed or may be performed in correspondence with each other.

For example, when the measurement result of the illuminance sensor (environment illuminance measurement sensor) 721 is a predetermined value (first illuminance measurement value) or more, the light shielding ratio of the light regulating device 700 is set as a predetermined value (first light shielding ratio) or more. On the other hand, when the measurement result of the illuminance sensor (environment illuminance measurement sensor) 721 is a predetermined value (second illuminance measurement value) or less, the light shielding ratio of the light regulating device 700 is set as a predetermined value (second light shielding ratio) or less. Herein, as a first illuminance measurement value, 10 lux may be exemplified; as a first light shielding ratio, any value of 99% to 70% may be exemplified; as a second illuminance measurement value, 0.01 lux may be exemplified; and as a second light shielding ratio, any value of 49% to 1% may be exemplified.

Furthermore, the illuminance sensor (environment illuminance measurement sensor) 721 in the seventh embodiment may be applied to the display apparatus described in the second to sixth embodiments. In addition, in a case where display apparatus include the imaging device 17, the illuminance sensor (environment illuminance measurement sensor) 721 may be configured with a light receiving element for exposure measurement which is installed in the imaging device 17.

In the display apparatus according to the seventh embodiment or the later-described eighth embodiment, the light shielding ratio of the light regulating device is controlled based on a measurement result of the illuminance sensor (environment illuminance measurement sensor), the luminance of the image formed by the image forming device is controlled based on a measurement result of the illuminance sensor (environment illuminance measurement sensor), the light shielding ratio of the light regulating device is controlled based on a measurement result of the second illuminance sensor (transmitting light illuminance measurement sensor), and the luminance of the image formed by the image forming device is controlled based on a measurement result of the second illuminance sensor (transmitting light illuminance measurement sensor). Therefore, it may be possible to provide high contrast to the virtual image observed by the observer, and it may be possible to optimize the observation state of the virtual image depending on the illuminance of the surrounding environment where the display apparatus is placed.

Eighth Embodiment

Figure 19A:
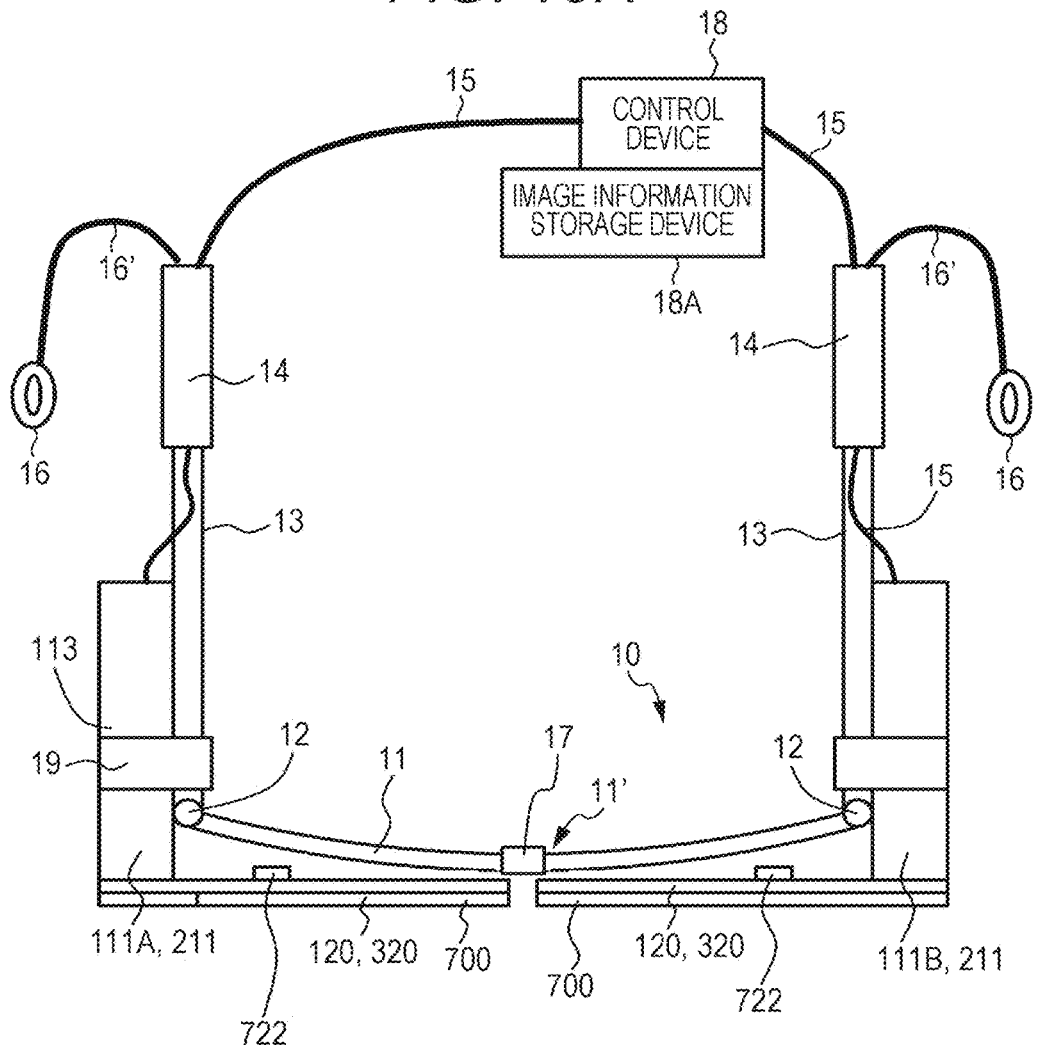
FIGS. 19A and 19B are a schematic view as a display apparatus according to an eighth embodiment is viewed from the upper side and a schematic diagram of a circuit which controls an illuminance sensor, respectively.
Figure 19B:
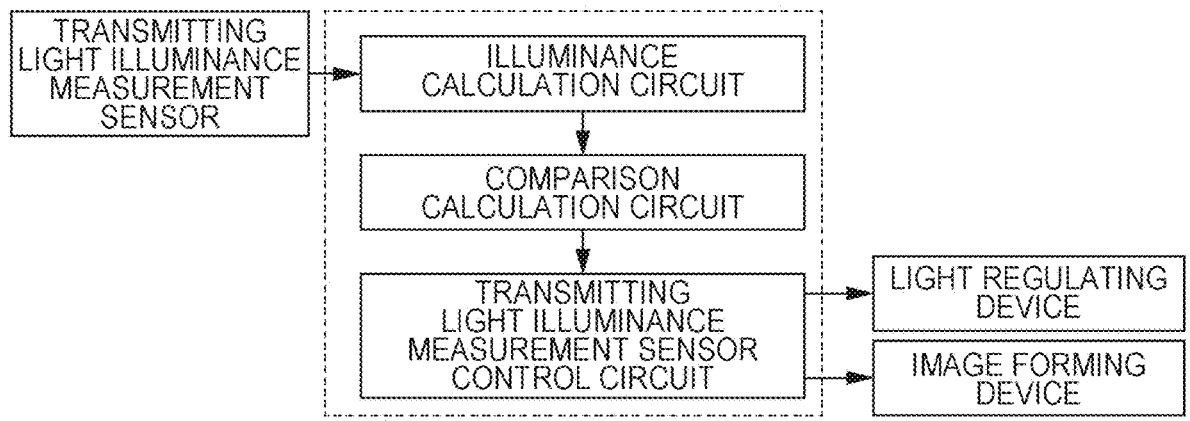

An eighth embodiment is also a modification of the first embodiment. A schematic view as a display apparatus according to the eighth embodiment is viewed from the upper side is illustrated in FIG. 19A. In addition, a schematic diagram of a circuit which controls a second illuminance sensor is illustrated in FIG. 19B.

The display apparatus according to the eighth embodiment further includes a second illuminance sensor (transmitting light illuminance measurement sensor) 722 which measures illuminance based on the light passing from the external environment through the light regulating device, namely, measures whether or not the environment light passes through the light regulating device to be adjusted to a desired illuminance to be incident, and the light shielding ratio of the light regulating device 700 is controlled based on the measurement result of the second illuminance sensor (transmitting light illuminance measurement sensor) 722. in addition, together or independently, the luminance of the image formed by the image forming devices 111, 211 is controlled based on the measurement result of the second illuminance sensor (transmitting light illuminance measurement sensor) 722. The transmitting light illuminance measurement sensor 722 having well-known configuration and structure is disposed in a side closer to the observer than the optical devices 120, 320, 520. Specifically, the transmitting light illuminance measurement sensor 722 may be disposed, for example, on an inner surface of the housings 113, 213 or a surface of the observer side of the light guide plates 121, 321. The transmitting light illuminance measurement sensor 722 is connected to a control device 18 through a connector and a wiring line (not shown). The control device 18 includes a circuit which controls the transmitting light illuminance measurement sensor 722. The circuit which controls the transmitting light illuminance measurement sensor 722 may be configured to include an illuminance calculation circuit which receives a measurement value from the transmitting light illuminance measurement sensor 722 to obtain the illuminance, a comparison calculation circuit which compares the value of the illuminance obtained by the illuminance calculation circuit with a standard value, and a transmitting light illuminance measurement sensor control circuit which controls the light regulating device 700 and/or the image forming devices 111, 211 based on the value obtained by the comparison calculation circuit. However, the circuit may be configured with a well-known circuit. With respect to the control of the light regulating device 700, the control of the light shielding ratio of the light regulating device 700 is performed, and on the other hand, with respect to the control of the image forming devices 111, 211, the control of the luminance of the image formed by the image forming devices 111, 211 is performed. Furthermore, the control of the light shielding ratio of the light regulating device 700 and the control of the luminance of the image in the image forming devices 111, 211 may be independently performed or may be performed in correspondence with each other. Moreover, in a case where the measurement result of the transmitting light illuminance measurement sensor 722 is not controlled from the illuminance of the environment illuminance measurement sensor 721 to the desired illuminance, namely, in a case where the measurement result of the transmitting light illuminance measurement sensor 722 does not become the desired illuminance, or in a case where further fine illuminance adjustment is desired, the light shielding ratio of the light regulating device may be regulated while monitoring the value of the transmitting light illuminance measurement sensor 722. At least two second illuminance sensors (transmitting light illuminance measurement sensors) may be arranged, and the measurement of illuminance based on the light passing through a high light shielding ratio portion and the measurement of illuminance based on the light passing through a low light shielding ratio portion may be performed.

Furthermore, the second illuminance sensor (transmitting light illuminance measurement sensor) 722 in the eighth embodiment may be applied to the display apparatus described in the second to sixth embodiments. Alternatively, the second illuminance sensor (transmitting light illuminance measurement sensor) 722 in the eighth embodiment and the illuminance sensor (environment illuminance measurement sensor) 721 in the seventh embodiment may be combined; and in this case, various tests are performed, and the control of the light shielding ratio of the light regulating device 700 and the control of the luminance of the image in the image forming devices 111, 211 may be independently performed or may be performed in correspondence with each other. In the light regulating device for the right eye and the light regulating device for the left eye, respectively, by adjusting voltages applied to the first transparent electrode and the second transparent electrode, equalization between the light shielding ratio of the light regulating device for the right eye and light shielding ratio of the light regulating device for the left eye may be implemented. The potential difference between the first transparent electrode and the second transparent electrode may be controlled, and the voltage applied to the first transparent electrode and the voltage applied to the second transparent electrode may be independently controlled. The light shielding ratio of the light regulating device for the right eye and light shielding ratio of the light regulating device for the left eye may be controlled, for example, based on the measurement result of the second illuminance sensor (transmitting light illuminance measurement sensor) 722. Alternatively, by observing the brightness of the light passing through the light regulating device and optical device for the right eye and the brightness of the light passing through the light regulating device and optical device for the left eye by the observer, the observer may manually perform the control and regulation by manipulating a switch, a button, a dial, a slider, a knob, and the like.

Ninth Embodiment

Figure 20:
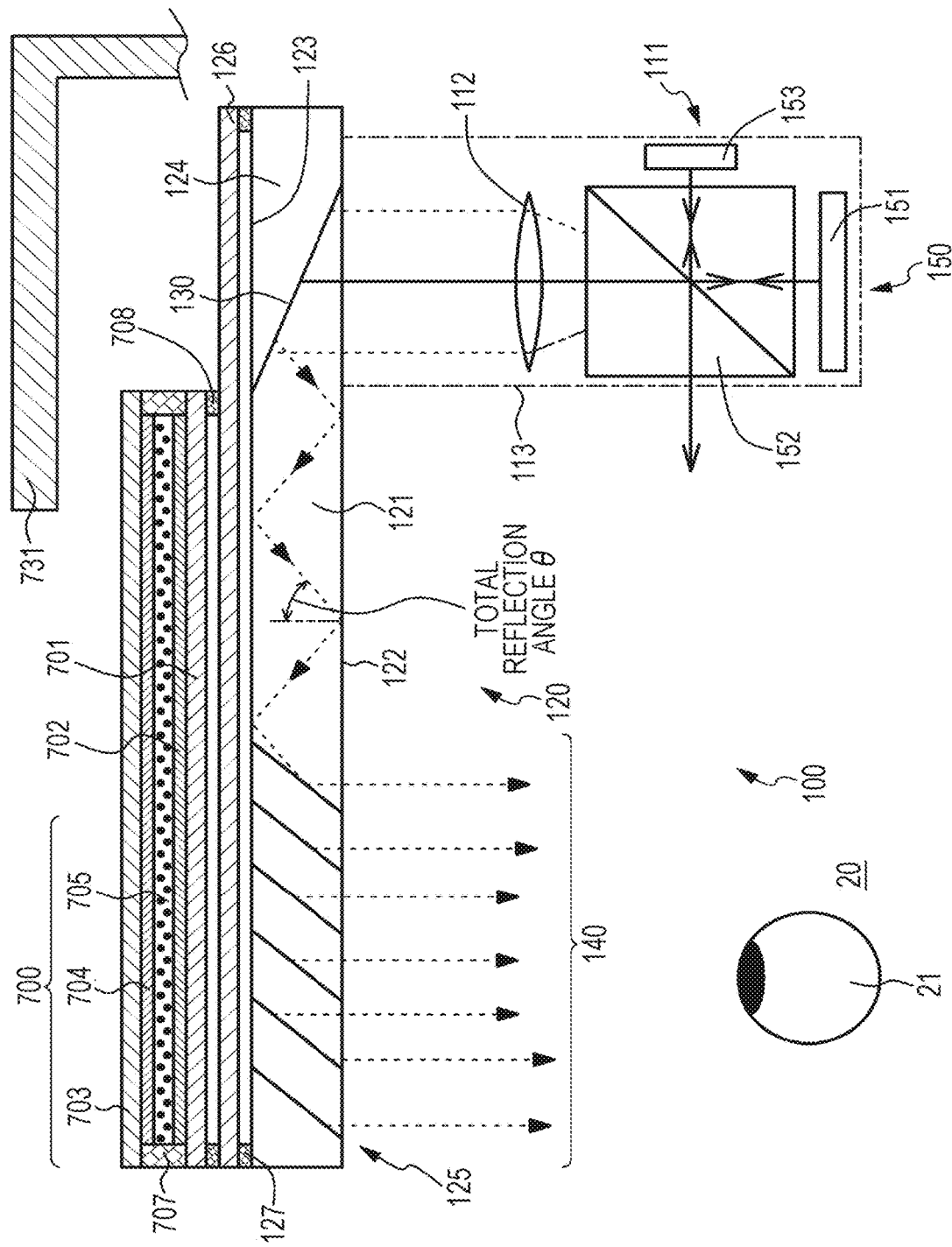
FIG. 20 is a conceptual view of an image display device in a display apparatus according to a ninth embodiment.
Figure 21:
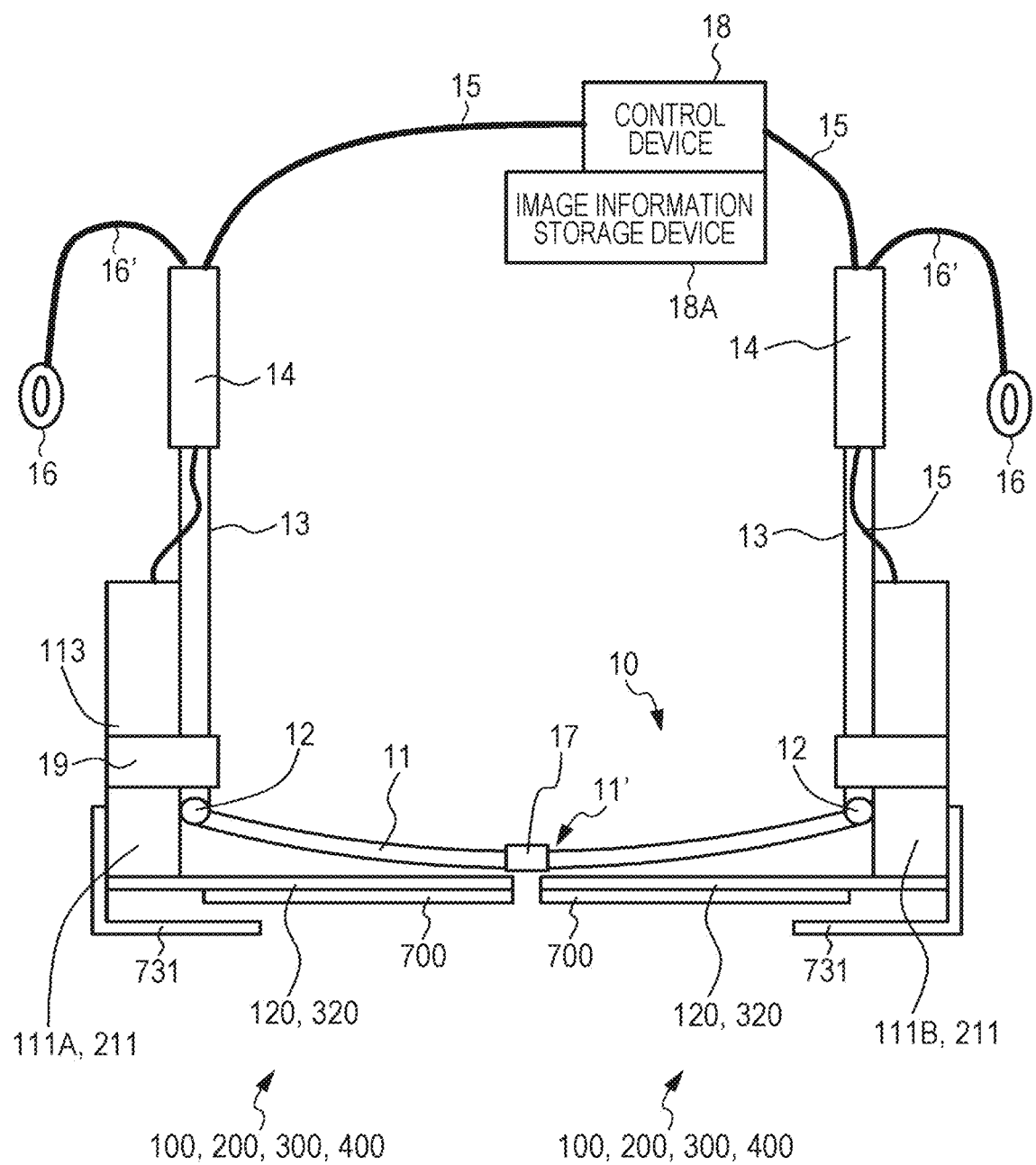
FIG. 21 is a schematic view as the display apparatus according to the ninth embodiment is viewed from the upper side.
Figure 22:
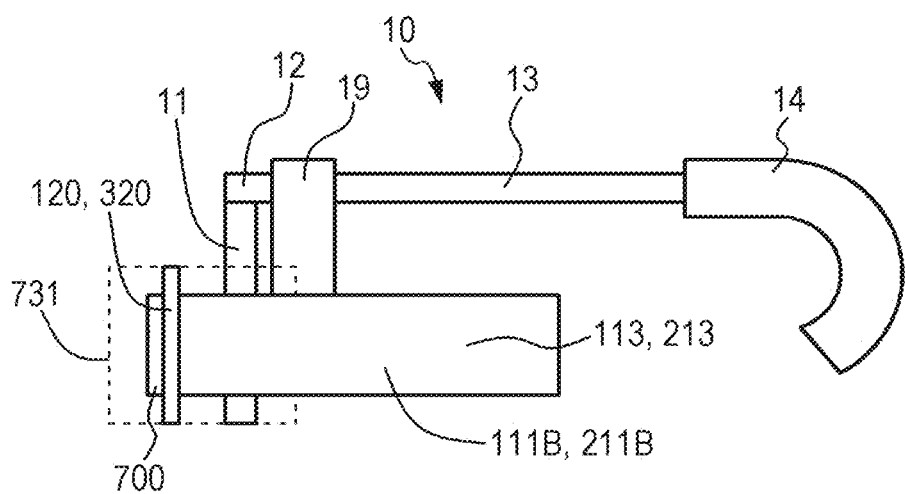
FIG. 22 is a schematic view as the display apparatus according to the ninth embodiment is viewed from the lateral side.

A ninth embodiment is a modification of the first to eighth embodiments. A conceptual view of an image display device is illustrated in FIG. 20, a schematic view as the display apparatus is viewed from the upper side is illustrated in FIG. 21, and a schematic view as the display apparatus is viewed from the lateral side is illustrated in FIG. 22. A light shielding member 731 may be installed in the display apparatus according to the ninth embodiment. Specifically, for example, the light shielding member 731 which blocks the incidence of the external light to the optical device 120 is arranged in the region of the optical device 120 where the light emitted from the image forming devices 111A and 111B is incident, specifically, the region where the first deflecting unit 130 is installed. Herein, the region of the optical device 120 where the light emitted from the image forming devices 111A and 111B is incident is included within the projection image of the light shielding member 731 to the optical device 120. In addition, the projection image of the end portion of the light regulating device 700 to the optical device 120 is included within the projection image of the light shielding member 731 to the optical device 120. The light shielding member 731 is disposed at the side of the optical device 120 opposite to the side where the image forming devices 111A and 111B is disposed so as to be separated from the optical device 120. The light shielding member 731 is made of, for example, a non-transparent plastic material, and the light shielding member 731 extends integrally from the housing 113 of the image forming devices 111A and 111B. Alternatively, the light shielding member is attached to the housing 113 of the image forming devices 111A and 111B. Alternatively, the light shielding member extends integrally from the frame 10. Alternatively, the light shielding member is attached to the frame 10. Furthermore, in the illustrated example, the light shielding member 731 extends integrally from the housing 113 of the image forming devices 111A and 111B. In this manner, since the light shielding member blocking the incidence of external light to the optical device is arranged in the region of the optical device where the light emitted from the image forming device is incident, even though the light amount of incidence of the external light is changed due to the operation of the light regulating device, since the external light is not incident on the region of the optical device where the light emitted from the image forming device is incident, specifically, on the first deflecting unit 130, there is no problem in that the image display quality of the display apparatus is deteriorated due to the occurrence of undesired stray light or the like. Furthermore, in the illustrated example, the size of the first substrate 701 of the light regulating device 700 is configured to be smaller than that of the light guide plate 121, but the present disclosure is not limited thereto.

Figure 23:
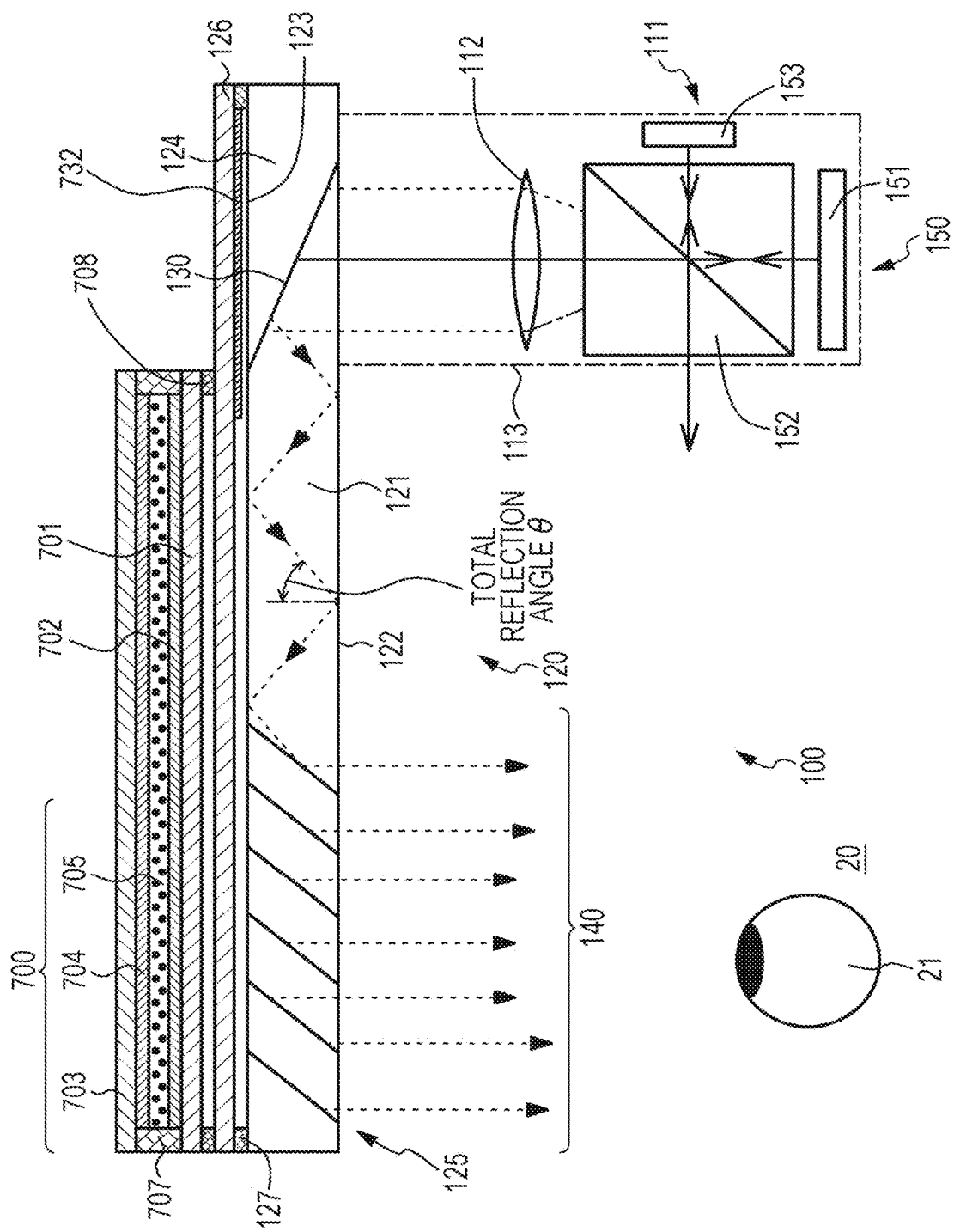
FIG. 23 is a conceptual view of an image display device in a modification example of the display apparatus according to the ninth embodiment.

Alternatively, as illustrated in FIG. 23, a light shielding member 732 is arranged in the portion of the optical device 120 of the side opposite to the side where the image forming devices 111A and 111B is arranged. Specifically, the light shielding member 732 may be formed by printing the optical device 120 (specifically, the inner surface of the protection member 126) with a non-transparent ink. Furthermore, the light shielding member 731 and the light shielding member 732 may be combined. The light shielding member 732 may be formed on the outer surface of the protection member 126.

Figure 24:
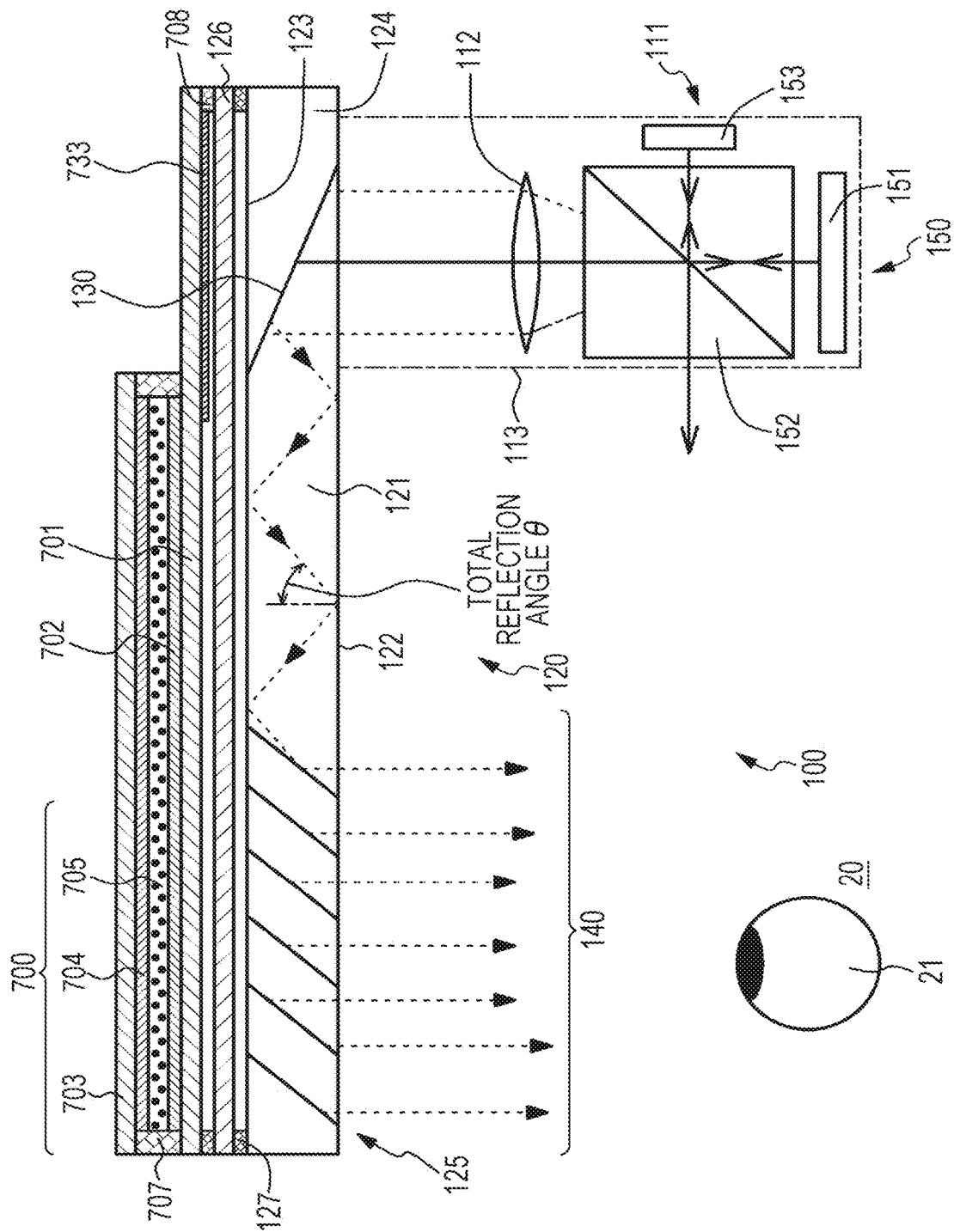
FIG. 24 is a conceptual view of an image display device in another modification example of the display apparatus according to the ninth embodiment.

Alternatively, as a conceptual view is illustrated in FIG. 24 or FIG. 25, the light shielding member 733 is arranged in the light regulating device 700. Specifically, the light shielding member 733 may be formed by printing on the light regulating device 700 with a non-transparent ink. Furthermore, in the example illustrated in FIG. 24, the light shielding member 733 is formed on an outer surface of the first substrate 701 of the light regulating device 700; and in the example illustrated in FIG. 25, the light shielding member 733 is formed on an inner surface of the first substrate 701 of the light regulating device 700. Furthermore, the light shielding member 731 and the light shielding member 733 may be combined, the light shielding member 732 and the light shielding member 733 may be combined, and the light shielding member 731, the light shielding member 732, and the light shielding member 733 may be combined.

Tenth Embodiment

A tenth embodiment is a modification of the first to ninth embodiments. In the tenth embodiment, a light regulating layer was configured with an electrophoretic dispersion liquid. Hereinafter, a method of manufacturing an electrophoretic dispersion liquid will be described.

First, 10 grams of carbon black (#40 manufactured by Mitsubishi Chemical Corporation) as electrophoretic particles was added to 1 liter of pure water, and after stirring, 1 $cm^3$ of 37 mass % of hydrochloric acid and 0.2 grams of 4-vinyl aniline were added, so that a solution-A was prepared. On the other hand, 0.3 grams of sodium nitrite was dissolved into 10 $cm^3$ of pure water, and after that, heating was performed up to 40 degree C., so that a solution-B was prepared. In addition, the solution-B was slowly added to the solution-A, and stirring was performed for 10 hours. After that, by centrifuging the product obtained by the reaction, a solid was obtained. Next, the solid was washed with pure water, and the solid was further washed in a method of dispersing the solid in acetone and, after that, centrifuging. After that, the solid was dried in a vacuum drier at a temperature of 50 degree C. one night.

Next, in a reaction flask attached with a nitrogen purge device, an electromagnetic stir bar, and a reflux column, grams of the solid, 100 $cm^3$ of toluene, 15 $cm^3$ of methacrylic acid 2-ethylhexyl, and 0.2 grams of azobisisobutyronitrile (AIBN) was inserted and mixed. In addition, while stirring, the reaction flask was purged with a nitrogen gas for 30 minutes. After that, the reaction flask was put into an oil bath, and while continuously stirring, heating was slowly performed up to 80 degree C. This state was maintained for 10 hours. After that, cooling was performed down to the room temperature, and the solid was centrifuged. After the solid was washed by performing three times of the operation of centrifuging the solid together with tetrahydrofuran (THF) and ethyl acetate, the solid was taken out and dried in the vacuum drier at a temperature of 50 degree C. one night. Therefore, 4.7 grams of brown electrophoretic particles was obtained.

On the other hand, as a dispersion liquid (dispersion medium) which is an insulating liquid, Isopar G (manufactured by Exxon Mobil Corporation) solution containing 0.5% of N, N-dimethyl-1,3-diamine, 1, 2-hydroxy octadecanoic acid, and methoxy sulfonyloxy methane (Solsperse 17000 manufactured by Nippon Lubrizol Corporation) and 1.5% of Sorbitan Trioleate (SPAN 85) was prepared. In addition, 0.1 grams of the electrophoretic particles was added to 9.9 grams of the dispersion medium, and stirring was performed for 5 minutes with a bead mill. After that, the mixture solution was centrifuged for 5 minutes in a centrifuge (rotational speed=2000 rpm), and after that, the beads are removed. Therefore, the electrophoretic dispersion liquid was obtained. Furthermore, the electrophoretic particles are positively charged.

In the light regulating device 700 in the tenth embodiment, the interval between the first substrate 701 and the second substrate 703 made of a glass having a thickness of 0.5 mm was set to 50 μm. The first transparent electrode 702 and the second transparent electrode 704 are made of an indium-tin complex oxide (ITO) and are formed based on a combination of a PVD method such as a sputtering method and a lift-off method. The first transparent electrode 702 is patterned in a shape of comb-like electrodes. On the other hand, the second transparent electrode 704 is not patterned and is a so-called solid electrode. The first transparent electrode 702 and the second transparent electrode 704 are connected to the control device 18 through connectors and wiring lines (not shown).

The light shielding ratio (light transmittance) of the light regulating device 700 can be controlled by voltages applied to the first transparent electrode 702 and the second transparent electrode 704. Specifically, if a relatively positive voltage is applied to the first transparent electrode 702 and a relatively negative voltage is applied to the second transparent electrode 704, the positively-charged electrophoretic particles migrate to cover the second transparent electrode 704. Therefore, the light shielding ratio of the light regulating device 700 has a high value. On the other hand, on the contrary, if a relatively negative voltage is applied to the first transparent electrode 702 and a relatively positive voltage is applied to the second transparent electrode 704, the electrophoretic particles migrate to cover the first transparent electrode 702. Therefore, the light shielding ratio of the light regulating device 700 has a low value. The voltages applied to the first transparent electrode 702 and the second transparent electrode 704 may be controlled by the observer manipulating a control knob installed in the control device 18. Namely, the observer observes the virtual image from the optical device 120, 320 and regulates the light shielding ratio of the light regulating device 700 so that the improvement of contrast of the virtual image may be achieved.

Eleventh Embodiment

An eleventh embodiment is a modification of the tenth embodiment. In the tenth embodiment, the color colored by the light regulating device 700 was set to a fixed color of black. On the other hand, in the eleventh embodiment, the light passing through the light regulating device is colored in a desired color by the light regulating device, and in addition, the color colored by the light regulating device is variable. Specifically, the light regulating device is configured by stacking a light regulating device colored in red, a light regulating device colored in yellow, and a light regulating device colored in blue. Herein, the electrophoretic dispersion liquid in the light regulating device colored in red is configured as a dispersion liquid by dispersing particles obtained by preliminarily mixing a styrene-based resin and C. I. Pigment Red 122 as electrophoretic particles by a Henschel mixer, performing melting and kneading in a twin-screw extruder, performing cooling, performing coarse pulverizing with a hammer mill, and performing fine pulverizing with a jet mill in Isopar G (manufactured by Exxon Mobil Corporation) solution containing 0.5% of N,N-dimethyl-1,3-diamine, 1,2-hydroxy octadecanoic acid and methoxy sulfonyloxy methane (Solsperse 17000 manufactured by Nippon Lubrizol Corporation) and 1.5% of Sorbitan Trioleate (SPAN 85). In addition, the electrophoretic dispersion liquid in the light regulating device colored in yellow is configured as a dispersion liquid by dispersing particles obtained by preliminarily mixing a styrene-based resin and C. I. Pigment Yellow 12 as electrophoretic particles by a Henschel mixer, performing melting and kneading in a twin-screw extruder, performing cooling, performing coarse pulverizing with a hammer mill, and performing fine pulverizing with a jet mill in Isopar G (manufactured by Exxon Mobil Corporation) solution containing 0.5% of N,N-dimethyl-1,3-diamine, 1,2-hydroxy octadecanoic acid and methoxy sulfonyloxy methane (Solsperse 17000 manufactured by Nippon Lubrizol Corporation) and 1.5% of Sorbitan Trioleate (SPAN 85). Moreover, the electrophoretic dispersion liquid in the light regulating device colored in blue is configured as a dispersion liquid by dispersing particles obtained by preliminarily mixing a styrene-based resin and C. I. Pigment Blue 1 as electrophoretic particles by a Henschel mixer, performing melting and kneading in a twin-screw extruder, performing cooling, performing coarse pulverizing with a hammer mill, and performing fine pulverizing with a jet mill in Isopar G (manufactured by Exxon Mobil Corporation) solution containing 0.5% of N, N-dimethyl-1,3-diamine, 1,2-hydroxy octadecanoic acid and methoxy sulfonyloxy methane (Solsperse 17000 manufactured by Nippon Lubrizol Corporation) and 1.5% of Sorbitan Trioleate (SPAN 85). In addition, by controlling the applying of voltages to the electrode in the light regulating devices, the external light emitted from a three-layered light regulating device can be colored in a desired color.

Since the configuration and structure of the display apparatus according to the eleventh embodiment are the same as the configuration and structure of the display apparatus described in the tenth embodiment except for the points described above, the detailed description is not provided.

Twelfth Embodiment

A twelfth embodiment relates to an initial setting method for the display apparatus according to an embodiment of the present disclosure. As a display apparatus in the twelfth embodiment, the display apparatuses described in the first to eleventh embodiments are used. Namely, the initial setting method for the display apparatus according to the twelfth embodiment is as follows. If the initial setting method is described based on the display apparatus described in the first to fifth embodiments, in the display apparatus including:

(A) a frame 10 (for example, a glasses-type frame 10) which is mounted on the head of an observer 20,
(B) image display devices 100, 200, 300, 400, 500 which are attached to the frame 10, and
(C) a light regulating device 700 which regulates a light amount of external light incident from the outside, the image display devices 100, 200, 300, 400, 500 is configured to include:
(a) image forming devices 111, 211, and
(b) optical devices 120, 320, 520 having a virtual image forming region where a virtual image is formed based on light emitted from the image forming devices 111, 211, the virtual image forming region of the optical devices 120, 320, 520 overlaps the light regulating device 700, when the virtual image is formed in a portion of the virtual image forming region based on the light emitted from the image forming devices 111, 211, the light regulating device 700 is controlled so that the light shielding ratio of the virtual image projection region 711 of the light regulating device 700 where the projection image of the virtual image to the light regulating device 700 is included is higher than the light shielding ratio of the other region 712 of the light regulating device 700.

Figure 26A:
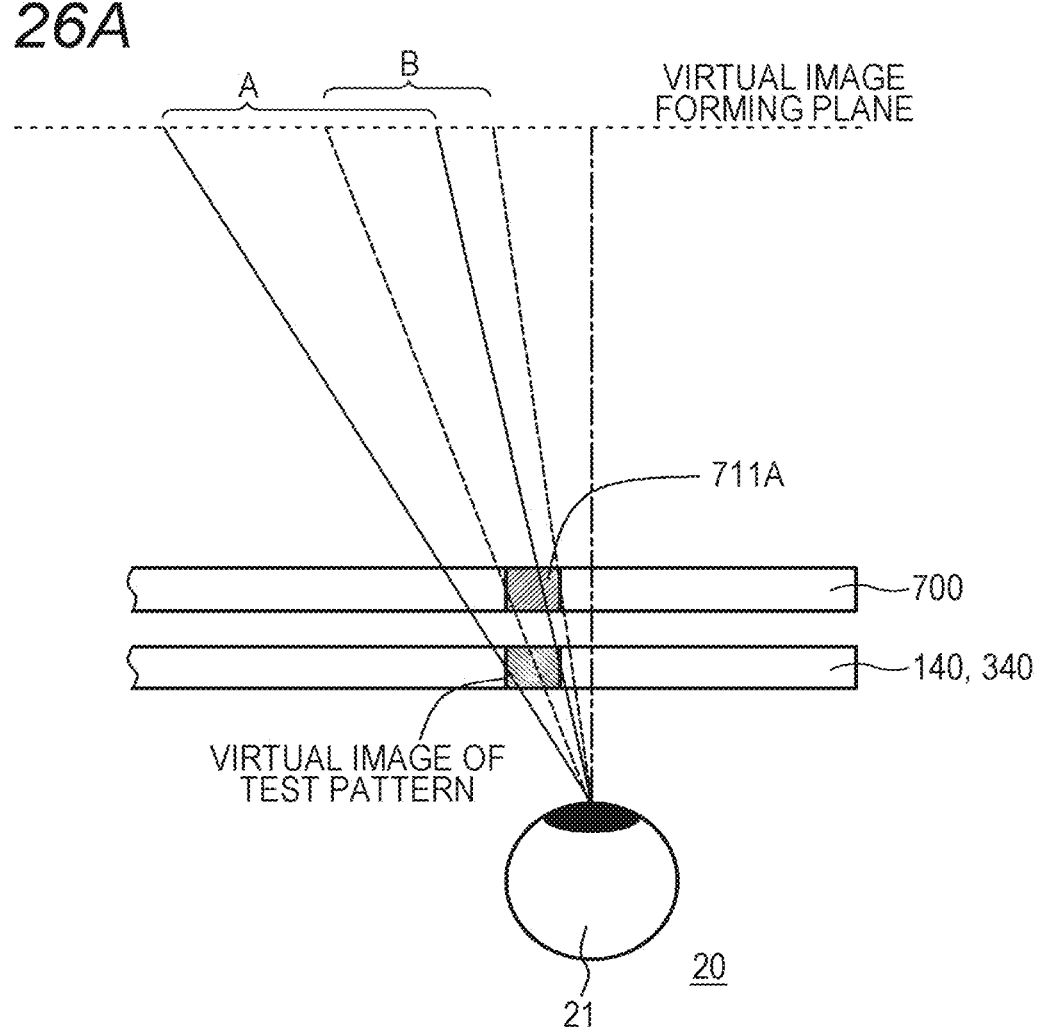
FIGS. 26A and 26B are a view schematically illustrating a state where a position of a virtual image projection region of a light regulating device where a projection image of a virtual image to the light regulating device is included is changed and a view schematically illustrating a test pattern in a case where an observer using the display apparatus is replaced in a twelfth embodiment, respectively.

For example, in a case where the observer using the display apparatus is replaced, a position of the virtual image projection region 711 of the light regulating device 700 where the projection image of the virtual image to the light regulating device 700 is included is changed (refer to FIG. 26A). Therefore, the initialization of the position of the virtual image projection region 711 of the light regulating device 700 where the projection image of the virtual image to the light regulating device 700 is included can be securely performed based on the initial setting method for the display apparatus according to the twelfth embodiment.

Specifically, a virtual image of the test pattern (in FIG. 26A, indicated by hatching lines directed from the upper left to the lower right) is displayed in the virtual image forming region (second deflecting units 140, 340) of the optical devices 120, 320, 520 based on a test pattern emitted from the image forming devices 111, 211, and the light shielding ratio of a region 711A of the light regulating device 700 corresponding to the virtual image of the test pattern is set to be higher than the light shielding ratio of the other region 712 of the light regulating device 700. Herein, in FIG. 26A, the position of the virtual image formed in the imaginary virtual image forming plane is denoted by "A", and the position of the region 711A of the light regulating device 700 when the region 711A of the light regulating device 700 is projected on the imaginary virtual image forming plane is denoted by "B". In addition, the virtual image of the test pattern and the high light shielding ratio region of the light regulating device 700 are allowed to be moved relative to each other so that the virtual image of the test pattern observed by the observer and the high light shielding ratio region 711A of the light regulating device 700 observed by the observer overlap each other. Namely, the virtual image of the test pattern and the high light shielding ratio region of the light regulating device 700 are allowed to be moved relative to each other so that the position "A" of the virtual image and the position "B" of the region 711A of the light regulating device 700 overlap each other.

Figure 26B:
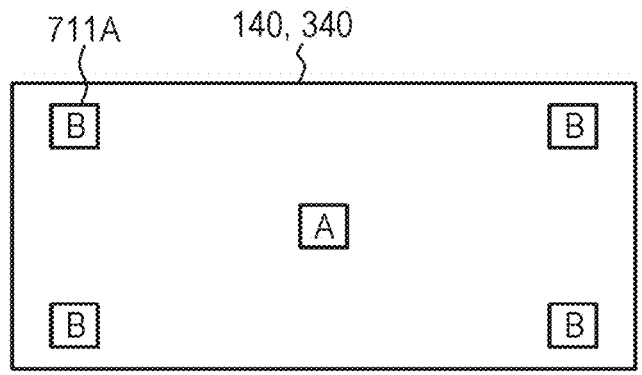

Although the test pattern basically has an arbitrary shape, for example, as illustrated in FIG. 26B, characters (in the illustrated example, characters "A" and "B") are displayed at the center and four corners of the virtual image forming region (second deflecting units 140, 340) of the optical devices 120, 320, 520. The virtual image of the test pattern and the high light shielding ratio region 711A of the light regulating device 700 are allowed to be moved relative to each other. Specifically, the image signal of the test pattern is processed so that the position of the virtual image of the test pattern in the optical devices 120, 320, 520 is moved in units of a pixel. Alternatively, a process of changing the position of the minimum unit region 709 is performed so that the light-shielding-ratio-varying minimum unit region 709 of the light regulating device 700 is moved. Alternatively, the configurations are combined. In order to move the virtual image of the test pattern and high light shielding ratio region 711A of the light regulating device 700 relative to each other, the observer may manually perform the movement. Specifically, the observer may manually perform by manipulating a switch, a button, a dial, a slider, a knob, and the like. The relative movement may be movement in the X-axis direction and the later-described movement in the Y-axis direction, rotational movement, expansion, constriction, and modification. Furthermore, in the example illustrated in FIG. 26B, the expansion in the X-axis direction may be implemented.

Furthermore, the position relationship between the formation position of the virtual image in the optical devices 120, 320, 520 and the position of the virtual image projection region of the light regulating device 700 may be corrected by using as a reference the movement amount when the virtual image of the test pattern and the high light shielding ratio region 711A of the light regulating device 700 are moved relative to each other. Specifically, the position relationship between the formation position of the virtual image in the optical devices 120, 320, 520 and the position of the virtual image projection region 711 of the light regulating device 700 may be corrected based on the image signal processing amount when the image signal of the test pattern is processed so that the position of the virtual image of the test pattern in the optical devices 120, 320, 520 is moved in units of a pixel, based on the process of moving the high light shielding ratio region 711A of the light regulating device 700 by using the minimum unit region 709 as a unit of movement, or based on a combination thereof.

Furthermore, at this time, the observer may also determine the light shielding ratio of the other region 712 of the light regulating device at the time of operation of the light regulating device 700. In addition, the light shielding ratio of the virtual image projection region 711 of the light regulating device at the time of operation of the light regulating device 700 may also be determined. In addition, in a case where the virtual rectangles 140A, 340A circumscribing the virtual image formed in the optical devices 120, 320, 520 is considered, when lateral and longitudinal lengths of the virtual rectangles 140A, 340A are denoted by $L_{1-T}$ and $L_{1-L}$, respectively, and when the shape of the virtual image projection region 711 of the light regulating device 700 is defined as a shape of a rectangle having lateral and longitudinal lengths of $L_{2-T}$ and $L_{2-L}$, the observer may also determine a value of $L_{2-T}/L_{1-T}$ and the $L_{2-L}/L_{1-L}$.

Heretofore, the present disclosure is described based on exemplary embodiments, but the present disclosure is not limited to the embodiments. The configuration and structures of the display apparatuses (head mounted displays) and the image display devices described in the embodiments are exemplary ones, and thus, appropriate modifications are available. For example, a surface-relief-type hologram (refer to US Patent 20040062505 A1) may be disposed in the light guide plate. In the optical device 320, the diffraction grating element may be configured with a transmissive diffraction grating element. Alternatively, in some embodiment, any one of the first deflecting unit and the second deflecting unit is configured with a reflective diffraction grating element, and the other may be configured with a transmissive diffraction grating element. Alternatively, the diffraction grating element may also be configured as a reflective blazed diffraction grating element. The display apparatus according to an embodiment of the present disclosure may also be used as a stereoscopic display apparatus. In this case, as necessary, a polarizing plate or a polarizing film may be detachably attached to the optical device, or a polarizing plate or a polarizing film may be adhered to the optical device.

In the embodiments, although it is described that the image forming devices 111, 211 display a monochrome (for example, green) image, the image forming devices 111, 211 may display a color image. In this case, light source may be configured with light sources which emit, for example, red, green, and blue, respectively. Specifically, for example, red light, green light, and blue light emitted from a red light emitting element, a green light emitting element, and a blue light emitting element, respectively, may be mixed and luminance-equalized by using a light pipe to white light.

In some embodiment, the frame may be configured to include a front portion arranged in front of the observer, two temples rotatably attached to two ends of the front portion through hinges, and nose pads, and the light regulating device 700 may be arranged and installed in the front portion. In addition, in some embodiment, the optical device may be attached to the light regulating device 700. Furthermore, the optical device may be attached to the light regulating device 700 in a closely contacted state or may be attached to the light regulating device 700 with a gap. Moreover, in some embodiment, in this case, as described above, the front portion may have a rim, and the light regulating device 700 may be fitted to the rim. Alternatively, in some embodiment, at least one of the first substrate 701 and the second substrate 703 may be fitted to the rim. In some embodiment, the light regulating device 700 and the light guide plates 121, 321 may be fitted to the rim. In some embodiment, the light guide plates 121, 321 may be fitted to the rim.

The light regulating layer 705 may be configured with a light shutter made of a liquid crystal display device. In this case, specifically, the light regulating layer 705 may be configured with, for example, a liquid crystal material layer made of a TN (twisted nematic) type liquid crystal material or an STN (super twisted nematic) type liquid crystal material. The first transparent electrode 702 and the second transparent electrode 704 are patterned, and the light shielding ratio (light transmittance) of the region 712 of a portion of the light regulating device 700 may be changed into a state different from the light shielding ratio of the other region. Alternatively, one of the first transparent electrode 702 and the second transparent electrode 704 is configured as a so-called solid electrode where patterning is not performed, the other is patterned, and the other is connected to a TFT. In addition, the control of the light shielding ratio of the light-shielding-ratio-varying minimum unit region 709 of the light regulating device 700 is performed by the TFT. Namely, the control of the light shielding ratio may be performed based on an active matrix. The control of the light shielding ratio based on an active matrix may also be applied to the light regulating device 700 described in the first to twelfth embodiments.

In addition, a light shutter which controls the light shielding ratio (light transmittance) by an electrowetting phenomenon may also be used. Specifically, a first transparent electrode and a second transparent electrode are installed, and the space between the first transparent electrode and the second transparent electrode is filled with an insulating first liquid and a conductive second liquid. In addition, by applying a voltage between the first transparent electrode and the second transparent electrode, a shape of the interface formed by the first liquid and the second liquid is changed, for example, from a planar shape to a curved state, so that the light shielding ratio (light transmittance) can be controlled. Alternatively, a light shutter utilizing an electrode-position method (electrodeposition electric-field precipitation) based on an electrodeposition/dissociation phenomenon which occurs by a reversible oxidation/reduction reaction of a metal (for example, silver particles) may also be used.

Specifically, by dissolving $Ag^+$ and $I^-$ in an organic solvent and by applying an appropriate voltage to an electrode, $Ag^+$ is allowed to be reduced, and thus, Ag is precipitated, so that the light shielding ratio (light transmittance) of the light regulating device is decreased; and by oxidizing Ag to be dissolved as $Ag^+$, the light shielding ratio (light transmittance) of the light regulating device is increased.

In some cases, the light passing through the light regulating device may be configured to be colored in a desired color by the light regulating device, and in this case, the color colored by the light regulating device may be configured to be variable. Specifically, for example, a light regulating device colored in red, a light regulating device colored in green, and a light regulating device colored in blue may be stacked.

The light regulating device may be detachably arranged and installed in the region of the optical device where the light is emitted. In this manner, in order to detachably arrange and install the light regulating device, for example, the light regulating device may be attached to the optical deice by using a screw made of a transparent plastic and may be connected through a connector and a wiring line to the control circuit (for example, included in the control device 18 for controlling the image forming device) for controlling the light transmittance of the light regulating device.

Figure 27A:
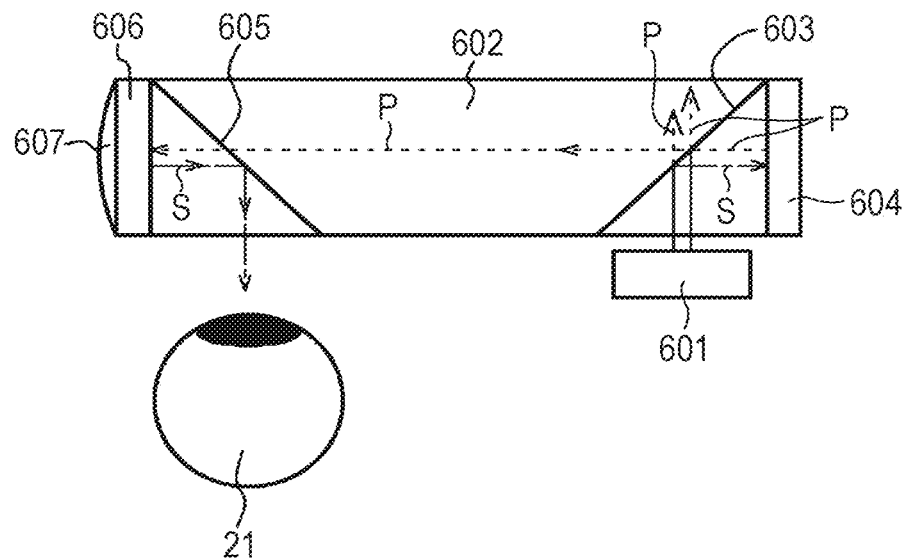
FIGS. 27A and 27B are schematic views as an optical device in a modification example of the display apparatus according to the sixth embodiment is viewed from the upper side.
Figure 27B:
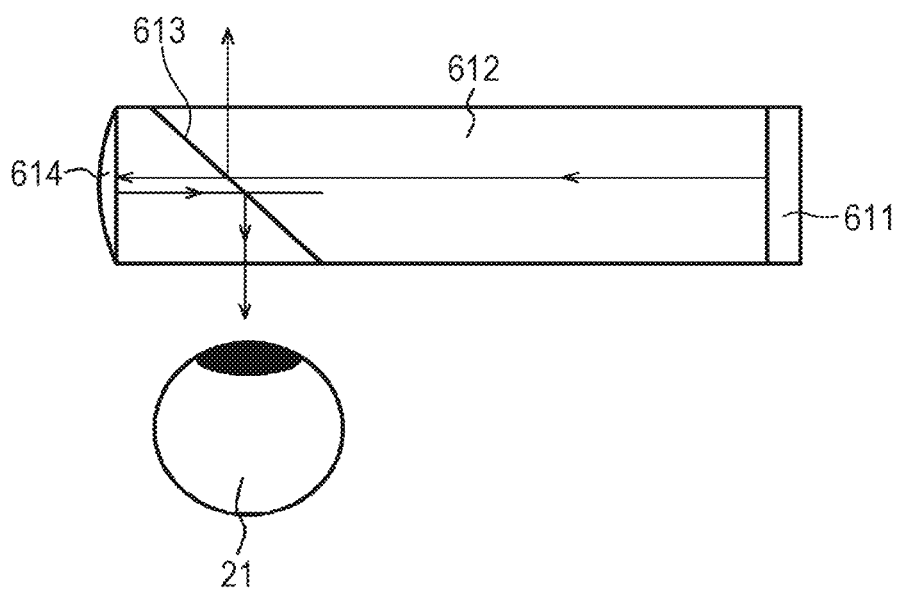

A schematic view as a modified example of the optical device constituting the second-structure optical device described in the sixth embodiment is viewed from the upper side is illustrated in FIGS. 27A and 27B. Furthermore, in FIGS. 27A, 27B, and 28A, the light regulating device is omitted in illustration.

In the example illustrated in FIG. 27A, the light from a light source 601 infiltrates into a light guiding member 602 to collide with a polarizing beam splitter 603 installed in the light guiding member 602. Among the light beams from the light source 601 which collides with the polarizing beam splitter 603, the P polarization components pass through the polarizing beam splitter 603, and the S polarization components are reflected by the polarizing beam splitter 603 to be directed to a liquid crystal display device (LCD) 604 configured with a LCOS as a light valve. The image is formed by the liquid crystal display device (LCD) 604. Since the polarization components of the light reflected by the liquid crystal display device (LCD) 604 occupy the P polarization components, the light reflected by the liquid crystal display device (LCD) 604 passes through polarizing beam splitters 603 and 605, passes through a ¼-wave plate 606, collides with a reflecting plate 607 to be reflected, and passes through the ¼-wave plate 606 to be directed to the polarizing beam splitter 605. At this time, since the polarization components of the light occupy the S polarization components, the light is reflected by the polarizing beam splitter 605 to be directed to the pupil 21 of the observer. As described above, the image forming device is configured to include the light source 601 and the liquid crystal display device (LCD) 604, the optical device is configured to include the light guiding member 602, the polarizing beam splitters 603 and 605, the ¼-wave plate 606, and the reflecting plate 607, and the polarizing beam splitter 605 corresponds to the virtual image forming region of the optical device.

In the example illustrated in FIG. 27B, the light from an image forming device 611 propagates a light guiding member 612 to collide with a semi-transparent mirror 613, a portion of the light transmits the semi-transparent mirror 613 and collides with a reflecting plate 614 to be reflected and to collide with the semi-transparent mirror 613 again, and a portion of the light is reflected by the semi-transparent mirror 613 to be directed to the pupil 21 of the observer. As described, the optical device is configured to include the light guiding member 612, the semi-transparent mirror 613, and the reflecting plate 614, and the semi-transparent mirror 613 corresponds to the virtual image forming region of the optical device.

Figure 28A:
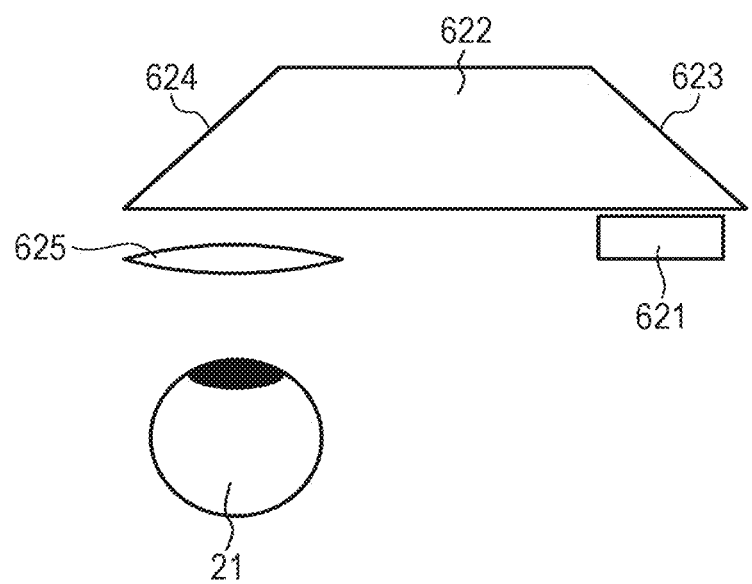
FIGS. 28A and 28B are a schematic view as an optical device in another modification example of the display apparatus according to the sixth embodiment is viewed from the upper side and a schematic view as the optical device is viewed from the lateral side, respectively.
Figure 28B:
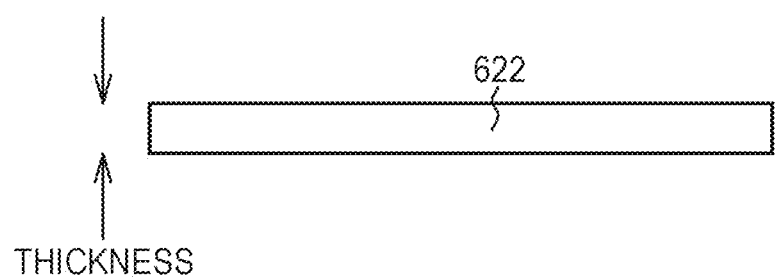

Alternatively, a schematic view as an optical device in another modification example of the display apparatus according to the sixth embodiment is viewed from the upper side and a schematic view as the optical device is viewed from the lateral side are illustrated in FIGS. 28A and 28B. The optical device is configured to include a hexahedral prism 622 and a convex lens 625. The light emitted from an image forming device 621 is incident on the prism 622, collides with a prism surface 623 to be reflected, propagates the prism 622, collides with a prism surface 624 to be reflected, and reaches the pupil 21 of the observer through the convex lens 625. The prism surface 623 and the prism surface 624 are tilted in the directions to face each other, and the plane shape of the prism 622 is a shape of a trapezoid, specifically, an isosceles trapezoid. Mirror coating is performed on the prism surfaces 623 and 624. If the thickness (height) of the portion of the prism 622 facing the pupil 21 is set to be smaller than an average pupil diameter of human beings, that is, 4 mm, the observer can view the image of the outside world and the virtual image from the prism 622 in an overlapped manner.

Figure 29:
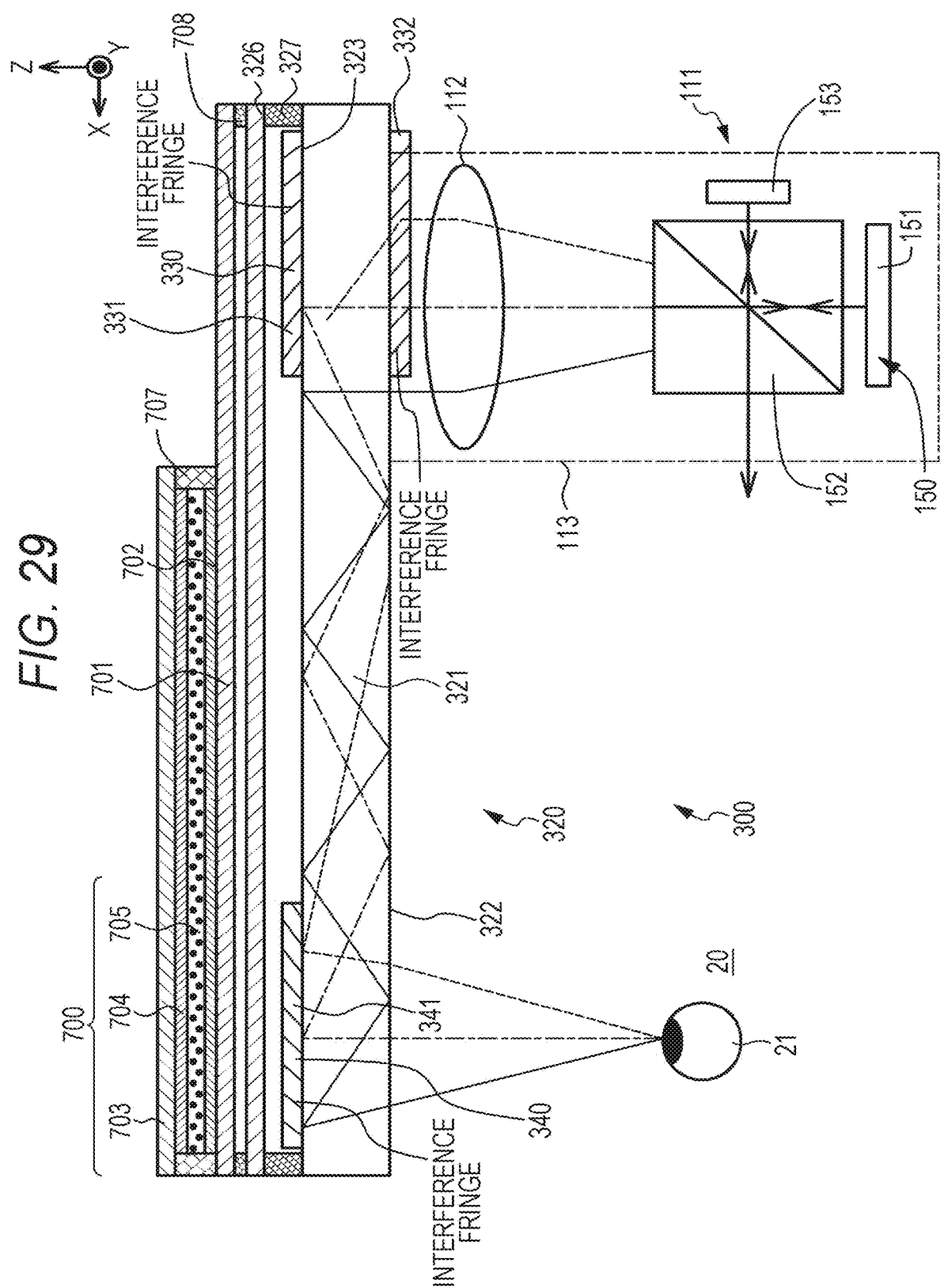
FIG. 29 is a conceptual view of an image display device in a modification example of the display apparatus according to the third and fourth embodiments.
Figure 30:
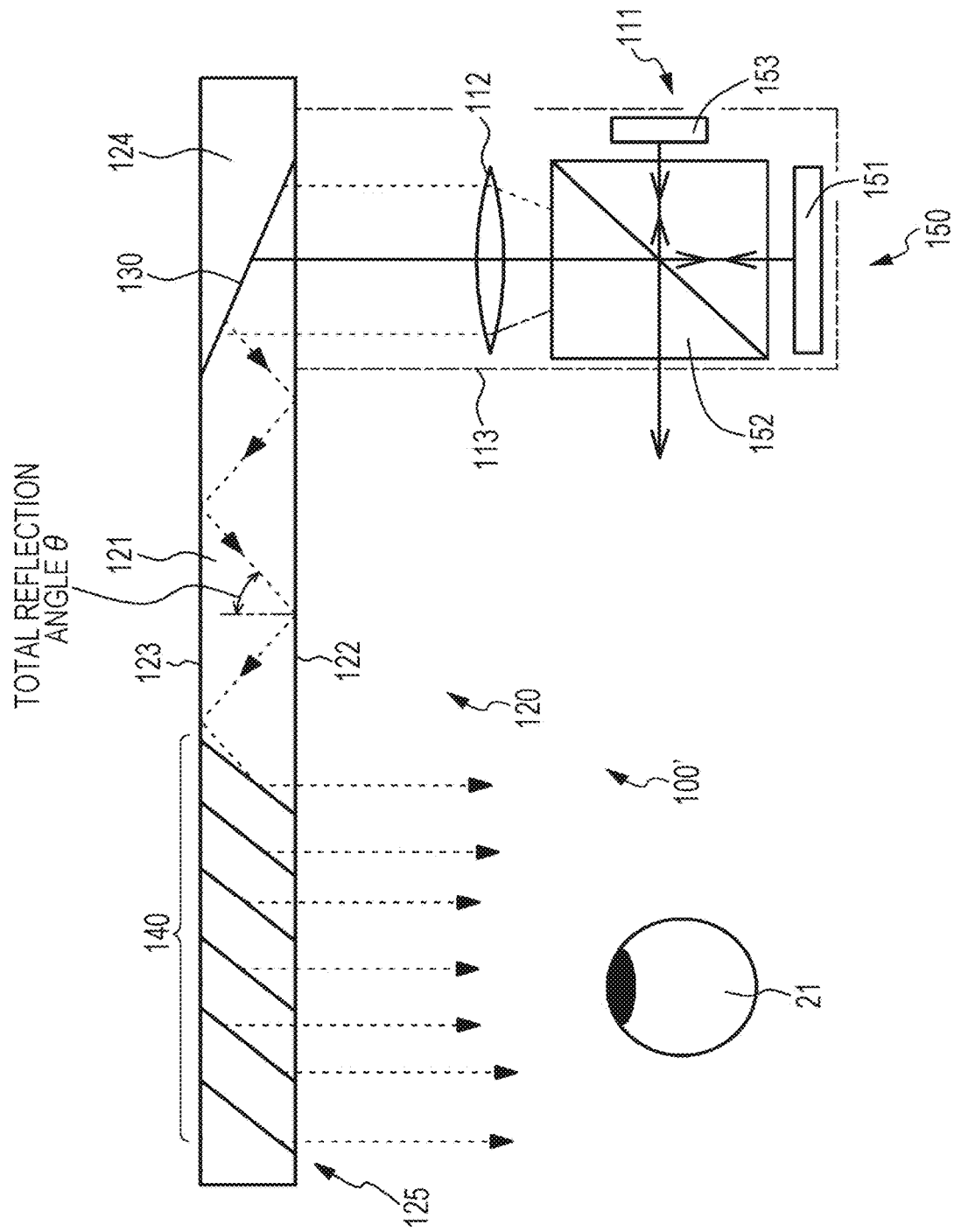
FIG. 30 is a conceptual view of an image display device in a display apparatus in the related art.
Figure 31:
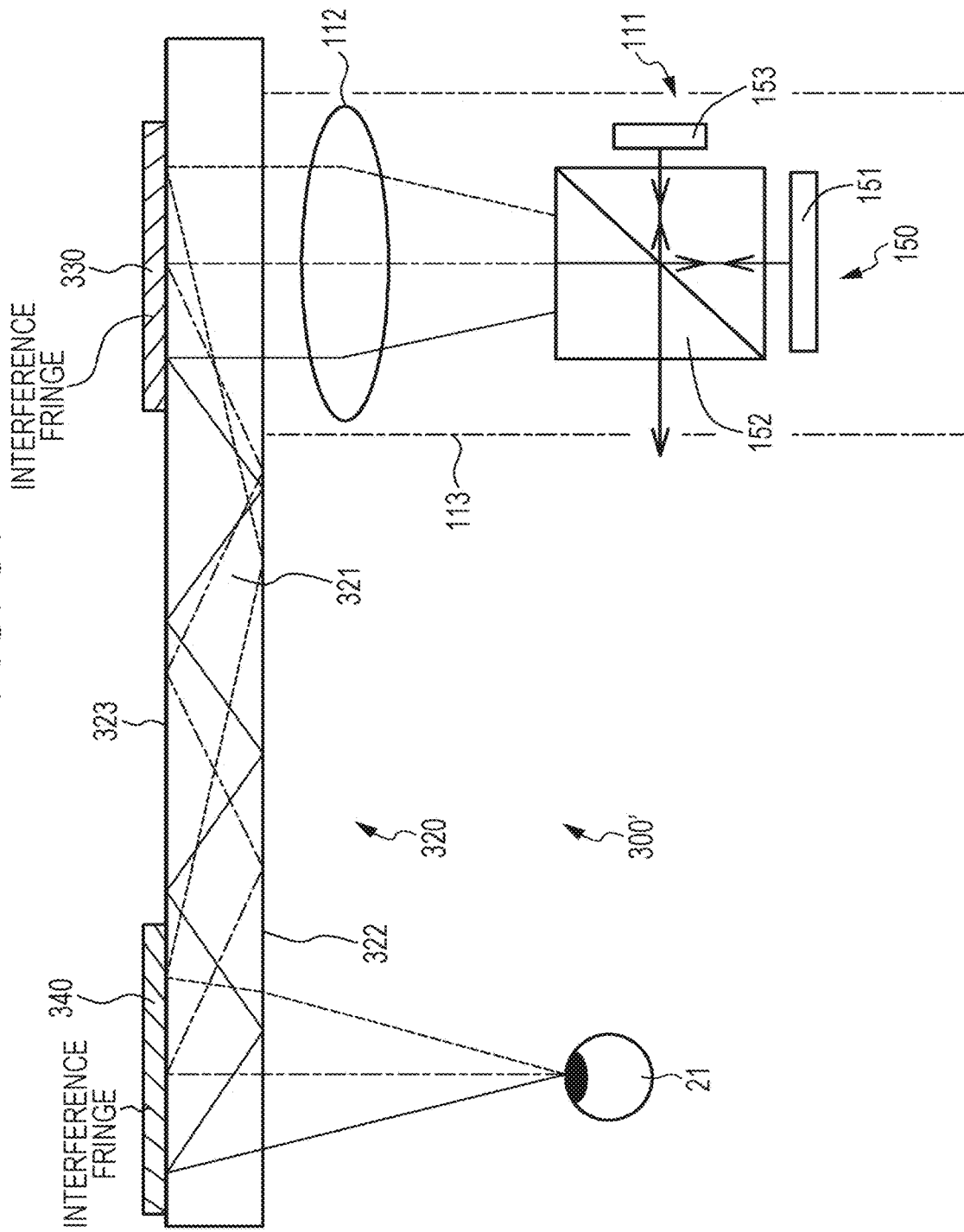
FIG. 31 is a conceptual view of an image display device in a modification example of the display apparatus in the related art.

In some embodiment, in some cases, as a conceptual view of an image display device in a modification example of the display apparatus according to the third and fourth embodiments is illustrated in FIG. 29, the first deflecting unit 330 may be configured to include a first hologram diffraction grating 331 and a second hologram diffraction grating 332, the second deflecting unit 340 may be configured to include a third hologram diffraction grating 341, a first interference fringe may be formed in an inner portion of the first hologram diffraction grating 331, a second interference fringe may be formed in an inner portion of the second hologram diffraction grating 332, and a third interference fringe may be formed in an inner portion of the third hologram diffraction grating 341; and the following relationships may be satisfied:

$\varphi_1 < \varphi_3 < \varphi_2$ and $P_1 = P_3 = P_2$

Furthermore, the hologram diffraction gratings 331, 332, and 341 are configured with reflective volume hologram diffraction gratings. Herein, $\varphi_1$: a slant angle of the first interference fringe
$\varphi_2$: a slant angle of the second interference fringe
$\varphi_3$: a slant angle of the third interference fringe
$P_1$: a pitch of the first interference fringe
$P_2$: a pitch of the second interference fringe
$P_3$: a pitch of the second interference fringe Alternatively, in some embodiment, the following relationship may be satisfied:

$\lambda_1 < \lambda_3 < \lambda_2$

Herein, $\lambda_1$: a peak wavelength of light which is incident on the light guide plate and is deflected by the first hologram diffraction grating
$\lambda_2$: a peak wavelength of light which is incident on the light guide plate and is deflected by the second hologram diffraction grating
$\lambda_3$: a peak wavelength of light which is deflected by the first hologram diffraction grating and the second hologram diffraction grating, propagates an inner portion of the light guide plate by total reflection, and is deflected by the third hologram diffraction grating Furthermore, the present disclosure may have the following configurations.

(1)
A display device comprising:
a layer including a first region and a second region, wherein the first region and the second region are configured to be visible to a user of the display device; and
circuitry configured:
to control displaying a computer generated image on an optical device overlapping the layer and
to control a first transmittance of the first region of the layer to be lower than a second transmittance of the second region of the layer such that:
a visibility, through the first region, of the computer generated image is increased and
a visibility, through the second region, of an environment opposite the user relative to the display device is higher than a visibility, through the first region, of the environment opposite the user relative to the display device.

(2)
The display device of (1), wherein:
the display device further comprises an input device configured to receive an input from the user of the display device, and
the circuitry is further configured to determine, based on the input, whether the computer generated image overlaps with the first region as viewed by the user of the display device.

(3)
The display device of (1), further comprising:
an input device configured to receive an input from the user of the display device and to adjust, based on the input, a position of the computer generated image and/or a position of the first region.

(4)
The display device of (1) to (3), wherein:
the display device further comprises:
an image forming device configured to emit internal light based on which a computer generated image is formed;
a first substrate;
a plurality of first transparent electrode segments disposed on a surface of the first substrate, the layer being disposed on a surface of the first transparent electrode opposite the first substrate;
a plurality of second transparent electrode segments disposed on a surface of the layer opposite the plurality of first transparent electrode segments; and
a second substrate disposed opposite the first substrate relative to the layer,
the plurality of first transparent electrode segments extend in a first direction, and
the plurality of second transparent electrode segments extend in a second direction different from the first direction.

(5)
The display device of (1) to (4), wherein:
the layer comprises a stack of electrochromatic material layers.

(6)
The display device of (5), wherein:
the electrochromatic material layers include:
a first material layer comprising tungsten trioxide, molybdenum trioxide, or vanadium pentoxide;
a second material layer comprising tantalum pentoxide; and
a third material layer comprising iridium tin oxide, iridium oxide, zirconium dioxide, zirconium phosphate, or a Prussian blue complex.

(7)
The display device of (1) to (6), wherein:
a ratio of a horizontal length of the first region to a horizontal length of a computer generated image region on which the computer generated image is displayed is between 1 and 1.5, and
a ratio of a vertical length of the first region to a vertical length of the computer generated image region is between 1 and 1.5.

(8)
The display device of (1) to (7), wherein:
the circuitry is configured to control the first transmittance of the first region based on an illuminance of an environment surrounding the display device.

(9)
The display device of (8), further comprising:
a sensor configured to measure the illuminance of the environment surrounding the display device.

(10)
The display device of (1) to (9), wherein:
the display device comprises a head up display device.

(11)
The display device of (10), wherein:
the head up display device is configured to be installed on a windshield or a cockpit of a vehicle.

(12)
The display device of (1) to (9), further comprising:
a frame configured to be mounted on a head of the user of the display device.

(13)
The display device of (1) to (12), wherein:
the circuitry is configured to control a light shielding of the second region to be equal to or less than 95% of a light shielding of the first region.

(14)
The display device of (1) to (12), wherein:
the circuitry is configured to control a light shielding of the second region to be equal to or less than 30% of a light shielding of the first region.

(15)
The display device of (1) to (14), wherein:
the circuitry is configured to control a light shielding of the first region to be between 35% and 99% of a complete light shielding of the first region.

(16)
A method for controlling transmittance of a display device, the method comprising:
controlling a first transmittance of a first region of a layer of the display device to be lower than a second transmittance of a second region of the layer of the display device such that:
a visibility, through the first region, of a computer generated image displayed on an optical device overlapping the layer is increased and
a visibility, through the second region, of an environment opposite the user relative to the display device is higher than a visibility, through
the first region, of the environment opposite the user relative to the display device,
wherein the first region and the second region are configured to be visible to a user of the display device.

(17)
A computer-readable medium storing instructions that, when executed by a computer, perform a method for controlling transmittance of a display device, the method comprising:
controlling a first transmittance of a first region of a layer of the display device to be lower than a second transmittance of a second region of the layer of the display device such that:
a visibility, through the first region, of a computer generated image displayed on an optical device overlapping the layer is increased and
a visibility, through the second region, of an environment opposite the user relative to the display device is higher than a visibility, through the first region, of the environment opposite the user relative to the display device,
wherein the first region and the second region are configured to be visible to a user of the display device.

(18)
The computer-readable medium of (17), wherein the method further comprises:
receiving an input from the user of the display device; and
determining, based on the input, whether the computer generated image overlaps with the first region as viewed by the user of the display device.

(19)
The computer-readable medium of (17), wherein the method further comprises:
receiving an input from the user of the display device; and
adjusting, based on the input, a position of the computer generated image and/or a position of the first region.

(20)
The computer-readable medium of (17) to (19), wherein the method further comprises:
controlling the first transmittance of the first region based on an illuminance of an environment surrounding the display device.

(21)
The computer-readable medium of (20), wherein the method further comprises:
measuring the illuminance of the environment surrounding the display device.

(22)
The computer-readable medium of (17) to (21), wherein the method further comprises:
controlling a light shielding of the second region to be equal to or less than 95% of a light shielding of the first region.

(23)
The computer-readable medium of (17) to (21), wherein the method further comprises:
controlling a light shielding of the second region to be equal to or less than 30% of a light shielding of the first region.

(24)
The computer-readable medium of (17) to (23), wherein the method further comprises:
controlling a light shielding ratio of the first region to be between 35% and 99% of a complete light shielding of the first region.

[A01]<<Display Apparatus>>
A display apparatus including:
(A) a frame which is mounted on a head of an observer;
(B) an image display device which is attached to the frame; and
(C) a light regulating device which regulates a light amount of external light incident from an outside,
wherein the image display device includes:
(a) an image forming device; and
(b) an optical device which includes a virtual image forming region where a virtual image is formed based on light emitted from the image forming device,
wherein the virtual image forming region of the optical device overlaps the light regulating device, and
wherein, when the virtual image is formed in a portion of the virtual image forming region based on the light emitted from the image forming device, the light regulating device is controlled so that a light shielding ratio of a virtual image projection region of the light regulating device where a projection image of the virtual image to the light regulating device is included is higher than a light shielding ratio of the other region of the light regulating device.

[A02] The display apparatus described in [A01], wherein, at the time of operation of the light regulating device, when the light shielding ratio of the virtual image projection region of the light regulating device where the projection image of the virtual image to the light regulating device is included is defined as "1", the light shielding ratio of the other region of the light regulating device is 0.95 or less.

[A03] The display apparatus described in [A01] or [A02], wherein, at the time of operation of the light regulating device, the light shielding ratio of the virtual image projection region of the light regulating device is in a range of 35% to 99%.

[A04] The display apparatus described in any one of [A01] to [A03], wherein, before the virtual image is formed in the optical device based on the light emitted from the image forming device, the light shielding ratio of the virtual image projection region of the light regulating device is increased.

[A05] The display apparatus described in any one of [A01] to [A04], wherein, in a case where one virtual image in the optical device is formed based on the light emitted from the image forming device and, subsequently, a next virtual image different from the one virtual image is formed, when the area of the virtual image projection region of the light regulating device corresponding to the one virtual image is denoted by $S_1$ and the area of the virtual image projection region of the light regulating device corresponding to the next virtual image is denoted by $S_2$, wherein, in a case where $S_2/S_1 < 0.8$ or $1 < S_2/S_1$, the virtual image projection region of the light regulating device where the next virtual image is formed is a region of the light regulating device where the projection image of the next virtual image to the light regulating device is included, and wherein, in a case where $0.8 \leq S_2/S_1 \leq 1$, the virtual image projection region of the light regulating device where the next virtual image is formed is a region of the light regulating device where the projection image of the one virtual image to the light regulating device is included.

[A06] The display apparatus described in any one of [A01] to [A05], wherein, when a virtual rectangle circumscribing the virtual image formed in the optical device is considered, the virtual image projection region of the light regulating device is larger than the virtual rectangle.

[A07] The display apparatus described in [A06], wherein, when lateral and longitudinal lengths of the virtual rectangle circumscribing the virtual image formed in the optical device are denoted by $L_{1-T}$ and $L_{1-L}$, respectively, and a shape of the virtual image projection region of the light regulating device is defined as a shape of a rectangle having lateral and longitudinal lengths of $L_{2-T}$ and $L_{2-L}$, the following relationships are satisfied:

$$1.0 \leq L_{2-T}/L_{1-T} \leq 1.5$$

$$1.0 \leq L_{2-L}/L_{1-L} \leq 1.5$$

[A08] The display apparatus described in any one of [A01] to [A07], wherein the light regulating device is configured to include:
a first substrate;
a second substrate facing the first substrate;
a first transparent electrode installed on a facing surface of the first substrate facing the second substrate;
a second transparent electrode installed on a facing surface of the second substrate facing the first substrate; and
a light regulating layer interposed between the first transparent electrode and the second transparent electrode.

[A09] The display apparatus described in [A08],
wherein the first transparent electrode is configured with a plurality of strip-shaped first transparent electrode segments extending in a first direction, wherein the second transparent electrode is configured with a plurality of strip-shaped second transparent electrode segments extending in a second direction different from the first direction, and wherein control of the light shielding ratio of a portion of the light regulating device corresponding to an overlap region of the first transparent electrode segment and the second transparent electrode segment is performed based on control of voltages applied to the first transparent electrode segment and the second transparent electrode segment.

[B01] The display apparatus described in any one of [A01] to [A09], further including an illuminance sensor (environment illuminance measurement sensor) which measures the illuminance of the environment where the display apparatus is placed, wherein the light shielding ratio of the light regulating device is controlled based on a measurement result of the illuminance sensor (environment illuminance measurement sensor).

[B02] The display apparatus described in any one of [A01] to [B01], further including an illuminance sensor (environment illuminance measurement sensor) which measures the illuminance of the environment where the display apparatus is placed, so that luminance of the image formed by the image forming device is controlled based on a measurement result of the illuminance sensor (environment illuminance measurement sensor).

[B03] The display apparatus described in any one of [A01] to [B02], further including a second illuminance sensor (transmitting light illuminance measurement sensor) which measures the illuminance based on the light passing from the external environment through the light regulating device, so that a light shielding ratio of the light regulating device is controlled based on a measurement result of the second illuminance sensor (transmitting light illuminance measurement sensor).

[B04] The display apparatus described in any one of [A01] to [B03], further including a second illuminance sensor (transmitting light illuminance measurement sensor) which measures the illuminance based on the light passing from the external environment through the light regulating device, so that luminance of the image formed by the image forming device is controlled based on a measurement result of the second illuminance sensor (transmitting light illuminance measurement sensor).

[B05] The display apparatus described in any one of [B03] and [B04], wherein the second illuminance sensor (transmitting light illuminance measurement sensor) is disposed to be closer to the observer side than to the optical device.

[B06] The display apparatus described in any one of [A01] to [B05], wherein the light passing through the light regulating device is colored in a desired color by the light regulating device.

[B07] The display apparatus described in [B06], wherein the color colored by the light regulating device is variable.

[B08] The display apparatus described in [B06], wherein the color colored by the light regulating device is fixed.

<<Initial Setting Method for Display Apparatus>>

An initial setting method for a display apparatus, the display apparatus including:

(A) a frame which is mounted on a head of an observer;

(B) an image display device which is attached to the frame; and (C) a light regulating device which regulates a light amount of external light incident from an outside, wherein the image display device includes:
(a) an image forming device; and
(b) an optical device which includes a virtual image forming region where a virtual image is formed based on light emitted from the image forming device,
wherein the virtual image forming region of the optical device overlaps the light regulating device,
wherein, when the virtual image is formed in a portion of the virtual image forming region based on the light emitted from the image forming device, the light regulating device is controlled so that a light shielding ratio of a virtual image projection region of the light regulating device where a projection image of the virtual image to the light regulating device is included is higher than a light shielding ratio of the other region of the light regulating device,
wherein a virtual image of a test pattern is displayed in the virtual image forming region of the optical device based on the test pattern emitted from the image forming device, and the light shielding ratio of a region of the light regulating device corresponding to the virtual image of the test pattern is set to be higher than the light shielding ratio of the other region of the light regulating device, and
wherein the virtual image of the test pattern and a high light shielding ratio region of the light regulating device are moved relative to each other so that the virtual image of the test pattern observed by the observer and the high light shielding ratio region of the light regulating device observed by the observer overlap each other.

[C02] The initial setting method for the display apparatus described in [C01], wherein a position relationship between a formation position of the virtual image in the optical device and a position of the virtual image projection region of the light regulating device is corrected by using as a reference a movement amount when the virtual image of the test pattern and the high light shielding ratio region of the light regulating device are moved relative to each other.

[C03] The initial setting method for the display apparatus described in [C01] or [C02], wherein the light shielding ratio of the other region of the light regulating device at the time of operation of the light regulating device is determined.

[C04] The initial setting method for the display apparatus described in any one of [C01] to [C03], wherein the light shielding ratio of the virtual image projection region of the light regulating device at the time of operation of the light regulating device is determined.

[C05] The initial setting method for the display apparatus described in any one of [C01] to [C04], wherein when a virtual rectangle circumscribing the virtual image formed in the optical device is considered, lateral and longitudinal lengths of the virtual rectangle are denoted by $L_{1-T}$ and $L_{1-L}$, respectively, a shape of the virtual image projection region of the light regulating device is set to be a shape of a rectangle having lateral and longitudinal lengths of $L_{2-T}$ and $L_{2-L}$, values of $L_{2-T}/L_{1-T}$ and the $L_{2-L}/L_{1-L}$ are determined.

[Reference Signs List]
10 Frame
11 Front portion
11' Central portion of front portion
12 Hinge
13 Temple
14 Earpiece
15 Wiring line (signal line, power line, and the like)
16 Headphone unit
16' Wiring line for headphone unit
17 Imaging device
18 Control device (control circuit, control unit)
18A Image information storage device
19 Installation member
20 Observer
21 Pupil
100, 200, 300, 400, 500 Image display device
111, 111A, 111B, 211 Image forming device
112 Optical system (collimator optical system)
113, 213 Housing
120, 320, 520 Optical device
121, 321 Light guide plate
122, 322 First surface of light guide plate
123, 323 Second surface of light guide plate
124, 125 Portion of light guide plate
126, 326 Protection member (protective plate)
127, 327 Adhesive member
130 First deflecting unit
140 Second deflecting unit (virtual image forming region)
140A, 340A Virtual rectangle circumscribing virtual image formed in optical device
330 First deflecting unit (first diffraction grating member)
340 Second deflecting unit (second diffraction grating member, virtual image forming region)
150 Reflective spatial light modulation device
151 Liquid crystal display device (LCD)
152 Polarizing beam splitter (PBS)
153 Light source
251, 251A, 251B Light source
252 Collimator optical system
253 Scanning unit
254 Optical system (relay optical system)
256 Total reflection mirror
521 Transparent member
530A, 530B Semi-transparent mirror
601 Light source
602 Light guiding member
603, 605 Polarizing beam splitter
604 Liquid crystal display device
606 ¼-wave plate
607 Reflecting plate
611 Image forming device
612 Light guiding member
613 Semi-transparent mirror
614 Reflecting plate
621 Image forming device
622 Prism
623, 624 Prism surface
625 Convex lens
700 Light regulating device
701 First substrate
702 First transparent electrode
702A First transparent electrode segment
703 Second substrate
704 Second transparent electrode
704A Second transparent electrode segment
705 Light regulating layer
705A $WO_3$ layer
705B $Ta_2O_5$ layer
705C $Ir_xSn_{1-x}O$ layer
706 Protective layer
707 Sealing member
708 Adhesive
709 Light-shielding-ratio-varying minimum unit region of light regulating device
711 Virtual image projection region of light regulating device 711A Region of light regulating device corresponding to virtual image of the test pattern
712 Other region of light regulating device
721 Illuminance sensor (environment illuminance measurement sensor)
722 Second illuminance sensor (transmitting light illuminance measurement sensor)
731, 732, 733 Light shielding member

The invention claimed is:

1. A display apparatus including:
a frame that is mounted on a head of an observer;
an image display device that is attached to the frame; and
a light regulating device that regulates a light amount of external light incident from an outside,
wherein the image display device includes:
an image forming device; and
an optical device that includes:
a virtual image forming region where a virtual image is formed based on light emitted from the image forming device; and
at least one diffraction grating member including at least one interference fringe,
wherein the virtual image forming region of the optical device overlaps the light regulating device,
wherein, when the virtual image is formed in a portion of the virtual image forming region based on the light emitted from the image forming device, the light regulating device is controlled so that a light shielding ratio of a virtual image projection region of the light regulating device where a projection image of the virtual image to the light regulating device is included is higher than a light shielding ratio of the other region of the light regulating device,
wherein a visibility, through the virtual image projection region of an environment opposite a user relative to the display apparatus is higher than a visibility, through the other region of the environment opposite the user relative to the display device,
wherein a virtual image of a test pattern is displayed in the virtual image forming region of the optical device based on the test pattern emitted from the image forming device, and the light shielding ratio of a region of the light regulating device corresponding to the virtual image of the test pattern is set to be higher than the light shielding ratio of the other region of the light regulating device, and
wherein a virtual rectangle circumscribing the virtual image formed in the optical device has a first lateral length and a first longitudinal length, and a shape of the virtual image projection region of the light regulating device is set to be a shape of a rectangle having a second lateral length and a second longitudinal length, comparisons are determined between the first and second lateral length and between the first and second longitudinal length.

2. The display apparatus of claim 1, wherein a position relationship between a formation position of the virtual image in the optical device and a position of the virtual image projection region of the light regulating device is corrected by using as a reference a movement amount when the virtual image of the test pattern and the high light shielding ratio region of the light regulating device are moved relative to each other.

3. The display apparatus of claim 1, wherein the light shielding ratio of the other region of the light regulating device at the time of operation of the light regulating device is determined.

4. The display apparatus of claim 2, wherein the light shielding ratio of the other region of the light regulating device at the time of operation of the light regulating device is determined.

5. The display apparatus of claim 1, wherein the light shielding ratio of the virtual image projection region of the light regulating device at the time of operation of the light regulating device is determined.

6. The display apparatus of claim 2, wherein the light shielding ratio of the virtual image projection region of the light regulating device at the time of operation of the light regulating device is determined.

7. The display apparatus of claim 3, wherein the light shielding ratio of the virtual image projection region of the light regulating device at the time of operation of the light regulating device is determined.

8. The display apparatus of claim 1, wherein when a virtual rectangle circumscribing the virtual image formed in the optical device is considered, and a shape of the virtual image projection region of the light regulating device is set to be a shape of a rectangle having a second lateral length and a second longitudinal length, comparisons are determined between a first lateral length and the second lateral length and between a first longitudinal length and the second longitudinal length.

9. The display apparatus of claim 8, wherein the comparisons comprise ratios of the second lateral length to the first lateral length and of the second longitudinal length to the first longitudinal length.

10. A method of initially setting a display apparatus, the method comprising:
when a virtual image is formed in a portion of a virtual image forming region of an optical device based on light emitted from an image forming device, controlling a light regulating device so that a light shielding ratio of a virtual image projection region of the light regulating device where a projection image of the virtual image to the light regulating device is included is higher than a light shielding ratio of an other region of the light regulating device,
setting a light shielding ratio of a region of the light regulating device corresponding to a virtual image of a test pattern higher than a light shielding ratio of the other region of the light regulating device,
wherein the virtual image of the test pattern is displayed in the virtual image forming region based on the test pattern emitted from the image forming device,
wherein the virtual image of the test pattern and a high light shielding ratio region of the light regulating device are moved relative to each other so that the virtual image of the test pattern observed by an observer and the high light shielding ratio region of the light regulating device observed by the observer overlap each other,
wherein the display apparatus comprises:
a frame that is mounted on a head of the observer;
an image display device that is attached to the frame; and
the light regulating device, wherein the light regulating device regulates a light amount of external light incident from an outside,
wherein the image display device includes:
the image forming device; and
the optical device, wherein the optical device includes:
the virtual image forming region where the virtual image is formed based on light emitted from the image forming device; and at least one diffraction grating member including at least one interference fringe, and wherein the virtual image forming region of the optical device overlaps the light regulating device, and determining comparisons between a first and second lateral length and between a first and second longitudinal length, wherein a virtual rectangle circumscribing the virtual image formed in the optical device has a first lateral length and a first longitudinal length, and wherein a shape of the virtual image projection region of the light regulating device is set to be a shape of a rectangle having a second lateral length and a second longitudinal length.

11. The method of claim 10, further comprising determining the light shielding ratio of the other region of the light regulating device at the time of operation of the light regulating device.

12. The method of claim 10, further comprising determining the light shielding ratio of the virtual image projection region of the light regulating device at the time of operation of the light regulating device.

13. The display apparatus of claim 1, wherein the at least one interference fringe is formed on the at least one diffraction grating member, wherein the at least one interference fringe corresponds to one type of wavelength.

14. The display apparatus of claim 1, wherein the at least one interference fringe has a constant pitch.

15. The display apparatus of claim 1, wherein the at least one interference fringe is formed from an inner portion of the at least one diffraction grating member to a surface of the at least one diffraction grating member.

* * * * *